(12) United States Patent
Veltrop et al.

(10) Patent No.: US 10,271,689 B2
(45) Date of Patent: Apr. 30, 2019

(54) MODULAR FOOD HOLDING SYSTEM

(71) Applicant: PRINCE CASTLE LLC, Carol Stream, IL (US)

(72) Inventors: Loren J. Veltrop, Chicago, IL (US); Christine S. Laub, Roselle, IL (US); Eric William Larson, Pecatonica, IL (US)

(73) Assignee: PRINCE CASTLE LLC, Carol Stream, IL (US)

( * ) Notice: Subject to any disclaimer, the term of this patent is extended or adjusted under 35 U.S.C. 154(b) by 253 days.

(21) Appl. No.: 14/850,921

(22) Filed: Sep. 10, 2015

(65) Prior Publication Data
US 2017/0071408 A1 Mar. 16, 2017

(51) Int. Cl.
*A47J 39/00* (2006.01)

(52) U.S. Cl.
CPC .................... *A47J 39/006* (2013.01)

(58) Field of Classification Search
CPC ....... F25B 21/02; F25D 25/024; A47J 39/006; A47F 10/06
USPC .......... 219/385, 394, 402; 62/443, 447, 441, 62/252; 99/451
See application file for complete search history.

(56) References Cited

U.S. PATENT DOCUMENTS

| | | |
|---|---|---|
| D63,818 S | 1/1924 | Curtiss |
| D243,362 S | 2/1977 | Shumrak et al. |
| 4,864,274 A | 9/1989 | Black |
| 5,253,564 A * | 10/1993 | Rosenbrock ............. A21B 1/40 99/326 |
| D341,054 S | 11/1993 | Maputol |
| D364,530 S * | 11/1995 | Robards, Jr. ................ D7/350.4 |
| D369,269 S | 4/1996 | Labadia Del Fresno |
| 5,579,952 A * | 12/1996 | Fiedler .................... G07F 9/105 219/521 |
| 5,724,886 A * | 3/1998 | Ewald .................... A47F 10/06 99/374 |
| 5,783,803 A | 7/1998 | Robards, Jr. |
| 5,900,173 A * | 5/1999 | Robards, Jr. ............ A47J 39/00 219/214 |
| 6,116,154 A * | 9/2000 | Vaseloff .................. A47J 39/02 219/214 |

(Continued)

FOREIGN PATENT DOCUMENTS

WO WO-2013062832 A1 5/2013

OTHER PUBLICATIONS

"Modular Holding Cabinets", Product Catalog, Carter-Hoffmann, Mundelein, Illinois (Jan. 2014).

(Continued)

*Primary Examiner* — Jimmy Chou
(74) *Attorney, Agent, or Firm* — Marshall, Gerstein & Borun LLP

(57) ABSTRACT

A modular food holding system includes a plurality of individual modularized food holding chambers, each of the plurality of food holding chambers being physically and communicatively removably connected to one another. Each of the food holding chambers includes a food holding cavity and at least one of a heating element and/or a cooling element for heating or cooling the food holding cavity. A chamber base is physically and communicatively removably connected to one of the food holding chambers and operation of at least one food holding chamber is controlled by the chamber base.

14 Claims, 46 Drawing Sheets

(56) References Cited

U.S. PATENT DOCUMENTS

| | | | |
|---|---|---|---|
| D434,265 S | 11/2000 | Tatlow | |
| 6,175,099 B1* | 1/2001 | Shei | A47J 39/006 219/385 |
| 6,262,394 B1* | 7/2001 | Shei | A47J 39/006 219/385 |
| 6,412,403 B1 | 7/2002 | Veltrop | |
| 6,545,587 B1 | 4/2003 | Hatakeyama et al. | |
| 6,637,322 B2 | 10/2003 | Veltrop | |
| 6,658,994 B1* | 12/2003 | McMillan | A23L 3/3418 219/214 |
| 6,871,676 B2* | 3/2005 | Sus | A47J 37/1228 141/168 |
| 6,878,391 B2 | 4/2005 | Veltrop | |
| 6,884,451 B2 | 4/2005 | Veltrop | |
| 6,924,467 B2* | 8/2005 | Ellis | A61F 7/007 219/212 |
| 7,105,779 B2* | 9/2006 | Shei | A21B 1/22 219/394 |
| 7,227,102 B2* | 6/2007 | Shei | A47J 39/006 219/394 |
| 7,328,654 B2* | 2/2008 | Shei | A47J 39/006 219/385 |
| 7,385,160 B2 | 6/2008 | Jones | |
| 7,446,282 B2* | 11/2008 | Shei | A47J 39/006 219/391 |
| 7,708,135 B2 | 5/2010 | Ellerth et al. | |
| 7,721,877 B2 | 5/2010 | Maine, Jr. et al. | |
| 7,762,636 B2 | 7/2010 | Veeser et al. | |
| 7,800,023 B2 | 9/2010 | Burtea et al. | |
| 7,858,906 B2 | 12/2010 | Veltrop et al. | |
| 7,905,173 B2* | 3/2011 | Sus | F24C 15/166 219/214 |
| 7,975,840 B2 | 7/2011 | Messick, Jr. et al. | |
| 7,987,972 B2 | 8/2011 | Hennigar et al. | |
| 8,091,472 B2 | 1/2012 | Maciejewski et al. | |
| 8,096,231 B2 | 1/2012 | Veltrop et al. | |
| 8,506,687 B2 | 8/2013 | Jones | |
| 8,522,675 B2* | 9/2013 | Veltrop | A23L 3/005 219/214 |
| 8,607,587 B2* | 12/2013 | Veltrop | A47F 3/06 62/252 |
| D716,095 S | 10/2014 | Veltrop et al. | |
| D725,429 S* | 3/2015 | Veltrop | D7/323 |
| 8,997,636 B2* | 4/2015 | Kirby | A47J 39/006 715/700 |
| 9,140,484 B2* | 9/2015 | Veltrop | F25D 25/028 |
| 9,221,611 B2 | 12/2015 | Ulchak et al. | |
| 9,693,655 B2* | 7/2017 | Shei | A47J 36/34 |
| 2001/0007322 A1 | 7/2001 | Shei et al. | |
| 2003/0034898 A1 | 2/2003 | Shamoon et al. | |
| 2003/0118706 A1 | 6/2003 | Veltrop | |
| 2004/0020915 A1 | 2/2004 | Shei | |
| 2004/0056761 A1* | 3/2004 | Vaseloff | A47F 10/06 340/309.16 |
| 2005/0211696 A1 | 9/2005 | Adamski | |
| 2007/0000905 A1 | 1/2007 | Imgram et al. | |
| 2007/0017245 A1* | 1/2007 | Song | F25D 23/061 62/443 |
| 2007/0144202 A1* | 6/2007 | Theodos | A47J 39/006 62/348 |
| 2007/0186570 A1* | 8/2007 | Kopf | F25C 5/187 62/135 |
| 2007/0236346 A1 | 10/2007 | Helal et al. | |
| 2008/0008795 A1* | 1/2008 | Thorneywork | G07F 9/105 426/233 |
| 2008/0023462 A1 | 1/2008 | Shei et al. | |
| 2008/0156009 A1* | 7/2008 | Cur | F25D 11/02 62/185 |
| 2008/0156030 A1* | 7/2008 | Cur | F25B 25/00 62/441 |
| 2008/0283440 A1 | 11/2008 | Hartsfield, Jr. et al. | |
| 2008/0302778 A1* | 12/2008 | Veltrop | A47J 39/006 219/385 |
| 2009/0126580 A1* | 5/2009 | Hartfelder | A47J 39/006 99/483 |
| 2009/0199723 A1* | 8/2009 | Veltrop | A47J 37/0623 99/427 |
| 2009/0252842 A1* | 10/2009 | Wang | A23L 3/32 426/231 |
| 2009/0266244 A1* | 10/2009 | Maciejewski | A47J 39/00 99/485 |
| 2010/0101254 A1* | 4/2010 | Besore | G06Q 50/06 62/264 |
| 2010/0162747 A1* | 7/2010 | Hamel | F25D 11/022 62/441 |
| 2010/0186600 A1* | 7/2010 | Lewis | A47J 27/62 99/327 |
| 2010/0192609 A1* | 8/2010 | Chae | F25D 17/065 62/291 |
| 2010/0275789 A1 | 11/2010 | Lee et al. | |
| 2010/0307188 A1* | 12/2010 | Kwon | F25D 23/028 62/441 |
| 2011/0011109 A1* | 1/2011 | Rafalovich | F25B 5/02 62/234 |
| 2011/0030565 A1 | 2/2011 | Shei | |
| 2011/0239675 A1* | 10/2011 | Roekens | F25D 23/026 62/249 |
| 2011/0253698 A1* | 10/2011 | Theodos | A47J 39/006 219/385 |
| 2011/0253703 A1 | 10/2011 | Theodos et al. | |
| 2011/0283714 A1* | 11/2011 | Veltrop | A47F 3/06 62/3.2 |
| 2011/0283895 A1* | 11/2011 | Veltrop | A23L 3/005 99/451 |
| 2012/0023987 A1* | 2/2012 | Besore | H02J 3/14 62/157 |
| 2012/0079699 A1 | 4/2012 | Veltrop et al. | |
| 2013/0277353 A1* | 10/2013 | Joseph | H05B 1/0263 219/209 |
| 2014/0150461 A1* | 6/2014 | Veltrop | F25D 25/028 62/3.6 |
| 2014/0231406 A1 | 8/2014 | Tsang et al. | |
| 2014/0263269 A1* | 9/2014 | Veltrop | A47J 39/02 219/394 |
| 2014/0345474 A1* | 11/2014 | Trench Rocha | A47J 43/04 99/325 |
| 2015/0129395 A1 | 5/2015 | Messick, Jr. | |
| 2015/0151919 A1 | 6/2015 | Messick, Jr. et al. | |
| 2015/0191312 A1 | 7/2015 | Ulchak et al. | |
| 2015/0327726 A1 | 11/2015 | Betzold et al. | |
| 2016/0176568 A1 | 6/2016 | Glasgow et al. | |
| 2016/0185529 A1 | 6/2016 | Bauer | |
| 2016/0185530 A1 | 6/2016 | Malkowski et al. | |
| 2017/0071409 A1 | 3/2017 | Veltrop et al. | |
| 2017/0071410 A1 | 3/2017 | Veltrop et al. | |
| 2017/0071411 A1 | 3/2017 | Veltrop et al. | |
| 2017/0071412 A1 | 3/2017 | Veltrop et al. | |
| 2017/0150843 A1 | 6/2017 | Rosalia et al. | |

OTHER PUBLICATIONS

U.S. Appl. No. 14/850,914, Nonfinal Office Action, dated Feb. 23, 2017.
U.S. Appl. No. 15/160,748, Nonfinal Office Action, dated Mar. 23, 2017.
U.S. Appl. No. 14/850,944, Nonfinal Office Action, dated Jul. 6, 2017.

* cited by examiner

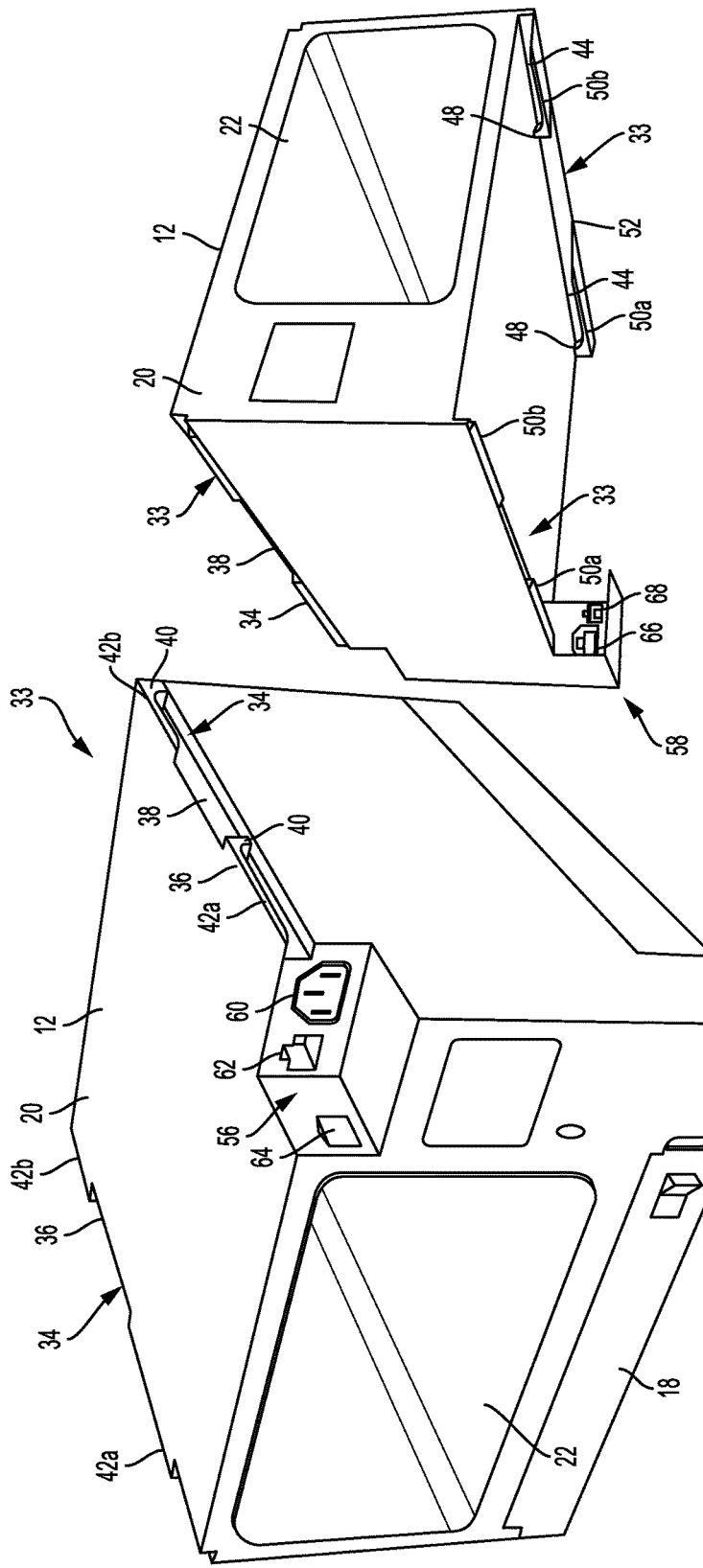

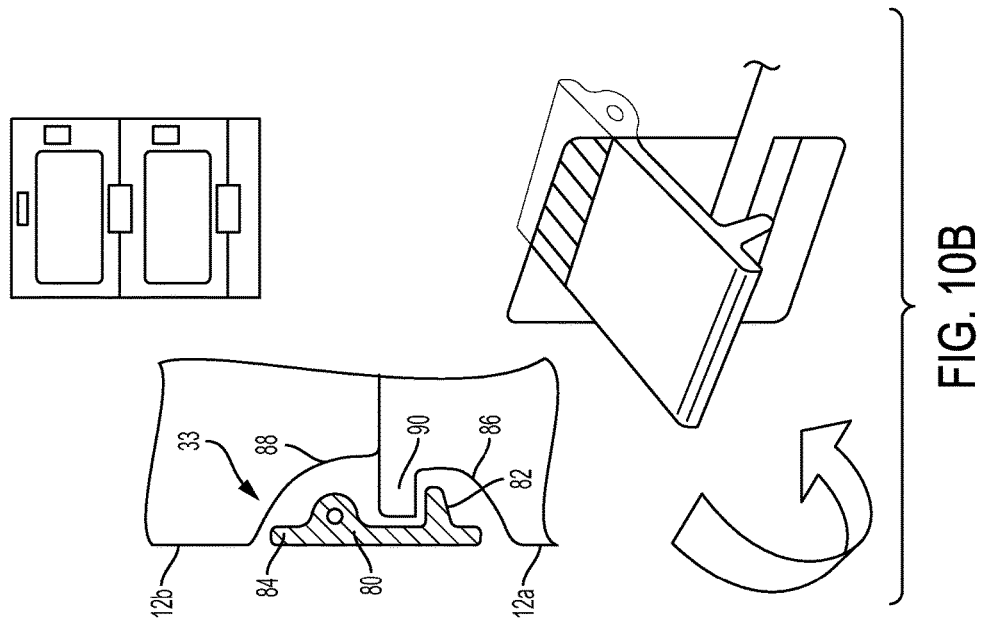
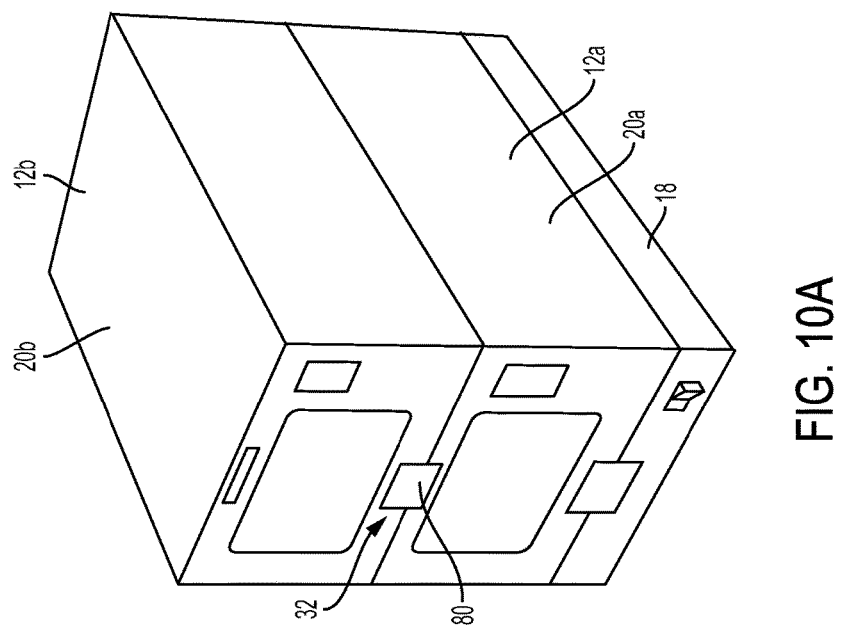

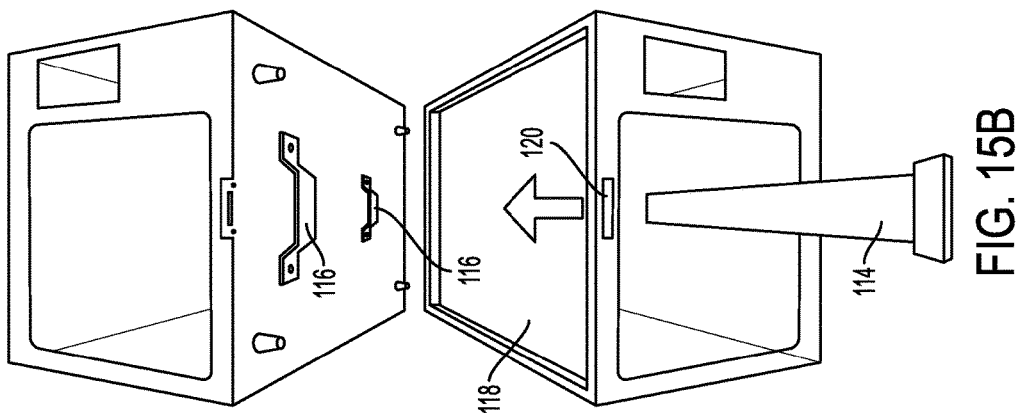
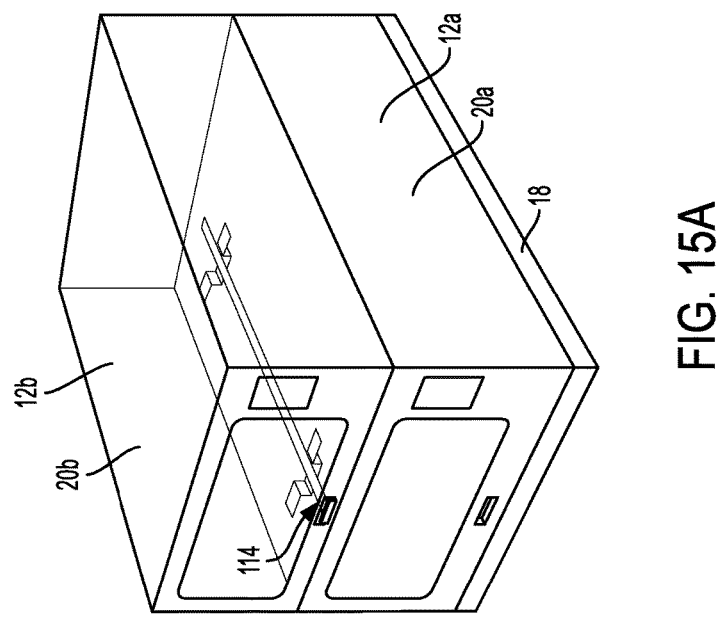

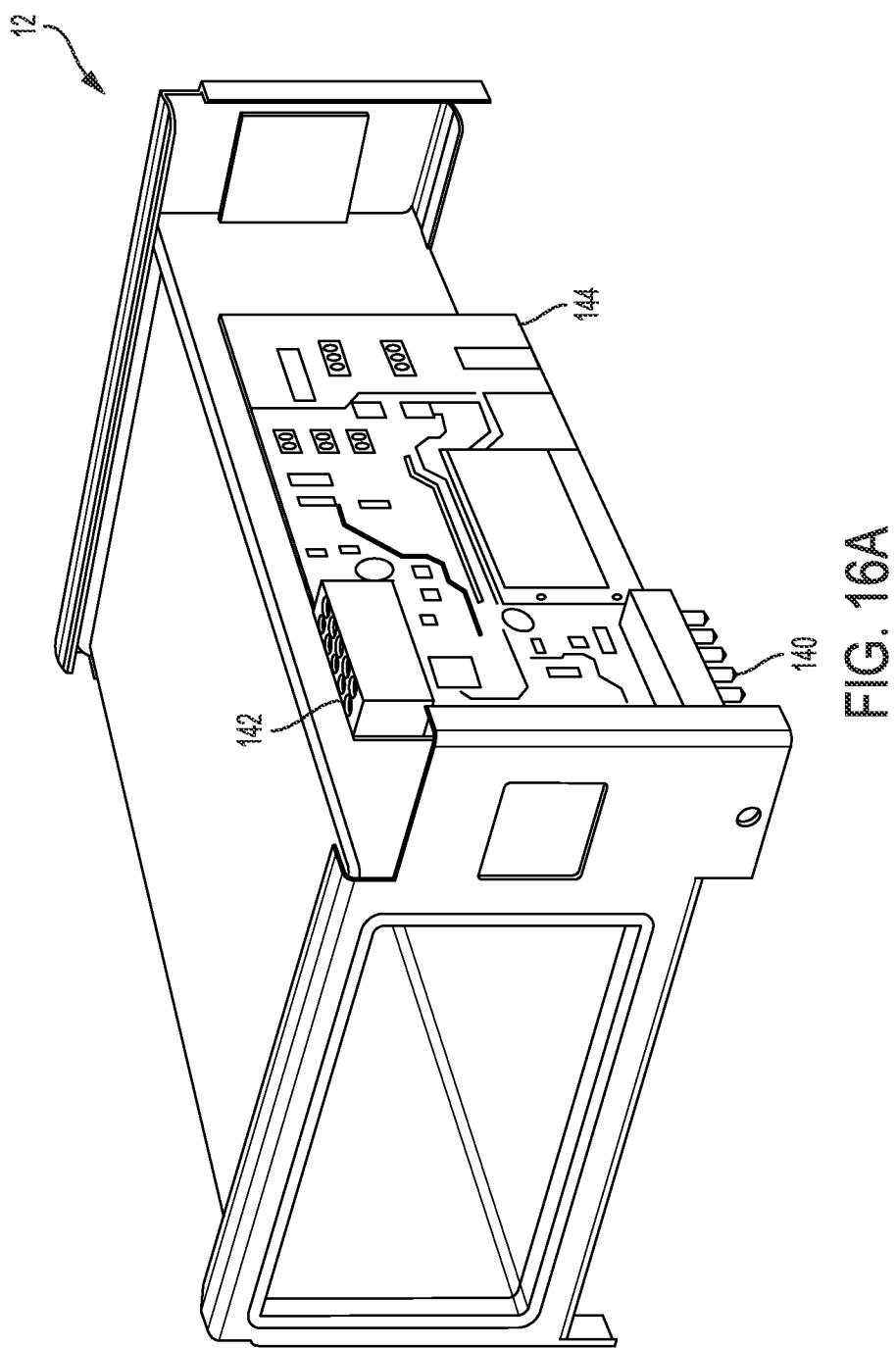

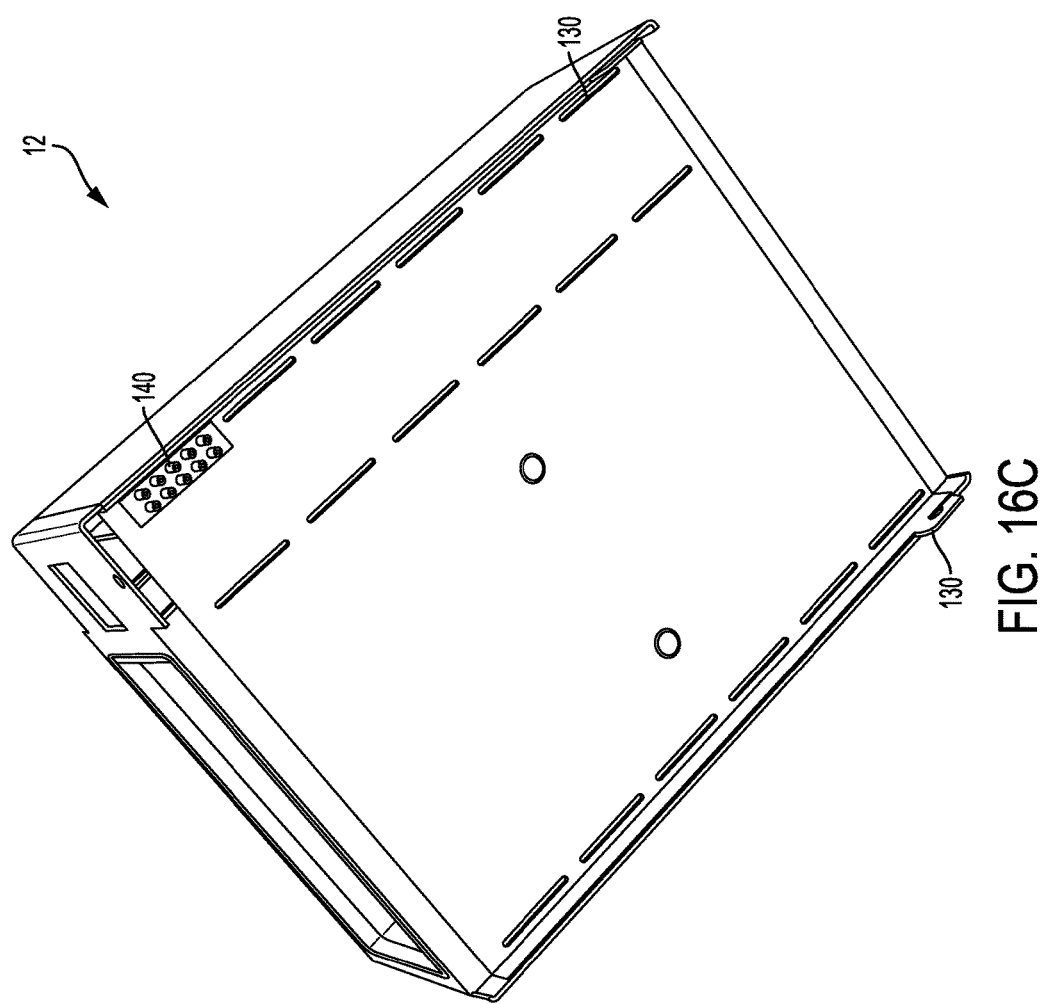

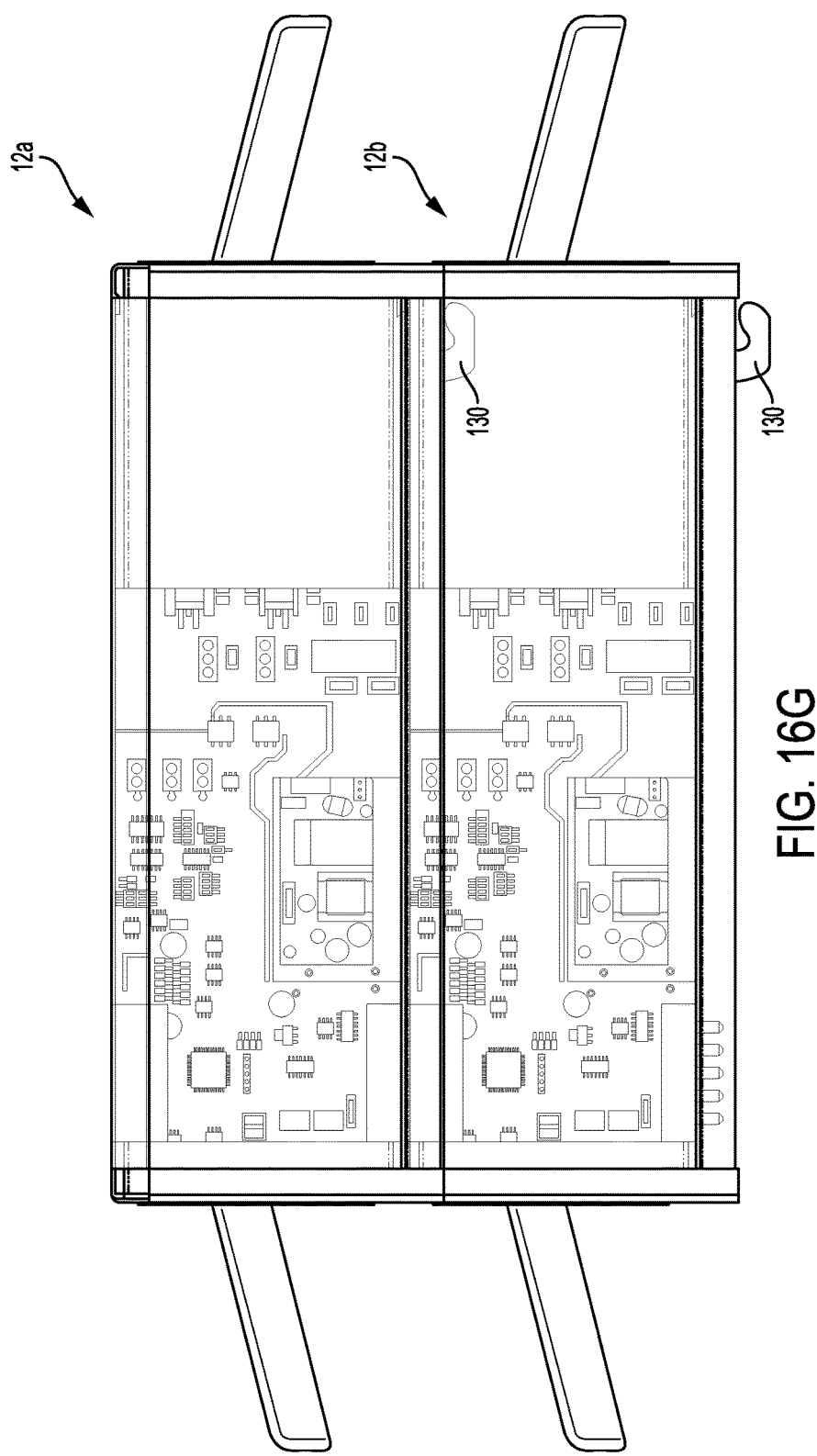

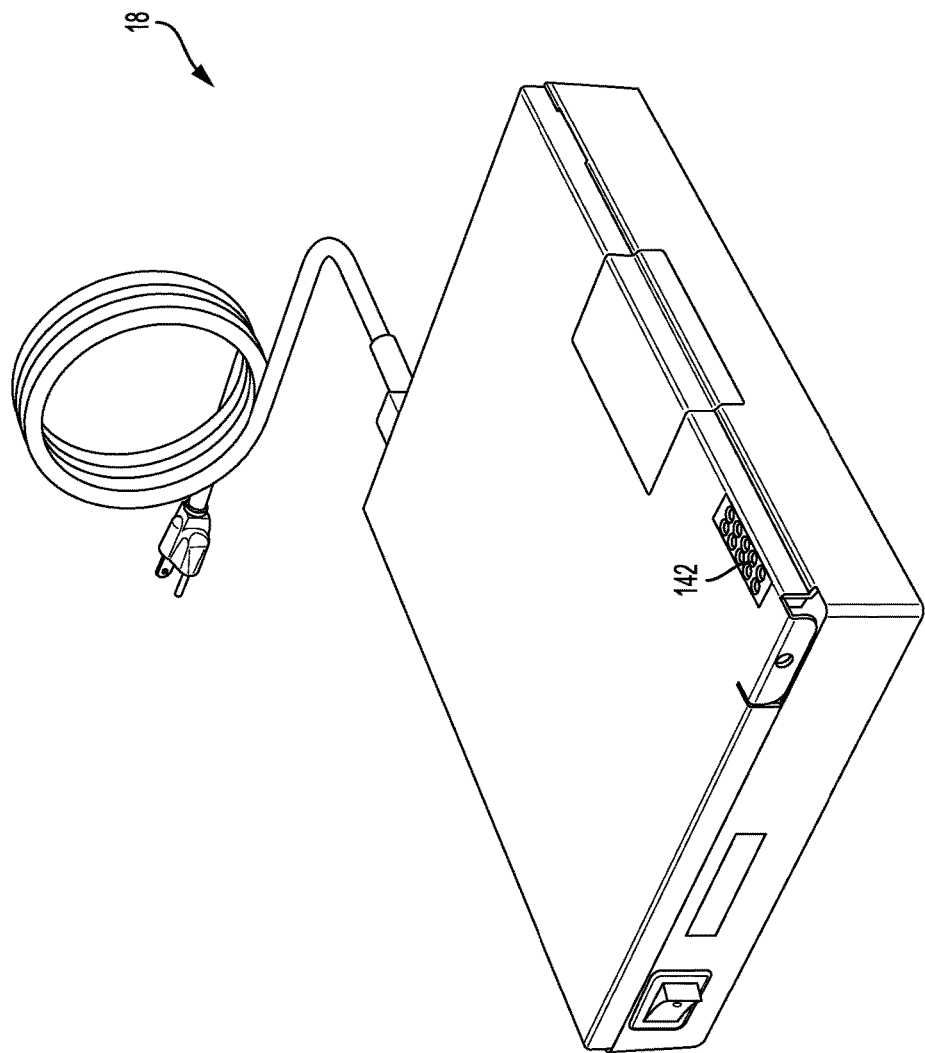

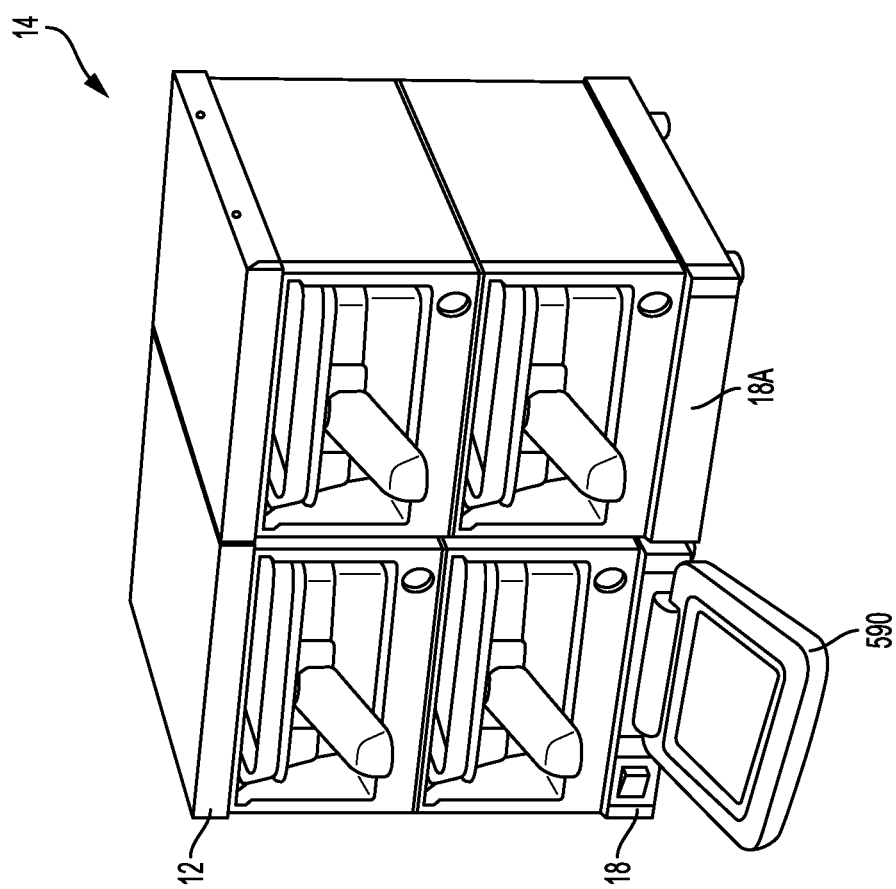

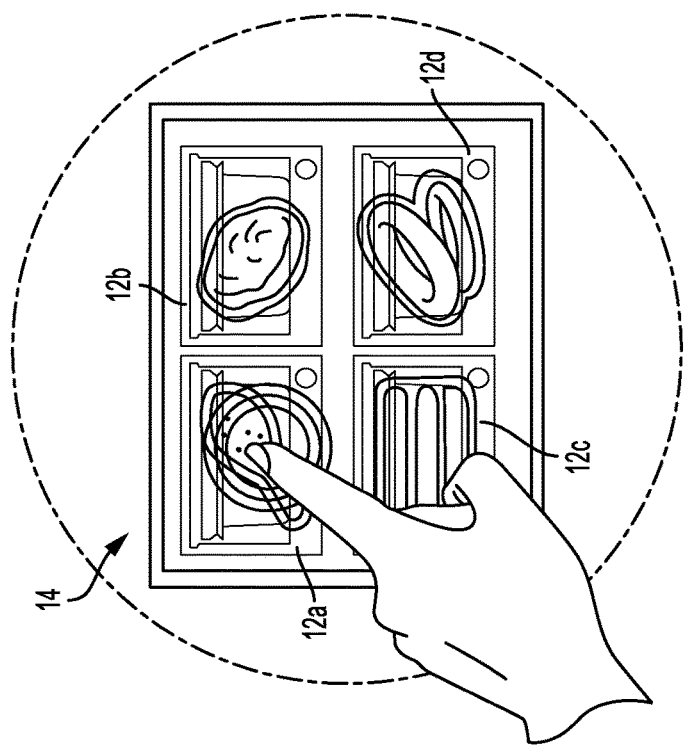
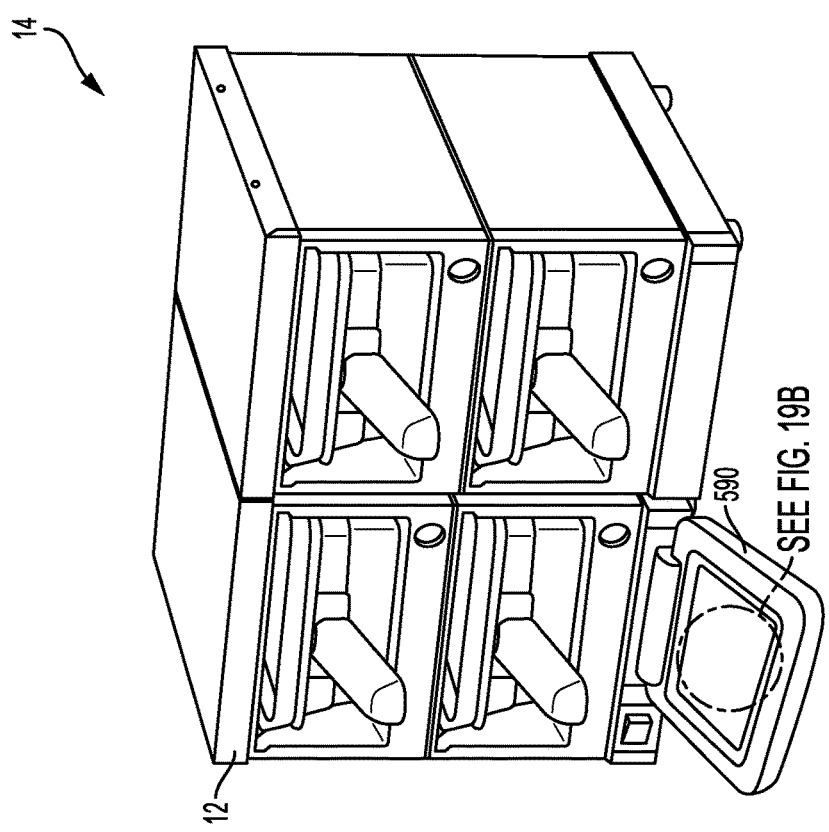

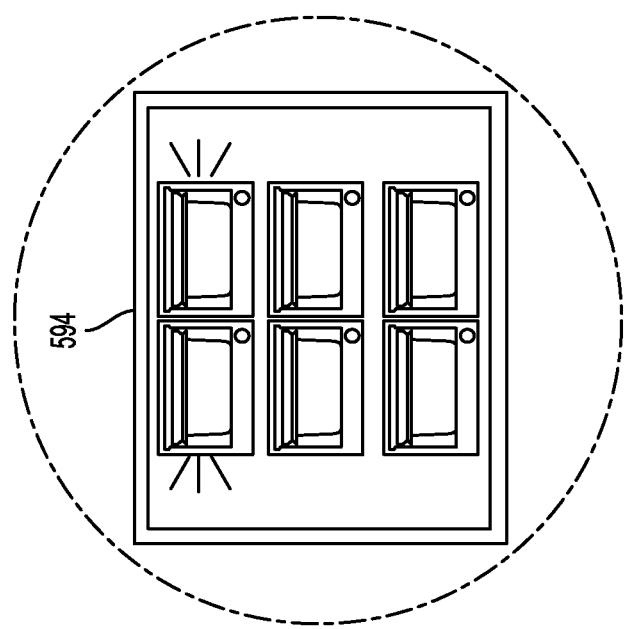
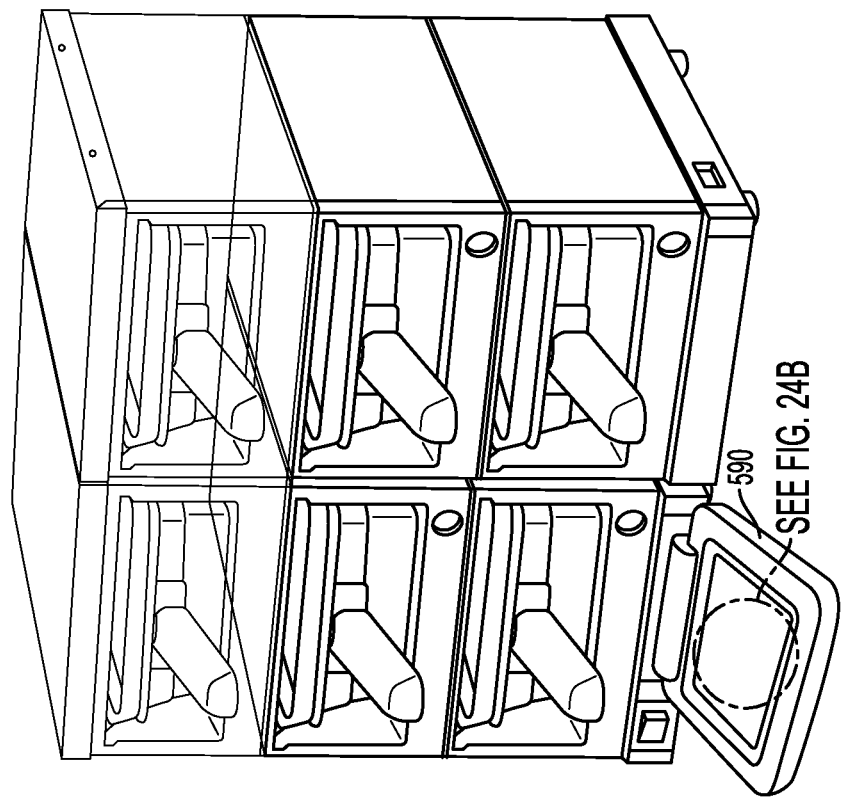
FIG. 24B
FIG. 24A

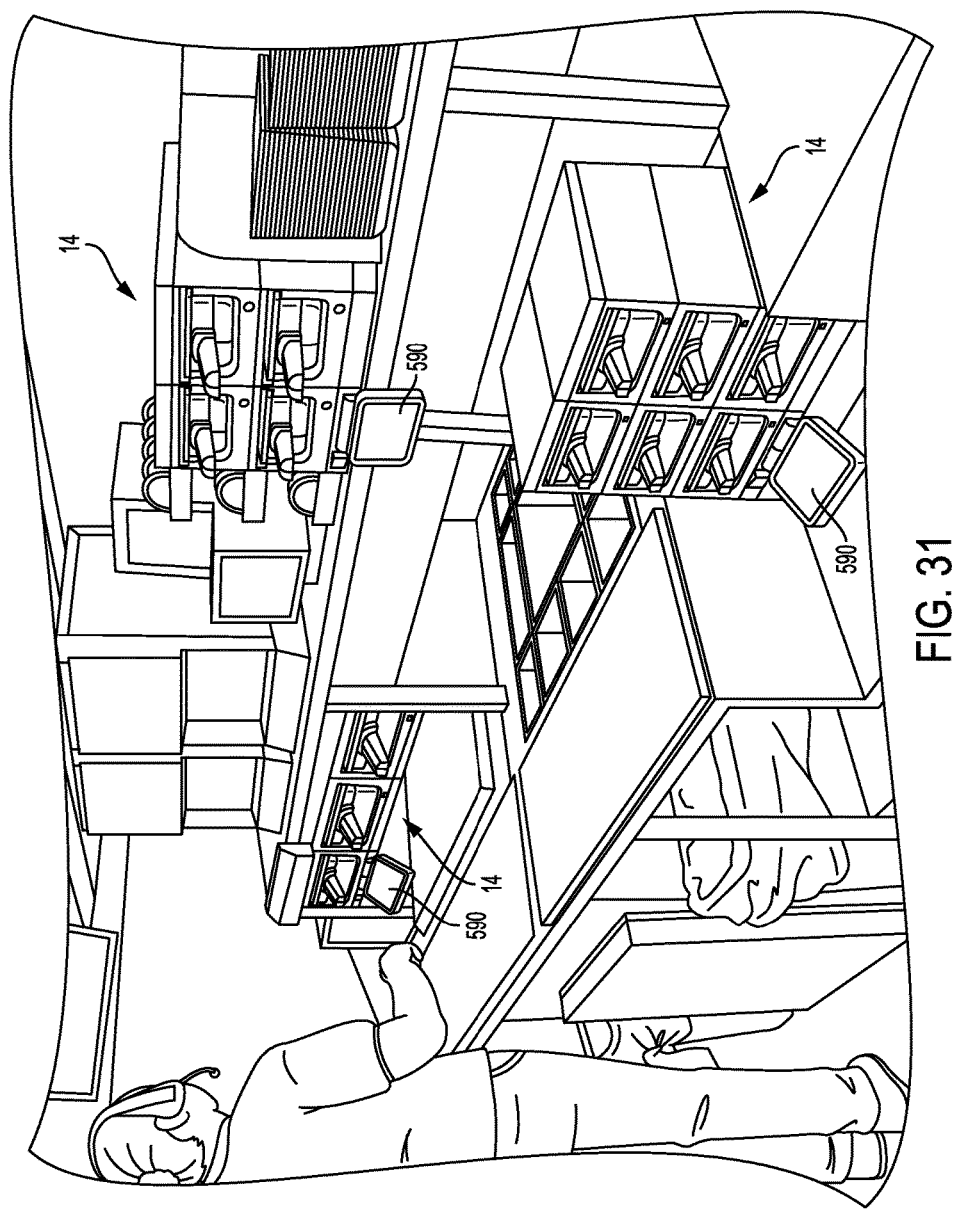

MODULAR FOOD HOLDING SYSTEM

FIELD OF THE INVENTION

The invention relates generally to food holding systems and more specifically to reconfigurable modular food holding systems.

BACKGROUND OF THE INVENTION

Restaurant success often depends on how quickly customers can be served with food items that a customer orders and on the quality of the food items when served. If the rate at which a restaurant prepares food items equals the rate at which those same food items are ordered and sold, a restaurant can theoretically have freshly-prepared food items ready to serve as customers order food items. Since it is not always possible to match food item production with customer ordering rates, and since certain fast food restaurant customers expect to receive their ordered food items quickly, many quick service food restaurants prepare various food items before customers order and keep food items ready for sale until a customer arrives and orders a prepared food item.

Holding systems to keep prepared food items ready for sale allow a cooked or ready-to-consume food item to be put into the system (e.g., an oven or a refrigerator) from one side and to be taken from the system on the opposite side thereby allowing food preparers to add food to the system and food servers to take food from the system.

Current holding systems come in various fixed sizes but the holding systems are not reconfigurable. Rather, such current holding systems are typically purchased "off the shelf" from a manufacturer/retailer or are custom designed to meet a specific user's specific needs. Regardless, current holding systems are "fixed" and thus not reconfigurable. Such fixed dimensional holding units limit food preparation layouts which may have to be modified or altered, for numerous reasons, relatively frequently. For example, as quick serve restaurants add or change menus items, food preparation layouts may need to be adjusted. Additionally, different configurations may be desirable to facilitate increased production of different menu items at different times, for example, different menu items and holding capabilities may be desirable at breakfast than at lunch or dinner. Fixed dimensional holding systems limit the degree to which the food preparation layouts may be reconfigured.

Moreover, after remodeling a kitchen, existing fixed holding systems may not be properly sized for the reconfigured kitchen. This may lead to the purchase of new food holding systems at considerable expense or to undesirable or inefficient food preparation layout.

Generally speaking, food holding systems in the restaurant industry should be easy to operate, for example, because of the high turnover of personnel, which often requires frequent training of new personnel.

Thus, it would be beneficial to provide a more flexible, reconfigurable, and easy to operate food holding system.

SUMMARY

In one aspect, a modular food holding system includes a plurality of individual modularized food holding chambers, each of the plurality of food holding chambers being physically and communicatively removably connected to one another, and each of the food holding chambers comprising a food holding cavity and at least one of a heating element and a cooling element for heating or cooling the food holding cavity. A chamber base is physically and communicatively removably connected to one of the food holding chambers and operation of at least one food holding chamber is controlled by the chamber base.

The modular food holding system may include one or more of the following preferred forms.

In some forms, the food holding cavity may include one of a blind cavity and a through cavity.

In other forms, the system may include a food holding tray disposed within the food holding cavity.

In yet other preferred forms, at least one expansion base may be physically and communicatively removably connected to the chamber base and to at least one food holding chamber, such that the at least one expansion base receives power and communications from the chamber base and provides power and communications to the at least one food holding chamber.

In yet other preferred forms, the first food holding chamber includes a power and communication recess formed in a chamber housing, the power and communication recess including a power port and a communications port. The first food holding chamber may additionally include a power and communications block formed in the chamber housing, the power and communications block having a shape that is complementary to the power and communications port.

In yet other preferred forms, the first food holding chamber includes a connection structure formed in a chamber housing, the connection structure providing a physical removable attachment with a second food holding chamber, the connection structure limiting relative movement between the first food holding chamber and the second food holding chamber to one dimension at a time.

In yet other preferred forms, the connection structure may include one or more of a tongue and groove connection, a locking mechanism that prevents relative movement between the first and second food holding chambers in one dimension, a raised plateau on an upper surface of the first food holding chamber and a recess on a bottom surface of the second food holding chamber (the raised plateau fitting at least partially within the recess when the second food holding chamber is stacked upon the first food holding chamber), a securing latch disposed at a bottom surface of the chamber housing of the second food holding chamber and a locking recess disposed near a top surface of the first food holding chamber, a securing hook disposed near a bottom surface of the second food holding chamber and a pin disposed near a top surface of the first food holding chamber (the securing hook capturing the pin to secure the second food holding chamber to the first food holding chamber when the second food holding chamber is stacked upon the first food holding chamber), a bayonet pin disposed near a bottom surface of the chamber housing of the second food holding chamber and a keyway disposed near at top surface of the first food holding chamber (the bayonet pin fitting within the keyway when the second food holding chamber is stacked upon the first food holding chamber), a flexible latch disposed near a bottom of the second food holding chamber and a locking channel disposed near a top of the first food holding chamber (the flexible latch being captured at least partially by the locking channel when the second food holding chamber is stacked upon the first food holding chamber), a securing leg extending from a bottom of the second food holding chamber and fastener opening disposed near a top of the first food holding chamber and a fastener extends through the fastener opening and into the securing leg when the second food holding chamber is stacked upon the first food holding chamber, and a locking bracket formed in a bottom surface of the second food holding chamber and an opening formed in a front of the first food holding chamber, and a fastening strap extends through the opening and through the locking bracket when the second food holding chamber is stacked upon the first food holding chamber, In another aspect, a modular food holding system includes a plurality of individual modularized food holding chambers, each of the plurality of food holding chambers being physically and communicatively removably connected to one another, each of the food holding chambers comprising a food holding cavity and at least one of a heating element and a cooling element for heating or cooling the food holding cavity, a chamber base physically and communicatively removably connected to one of the food holding chambers in the plurality of food holding chambers, and a control screen operatively coupled to the chamber base, the control screen providing one of a user interface for entering control instructions and an information display that displays information pertaining to one or more of the food holding chambers.

The modular food holding system may include one or more of the following preferred forms.

In one preferred form, the control screen is removably attached to the chamber base. In some preferred forms, the control screen may be attached to the chamber base with a tether, or the control screen may be wirelessly connected to the chamber base.

In yet other preferred forms, the control functions include controls for one or more of a temperature of a food holding chamber, a humidity level of a food holding chamber, and a configuration of the plurality of food holding chambers.

In yet other preferred forms, the control screen displays a schematic representation of each of the food holding chambers in the plurality of food holding chambers and/or a symbolic illustration of a food type that is stored in one of the food holding chambers.

In yet other preferred forms, an individual food holding chamber is selectable on the control screen and a location of a selected food holding chamber is displayed on the control screen.

In yet other preferred forms, the control screen displays a countdown timer for a selected food holding chamber, the countdown timer representing the useful life of a food item stored in the food holding chamber.

In other aspects, methods and systems for monitoring and controlling a modular food holding system are disclosed herein. The modular food holding system may include a master base communicatively connected to a plurality of food holding chambers and to a central controller, such that the central controller communicates with the food holding chambers through the master base. The food holding chambers may be identical or functionally identical, and some food holding chambers may connect to the master base through other food holding chambers or expansion bases. Each food holding chamber may include an upstream connection and a downstream connection, each having a power connection and a communication connection. In some embodiments, the master base may be incorporated into one of the modular food holding chambers.

In some embodiments, the food holding chambers may include electrical components that may provide data to the central controller or may be controlled by the central controller. Such components may include sensors, heating elements, cooling elements, fans, displays, or unit controllers. The components may produce or transmit data to the central controller, such as temperature within the food holding chambers, humidity within the food holding chambers, heat source location within the food holding chambers, or other data regarding a condition of the food holding chambers. In some embodiments, the components may be limited to only one or more of a timer switch, a heating element, a cooling element, a fan, or an indicator light. In further embodiments, the limited components may further include a unit controller.

Operation of the food holding chambers and their electrical components may be controlled by the central controller. A communicative connection between the central controller and the master base may be established via a communication link, which may be a direct, wired, or wireless link. The central controller may receive data from the food holding chambers, determine control actions based upon the received data (including control commands), and generate and communicate control commands to the food holding chambers through the communication link and the master base. The food holding chambers may communicate data to the central controller and receive control commands from the central controller via the communication link and the master base. The food holding chambers may implement received control commands using one or more electrical components, which may include presenting an alert, illuminating an indicator light, displaying a countdown, controlling the temperature within the food holding chambers, or controlling the humidity within the food holding chambers.

The central controller may further determine and implement control actions that do not involve control commands to the food holding chambers. For example, the central controller may determine a countdown timer or recommendation to a user of the central controller. In some embodiments, the central controller may use the data received from the food holding chambers to determine a physical arrangement of the food holding chambers, a visual representation of which may be presented to the user. The central controller may present control options to the user, receive a user selection from the presented options, and cause control actions to be implemented based upon the received selection. Information regarding the control actions or implementation of the control actions may also be presented to the user. To facilitate such presentation and selection of information and options, the central controller may have a display and an input, which may be combined in a touch screen display.

BRIEF DESCRIPTION OF THE DRAWINGS

FIG. 5 is a front perspective view of one of the chambers of FIG. 4.

FIG. 6 is a rear perspective view of the chamber of FIG. 5.

FIG. 10A is a perspective view of yet another alternative embodiment of two chambers of the modular food holding system of FIG. 1.

FIG. 10B is a close-up sectional view of securing portions of the two chambers of FIG. 10A.

FIG. 15A is a perspective view of yet another alternative embodiment of two chambers of the modular food holding system of FIG. 1.

FIG. 15B is a close-up view of securing portions of the two chambers of FIG. 15A.

FIG. 16A is a perspective view of yet another embodiment of a chamber of the modular food holding system of FIG. 1.

FIG. 16C is a bottom perspective view of the outer casing of FIG. 16B.

FIG. 16G is a sider view of the two chambers of FIG. 16E in a fully connected state.

FIG. 17A is a perspective view of an alternate embodiment of a base.

FIG. 18 is a perspective view of the modular food holding system of FIG. 3 including a control and display screen.

FIG. 19A is a perspective view of the modular food holding system of FIG. 16 including one example of a display for selecting one of the four chambers of the modular food holding system of FIG. 18. FIG. 19B is an exploded view showing the control screen illustrated in FIG. 19A.

FIG. 24A is a perspective view of the modular food holding system of FIG. 16 including one example of a display for adding two additional chambers into the modular food holding system of FIG. 18 in a 2×3 configuration. FIG. 24B is an exploded view of the control screen illustrated in FIG. 24A.

FIG. 31 is a perspective view of the modular food holding system of FIG. 1 with a plurality of food holding chambers connected in various fashions, forming a plurality of food holding stations, each food holding station including a control and display screen of FIG. 18.

DETAILED DESCRIPTION

Figure 1:
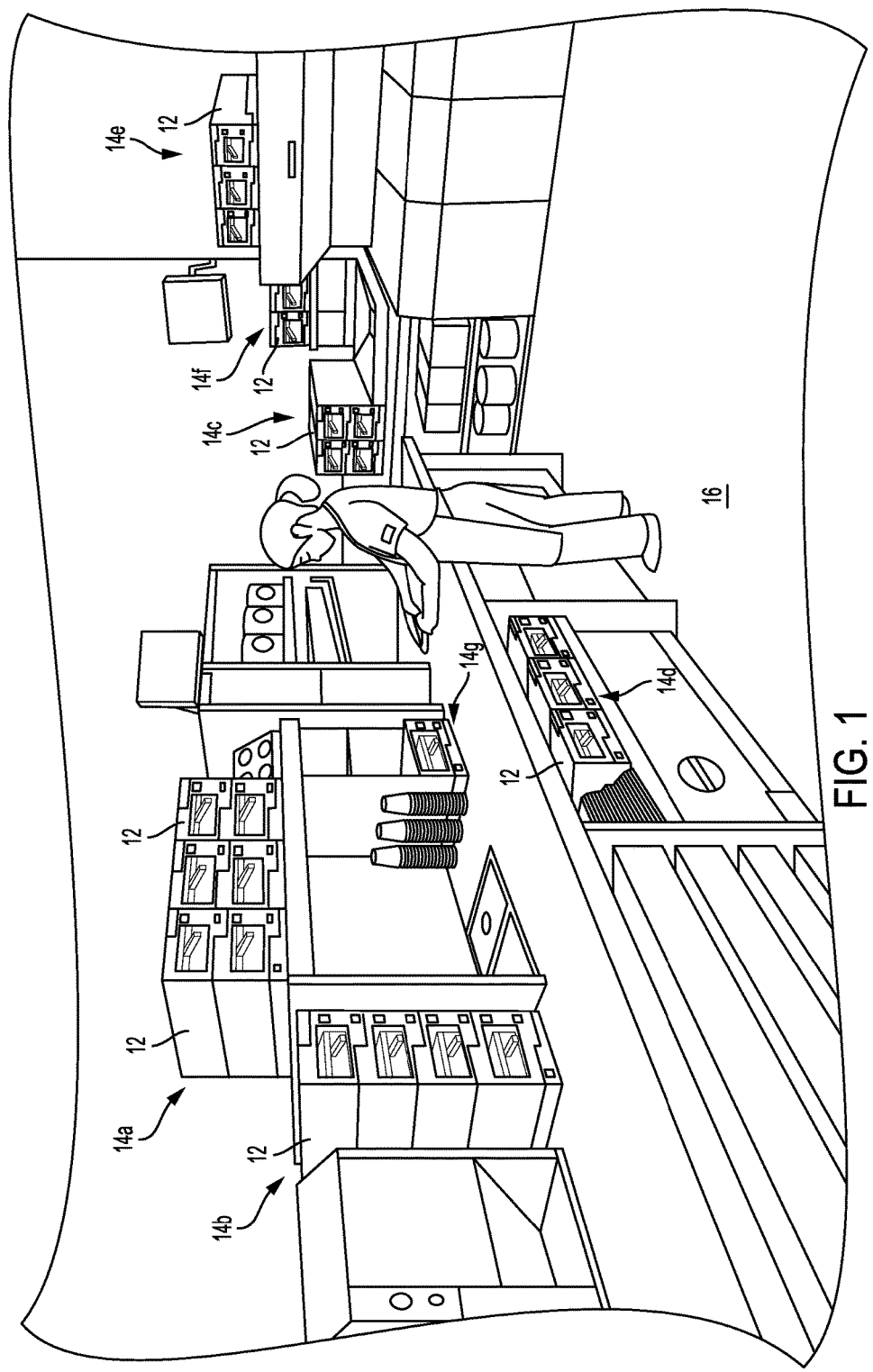
FIG. 1 is a perspective view of a modular food holding system.

Although the following text sets forth a detailed description of numerous different embodiments, it should be understood that the legal scope of the invention is defined by the words of the claims set forth at the end of this patent. The detailed description is to be construed as exemplary only and does not describe every possible embodiment, as describing every possible embodiment would be impractical, if not impossible. One could implement numerous alternate embodiments, using either current technology or technology developed after the filing date of this patent, which would still fall within the scope of the claims.

Unless a term is expressly defined in this patent using the sentence "As used herein, the term '_____' is hereby defined to mean . . . " or a similar sentence, there is no intent to limit the meaning of that term, either expressly or by implication, beyond its plain or ordinary meaning, and such term should not be interpreted to be limited in scope based on any statement made in any section of this patent (other than the language of the claims). To the extent that any term recited in the claims at the end of this patent is referred to in this patent in a manner consistent with a single meaning, that is done for sake of clarity only so as to not confuse the reader, and it is not intended that such claim term be limited, by implication or otherwise, to that single meaning. Finally, unless a claim element is defined by reciting the word "means" and a function without the recital of any structure, it is not intended that the scope of any claim element be interpreted based on the application of 35 U.S.C. § 112(f).

As used herein, the term "food holding system" is hereby defined to mean any system that is capable of holding food in a fully or partially prepared state and ready for immediate sale, consumption, or use. The term "food holding system" is further defined to include, without limitation, hot and cold food holding systems, such as, for example, ovens, toasters, radiant heaters, refrigerators, freezers, or any other type of heating or cooling device. Furthermore, the term "food holding system" is also defined to include, without limitation, passive temperature control devices such as insulated compartments.

As used herein, the term "communicatively" is hereby defined to mean that two elements are connected in such a way to enable communications to be passed from one element to another. The term "communicatively" is further defined to include, without limitation, electronic connections, such as wired or wireless connection, mechanical connections, pneumatic connections, hydraulic connection, or any other type of connection that allows communication signals to be passed between elements. The communication signals may include command and control signals, such as instructions, and the communication signals may include data transmissions, such as sensor data.

As used herein, the term "one-dimension at a time" is hereby defined to mean that relative movement between two structural elements (e.g., two chambers) is confined to a single plane. For example, relative movement may be limited to one of an X-plane, a Y-plane, or a Z-plane at a time in a Cartesian coordinate system. In other examples, relative movement may be limited to one of a vertical plane, a horizontal plane, or a lateral plane at a time. The term "one-dimension at a time" is hereby defined to include rotational relative movements as long as the movements are limited to a single plane at a time, for example pivoting of one structure relative to another structure.

The term "directly sensing" is hereby defined to mean detecting a characteristic of a head space of a food holding compartment, such as a food holding pan. The detected characteristic is hereby defined to include, without limitation, a temperature, a humidity, or a chemical composition of the headspace of the food holding compartment. A sensor that is used to directly sense the characteristic is in fluid communication with the headspace when the characteristic is humidity or chemical composition. However, the sensor may or may not be in fluid communication with the headspace when the characteristic is temperature or weight. For example, a temperature sensor may be located outside the headspace, while measuring a desired wavelength of light through a transparent cover that correlates with the temperature of the headspace. Similarly, a load sensor may be located in the food holding chamber (outside of the headspace), which measures a total weight of the food holding tray and the weight of the food within the food holding tray such that the weight of the food may be deduced by subtracting the known weight of the food holding tray from the total weight. Fluid communication includes placing the sensor directly within the headspace or removing a portion of the gases within the headspace and directing the removed gases to a sensor location that is not directly within the headspace, such that the humidity or chemical composition of the gases can be determined.

Turning now to FIG. 1, a modular food holding system 10 is illustrated that is constructed in accordance with the teachings of the disclosure. The modular food holding system 10 comprises a plurality of individual modularized food holding chambers 12. Two or more of the individual modularized food holding chambers 12 may be physically and communicatively connected with one another to form various food holding stations or food holding units 14. The food holding units 14 may be configured to optimize food holding capacity for a given area in the food preparation area, such as a kitchen 16. Where more capacity is needed, more individual modularized food holding chambers 12 may be connected together. For example, six individual food holding chambers 12 may be connected to form a 3×2 food holding unit 14*a* in a food preparation area. Similarly, four individual food holding chambers 12 may be connected to form a 4×1 food holding unit 14*b* near a toaster or to form a 2×2 food holding unit 14*c* near a fryer or grill station. Likewise, three individual food holding chambers 12 may be connected to form a 3×1 food holding unit 14*d*, 14*e*, under a preparation counter or over a fryer or grill, respectively. Along the same lines, two individual food holding chambers 12 may be connected to form a 2×1 food holding unit 14*f* above a salt station. Alternatively, a single individual food holding chamber 12 may form a food holding unit 14*g*, near a food preparation area. Each of the above identified food holding unit configurations is exemplary only and any number of individual food holding chambers 12 may be connected to form each food holding unit 14, depending on user needs.

Figure 2:
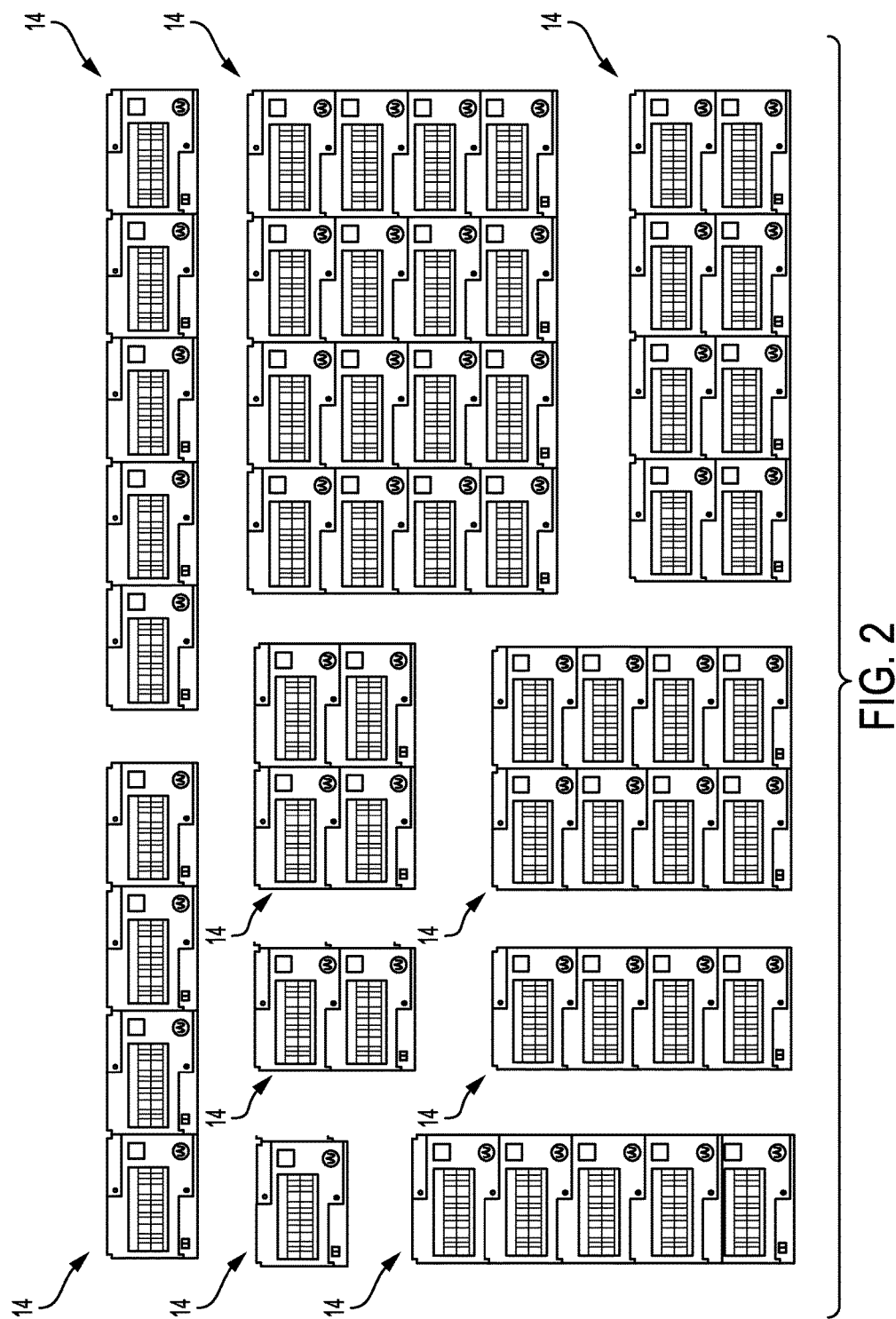
FIG. 2 is a plan view of the modular food holding system of FIG. 1 forming a plurality of reconfigurable modular chambers.

FIG. 2 illustrates additional exemplary configurations for the food holding units 14, anywhere between 1×1 to 4×4. Again, the configurations illustrated in FIG. 2 are intended to be exemplary only and are not intended to limit the food holding units 14 to the illustrated configurations. Furthermore, the food holding units 14 illustrated in FIG. 2 demonstrate the great flexibility of the food holding system 10 described herein. Some of the advantages to the disclosed food holding system 10 include configuration flexibility (due to the modular nature of the individual food holding chambers), ease of reconfiguration (which will be described further hereinafter), economy of space, and ease of operation.

Figure 3:
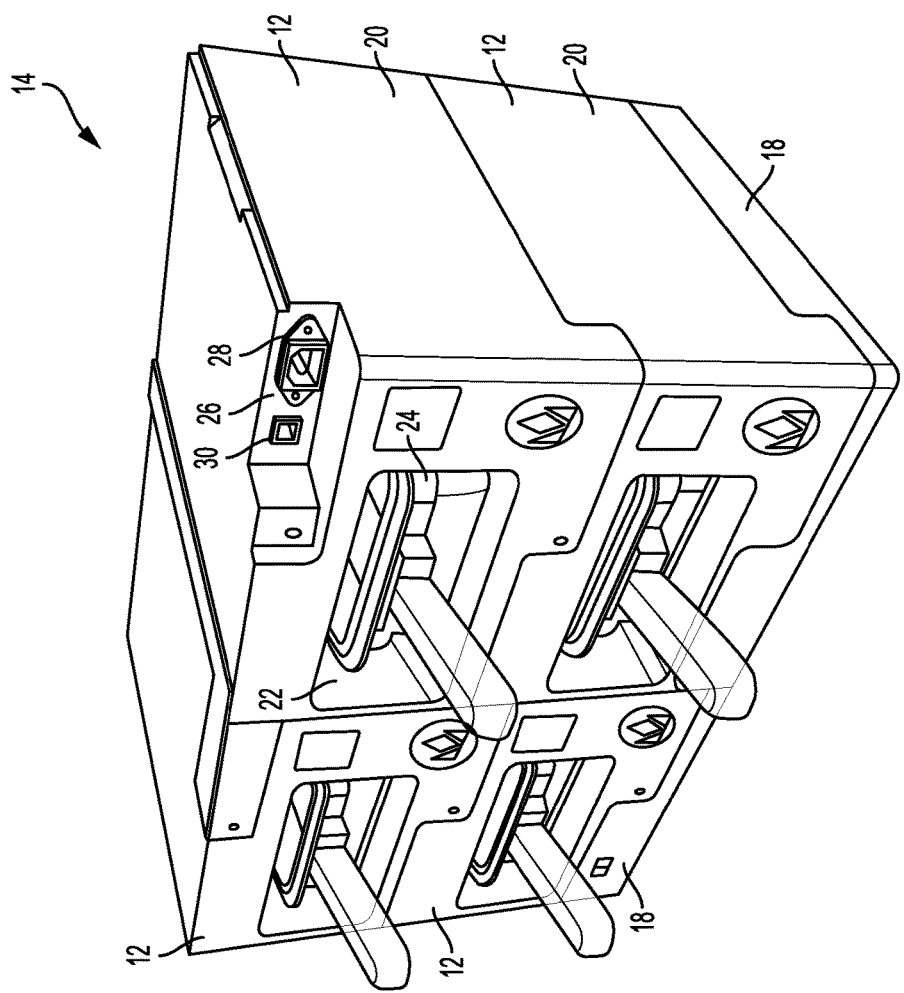
FIG. 3 is a close-up perspective view of the modular food holding system of FIG. 1 in a 2×2 configuration.
Figure 4:
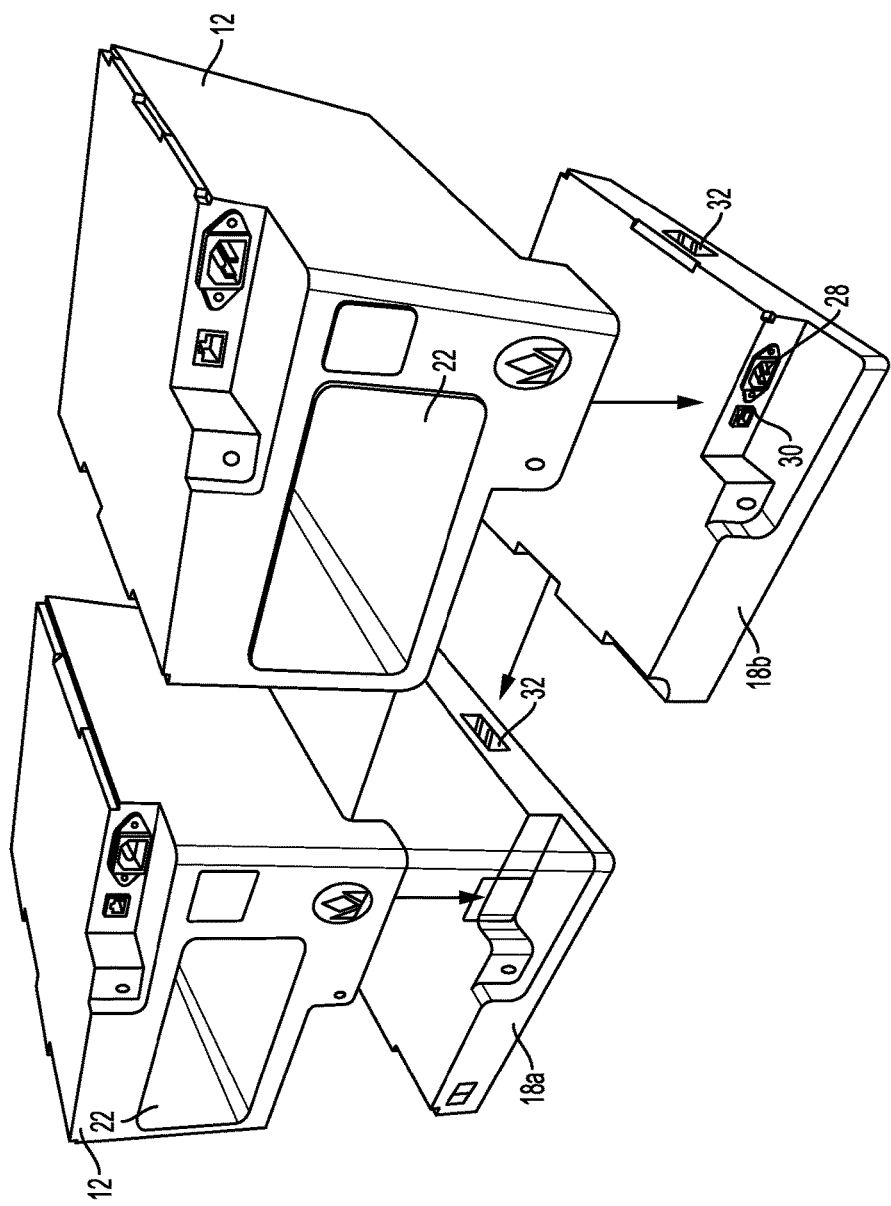
FIG. 4 is an exploded perspective view of two chambers of the modular food holding system of FIG. 1, including bases.

Each food holding unit 14 includes one or more individual food holding chambers 12 and one or more chamber bases 18, as illustrated in FIGS. 3 and 4. Each chamber base 18 is physically removably connected to one individual food holding chamber 12. Additionally, the chamber bases 18 may be connected to one another to provide passage of power and/or communication instructions from one chamber base 18 to another chamber base 18 and/or to one or more individual food holding chambers 12. Each individual food holding chamber 12 includes a housing 20 that includes a food holding cavity 22. The food holding cavity 22 may be formed as a blind cavity (having a single opening and an end wall), or as a through cavity (having an opening at either end). Regardless, each food holding cavity 22 is sized and shaped to receive a food holding tray 24. The food holding tray 24 may contain one or more food items that are to be maintained in holding conditions (e.g., temperature, humidity, etc.), until the food item is sold. Each individual food holding chamber 12 may include a power and communications recess 26 in the chamber housing 20. The power and communications recess 26 may include one or more ports, such as a power port 28 and a communications port 30, to facilitate transfer of power and communications between individual food holding chambers 12 and/or between an individual food holding chamber 12 and a chamber base 18. Similarly, each chamber base 18 may include a combined port, such as a power and communications port 32. Alternatively, or in addition to the power and communications port 32, the chamber base 18 may include separate power ports 28 and communication ports 30, similar to those of the individual food holding chambers 12. Optionally, one chamber base 18 may function as a master base 18*a* and the other chamber bases 18 in a food holding unit 14 may function as expansion bases 18*b*. The master base 18*a* may include connectivity to a controller of some sort, for example a touch screen controller that will be discussed further hereinafter. The expansion bases 18 then function as conduits for power and communications from the master base 18*a* to individual food holding chambers 12.

Figure 7:
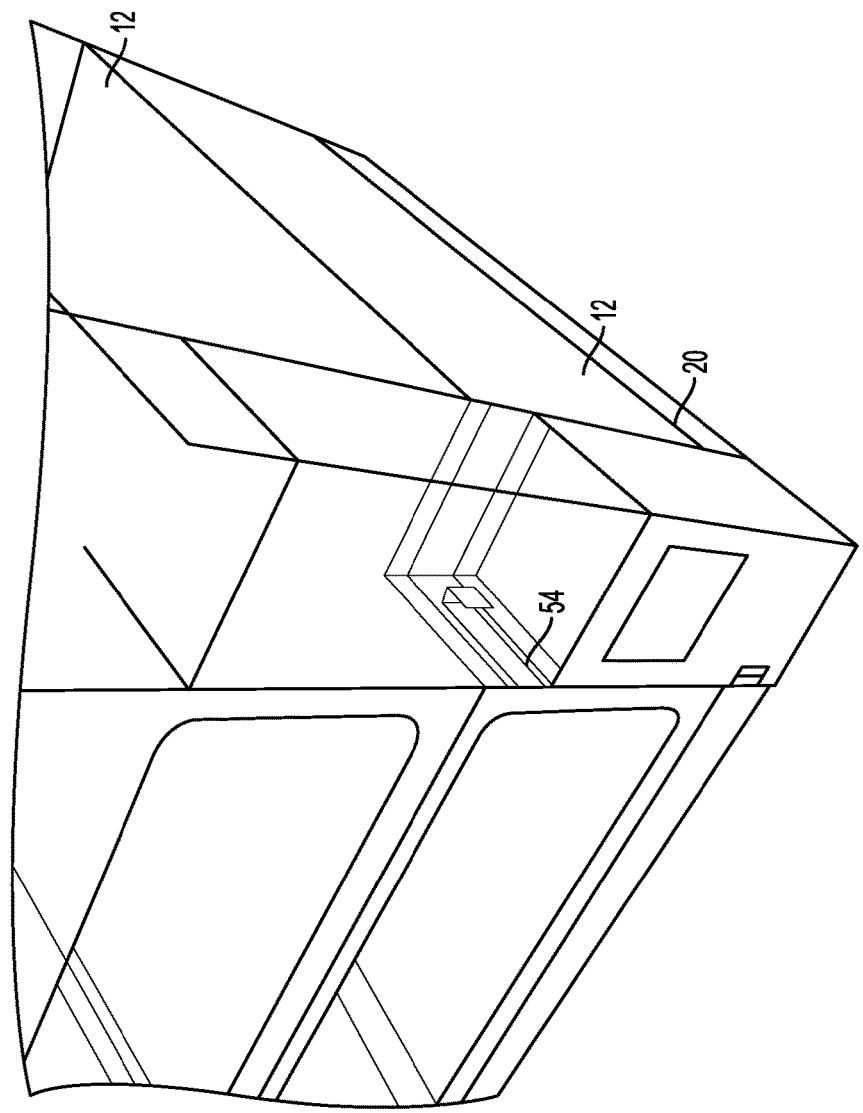
FIG. 7 is a close-up perspective view of a communications and power connection area of two chambers of FIG. 6 that are stacked and connected to one another.

Turning now to FIGS. 5-7, one example of a connection structure 33 for connecting two individual food holding chambers 12 to one another, or for connecting one individual food holding chamber 12 to a chamber base 18, will be described. Generally, the connection structure 33 of the embodiment described in FIGS. 5-7 is a tongue and groove type connection structure that limits relative movement between the two individual food holding chambers 12 to one dimension at a time.

As illustrated in FIGS. 5 and 6, the connection structure 33 includes a top groove 34 that is disposed along a top edge 36 of the food chamber housing 20 at each side of the food chamber housing 20. The top groove 34 may include an opening 38 and one or more downturned tabs 40, the downturned tabs 40 extending into the top groove 34 from a top rail 42 that defines one side of the top groove 34. The top rail 42 may include a first top rail 42*a* and a second top rail 14*b* that are separated by the opening 38.

The bottom of the food chamber housing 20 includes complementary connection structure. More specifically, the bottom of the food chamber housing 20 includes a bottom groove 44 that is disposed along a bottom edge 46 of the food chamber housing 20. The bottom groove 44 may include one or more upturned tabs 48 that extend upward into the bottom groove 44 from a bottom rail 50 that defines one side of the bottom groove 44. The bottom groove 44 may include an opening 52 that separates a first bottom rail 50*a* and a second bottom rail 50*b*.

Turning now to FIG. 7, a locking mechanism, such as a locking tab 54 may be disposed in the food chamber housing 20 to secure one individual food chamber housing 12 to another individual food chamber housing 12 by preventing relative movement in one dimension, for example movement of a top food chamber housing 12 forward relative to a bottom food chamber housing 12.

Similar connection structure 33 may be disposed on a top edge of the chamber base 18 to allow connection between the chamber base 18 and the individual food holding chamber 12.

Figure 8C:
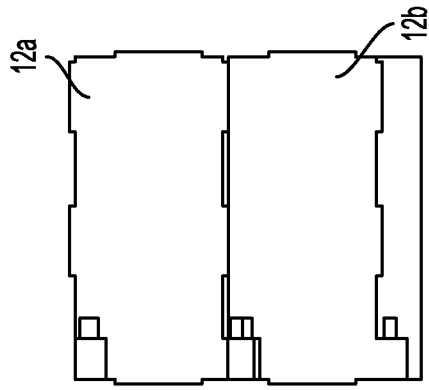
FIG. 8C is a schematic representation of the two chambers of FIG. 8B in a fully connected configuration where the housings of the two chambers are fully physically connected and one or more of a power connection and a control communications connection is also fully connected.
Figure 8B:
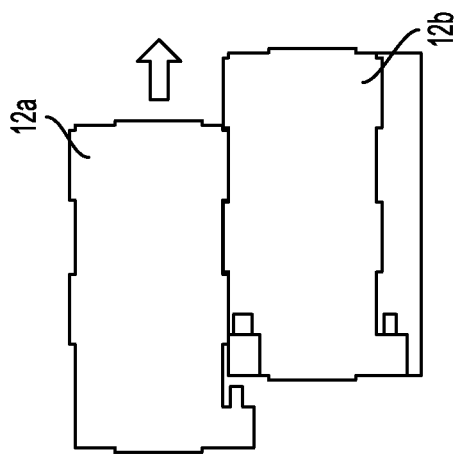
FIG. 8B is a side schematic representation of the two chambers of FIG. 8A in an intermediate connection configuration where housings of the two chambers are partially physically connected.
Figure 8A:
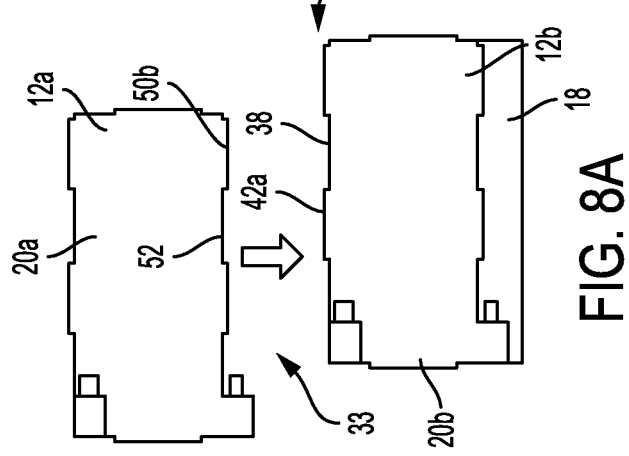
FIG. 8A is a side schematic representation of two chambers of FIG. 4 in a pre-connection configuration where the two chambers are separated from one another.

Turning now to FIGS. 8A-8C, assembly of two individual food holding chambers 12 with on another will be described. A first individual food holding chamber 12*a* may be placed above a second individual food holding chamber 12*b*, as illustrated in FIG. 8A. The opening in the bottom rail 52 of the first individual food holding chamber 12*a* may be aligned with the first top rail 42*a* in the second individual food holding chamber 12*b*. Similarly, the opening in the top rail 38 of the second individual food holding chamber 12*b* may be aligned with the second bottom rail 50*b* of the first individual food holding chamber 12*a*. In other words, the food chamber housing 20*a* of the first individual food holding chamber 12*a* may be aligned, but longitudinally offset towards a front side and above from the food chamber housing 20*b* of the second individual food holding chamber 12*b*. As the first individual food holding chamber 12*a* is brought towards the second individual food holding chamber 12*b*, as illustrated in FIG. 8B, the top rails 42 of the second individual food holding chamber 12*b* engage the bottom groove 44 of the first individual food holding chamber 12*a* and the bottom rails 50 of the first individual food holding chamber 12*b* engage the top groove 34 of the first individual food holding chamber 12*a*. Thereafter, the first individual food holding chamber 12*a* slides longitudinally relative to the second individual food holding chamber 12*b*, as illustrated in FIG. 8C, until the downturned tabs 40 of the first individual food holding chamber 12*a* engage the upturned tabs 48 of the second individual food holding chamber 12*b*, which stops relative longitudinal movement between the two individual food holding chambers 12. The connection structure restricts further movement between the two individual food holding chambers 12 to a single dimension (e.g., forward for the first individual food holding chamber 12*b* in FIG. 8C relative to the second individual food holding chamber 12*b*). The locking tab 54 of FIG. 7 may further restrict relative movement in the single direction until a user would like to uncouple the two individual food holding chambers 12 in which case, the locking tab 54 is actuated and the reverse of the above described process is executed to separate the two individual food holding chambers 12.

A similar procedure may be used to assemble one individual food holding chamber 12 to a chamber base 18.

Returning now to FIGS. 5 and 6, a power and communications recess 56 is disposed in the top of the food chamber housing 20. A power and communications block 58 may be similarly disposed in the bottom of the food chamber housing 20. The power and communications recess 56 may include a power port 60 and a communications port 62 for connecting power and communications between individual food holding chambers 12 and/or between an individual food holding chamber 12 and the chamber base 18. A locking protrusion 64 may extend from one side of the power and communications recess 56, the locking protrusion 64 interacting with the locking tab 54 of FIG. 7.

The power and communications block 58 may include a power plug 66 and a communications plug 68. The power plug 66 is inserted into the power port 60, and the communications plug 68 is inserted into the communications port 62, during coupling of a first individual food holding chamber 12 to a second individual food holding chamber 12, as described above. In this way, power and communications are provided to every individual food holding chamber 12 in a food holding unit 14 automatically by virtue of simply physically connecting one individual food holding chamber 12 to another and/or to a chamber base 18. In the embodiment of FIGS. 5 and 6, female connectors are illustrated for the power port 60 and the communications port 62 and male connectors are illustrated for the power plug 66 and the communications plug 68. In other embodiments, the male connectors may be disposed in the power and communications recess 56 and the female connectors may be disposed in the power and communications block 58.

Turning now to FIGS. 9A-15B, several alternative embodiments of connection structure 33 are illustrated that may be used to connect one individual food holding chamber 12 to another and/or to a chamber base 18.

Figure 9B:
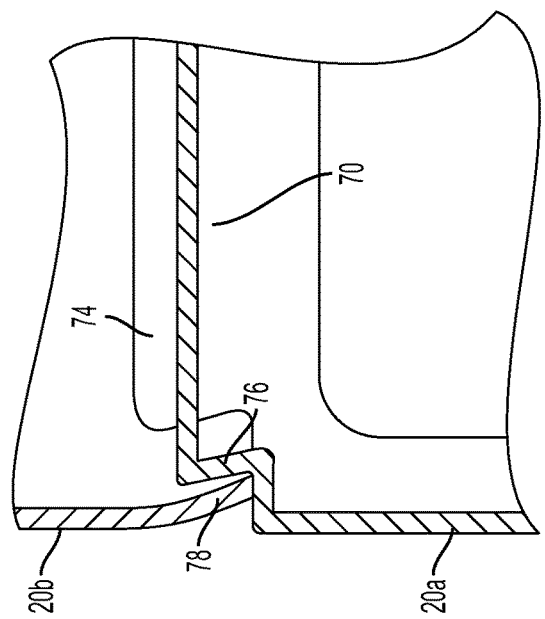
FIG. 9B is a close-up sectional view of securing portions of the two chambers of FIG. 9A.
Figure 9A:
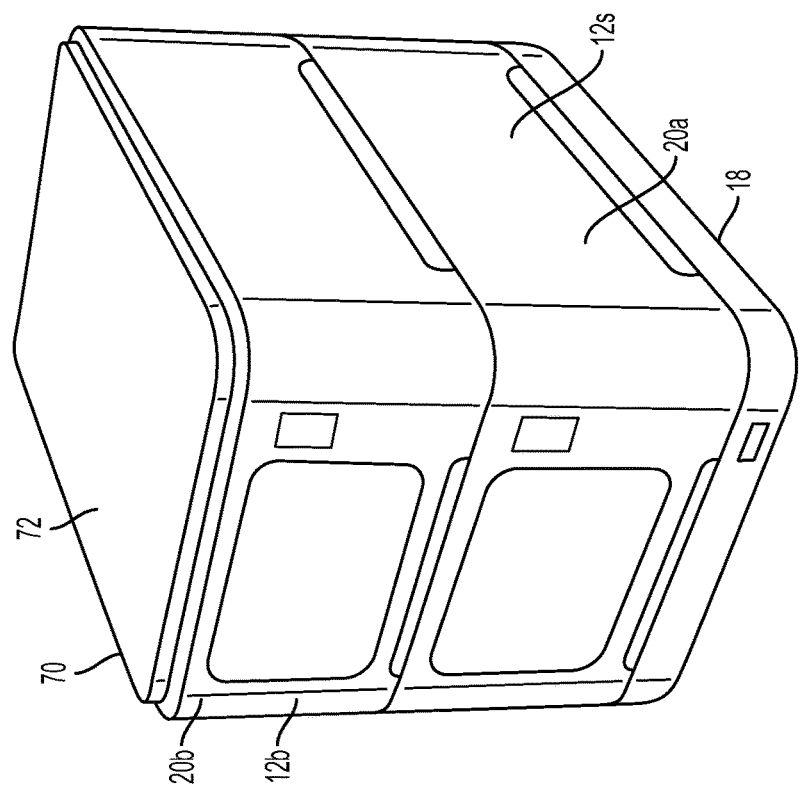
FIG. 9A is a perspective view of yet another alternative embodiment of two chambers of the modular food holding system of FIG. 1.

FIGS. 9A and 9B illustrate a connection structure 33 comprising a raised plateau 70 on an upper surface 72 of the food chamber housing 20*a* of a first individual food holding chamber 12*a* that fits within a recess 74 formed on a bottom of the food chamber housing 20*b* of a second food holding chamber 12*b*. The raised plateau 70 may include an angled side surface 76 that allows a side wall extension 78 on the bottom of the second individual food holding chamber 12*b* to grab the raised plateau 70 to secure the second individual food holding chamber 12*b* to the first individual food holding chamber 12*a*. A similar connection structure 33 may be used to secure a first individual food holding chamber 12 to a chamber base 18.

FIGS. 10A and 10B illustrate another embodiment of a connection structure 33 comprising a securing latch 80. The securing latch 80 may be attached to the second individual food holding chamber 12*b* near a bottom surface of the food chamber housing 20*b*. The securing latch 80 may be pivotably attached to the food chamber housing 20*b*. The securing latch 80 may include a hook 82 at one end and a release tab 84 at another end. A locking recess 86 is disposed near a top of the food chamber housing 20*b* and a release recess 88 is disposed near a bottom of the food chamber housing 20*a*. A locking ledge 90 is formed above the locking recess 86. When a first individual food holding chamber 12*a* is attached to a second individual food holding chamber 12*b*, the hook 82 fits into the locking recess 88 and prevents separation of the first individual food holding chamber 12*a* and the second individual food holding chamber 12*b* by hooking onto the locking ledge 90. To release the latch, a user pushes on the release tab 84 and the securing latch 80 pivots to remove the hook 82 from the locking recess 88. A similar connection structure 33 may be used to secure a first individual food holding chamber 12 to a chamber base 18.

Figure 11B:
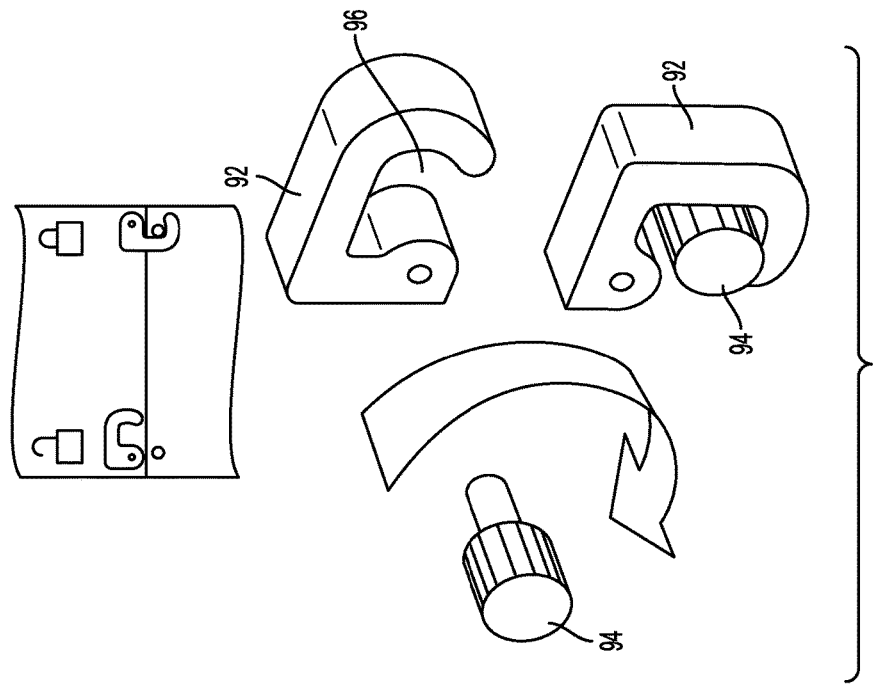
FIG. 11B is a close-up sectional view of securing portions of the two chambers of FIG. 11A.
Figure 11A:
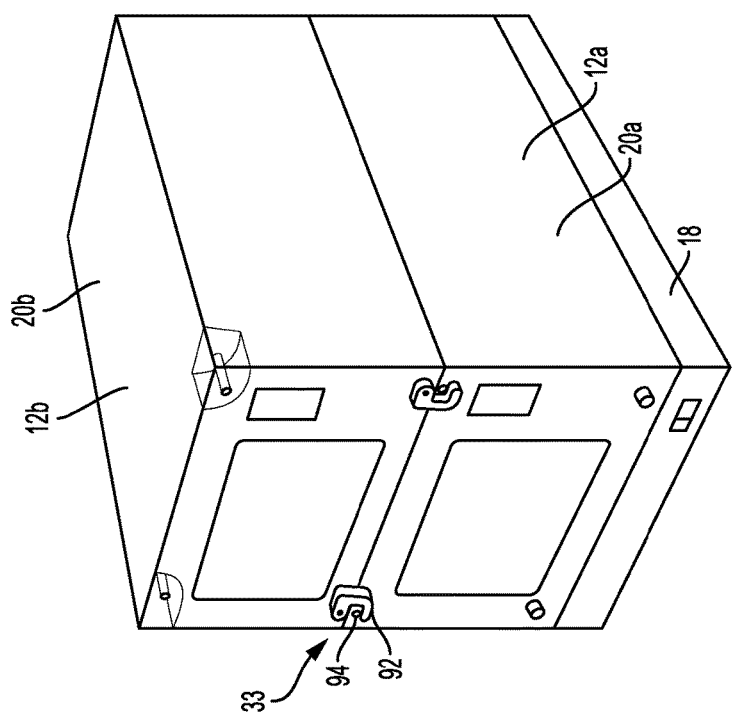
FIG. 11A is a perspective view of yet another alternative embodiment of two chambers of the modular food holding system of FIG. 1.

FIGS. 11A and 11B illustrate yet another embodiment of a connection structure 33 comprising a securing hook 92 and a pin 94. The securing hook 92 is pivotably mounted to a front, side, or rear surface of the food chamber housing 20*b*. The pin 94 is attached to a front, side, or rear surface of the food chamber housing 20*a*. In other embodiments, the securing hook 92 and the pin 94 may be reversed. When the second individual food holding chamber 12*b* is stacked on the first individual food holding chamber 12*a*, the securing hook 92 may engage the pin 94 to prevent relative movement between the first individual food holding chamber 12*a* and the second individual food holding chamber 12*b*. In a locked or secured position, the securing hook 92 is pivoted so that a recess 96 at least partially surrounds the pin 94. To separate the first individual food holding chamber 12*a* from the second individual food holding chamber 12*b*, the securing hook 92 is rotated so that the pin 94 is no longer surrounded by the recess 96. A similar connection structure 33 may be used to secure a first individual food holding chamber 12 to a chamber base 18.

Figure 12B:
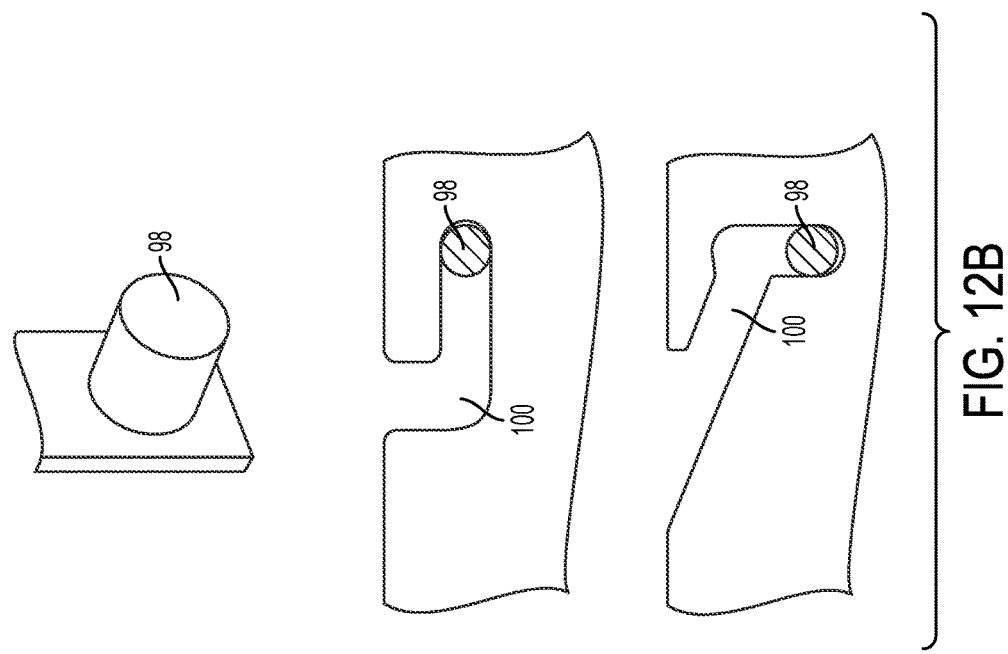
FIG. 12B is a close-up sectional view of securing portions of the two chambers of FIG. 12A.
Figure 12A:
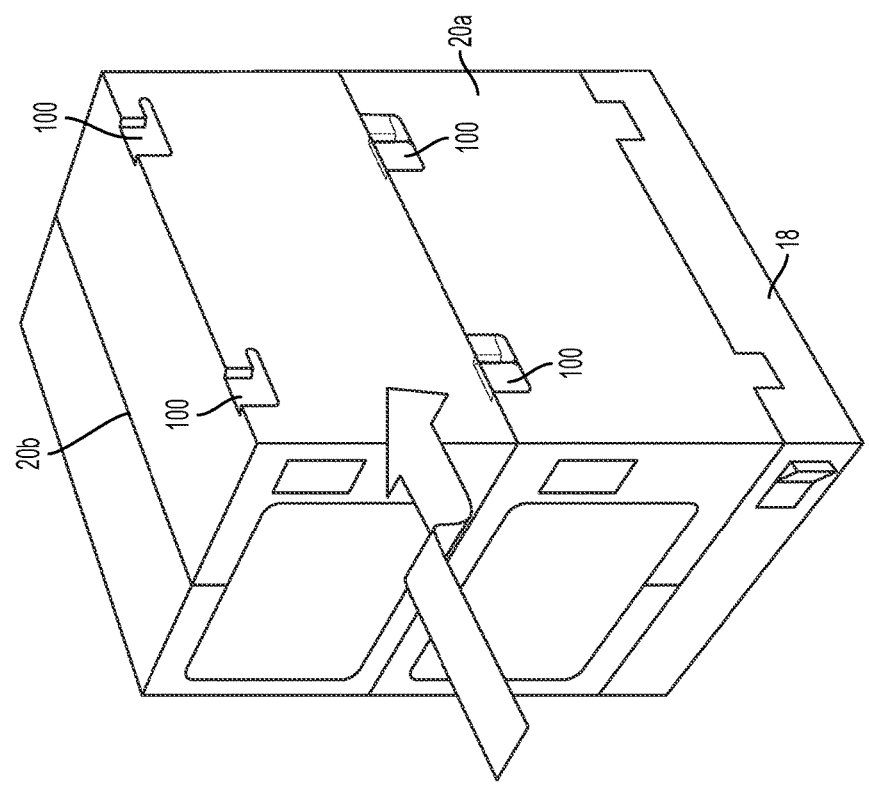
FIG. 12A is a perspective view of yet another alternative embodiment of two chambers of the modular food holding system of FIG. 1.

FIGS. 12A and 12B illustrate yet another embodiment of a connection structure 33 comprising a bayonet pin 98 and a key-way 100. One or more bayonet pins 98 may be formed near a bottom of the individual food holding chamber 12. The key-way 100 may be formed near a top of the individual food holding chamber 12. To connect the two individual food holding chambers 12, the bayonet pin 98 of the second individual food holding chamber 12*b* may be inserted into the key-way 100 of the first individual food holding chamber 12*a*. The key-way 100 may guide the bayonet pin 98 into a position that correctly seats the second individual food holding chamber 12*b* on the first individual food holding chamber 12*a*. A similar connection structure 33 may be used to secure a first individual food holding chamber 12 to a chamber base 18.

Figure 13B:
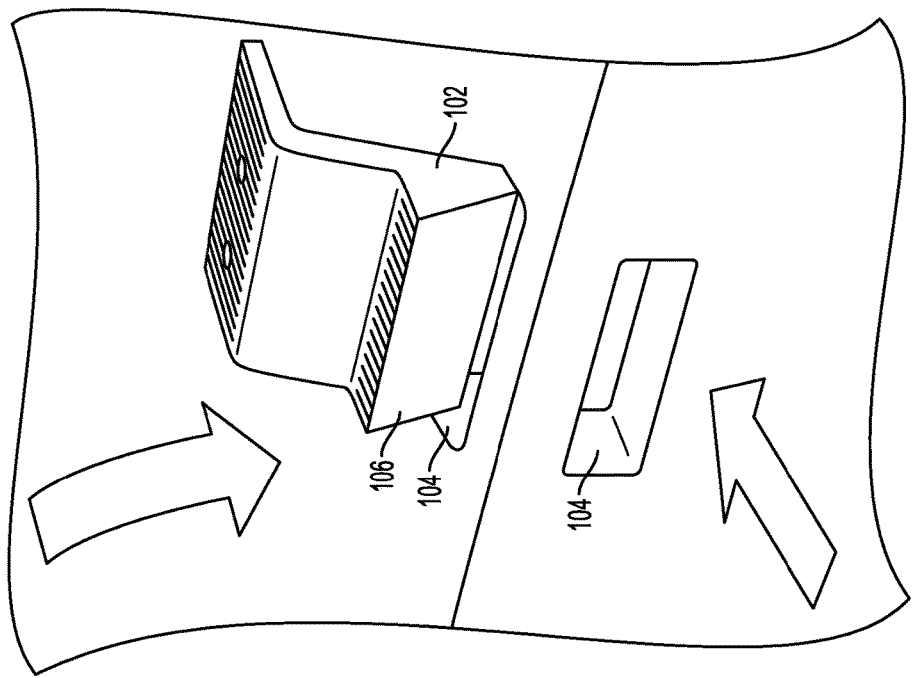
FIG. 13B is a close-up view of securing portions of the two chambers of FIG. 13A.
Figure 13A:
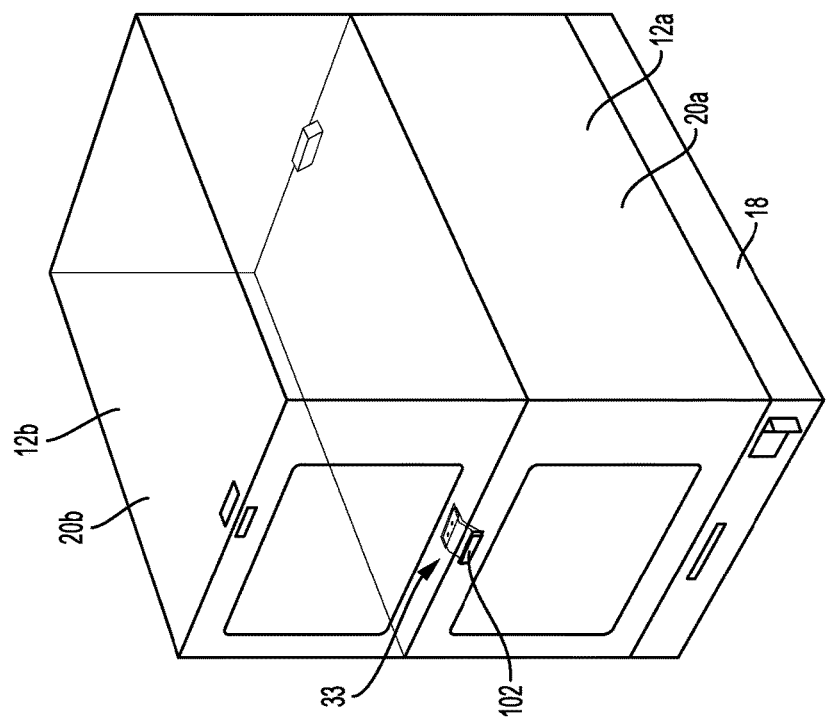
FIG. 13A is a perspective view of yet another alternative embodiment of two chambers of the modular food holding system of FIG. 1.

FIGS. 13A and 13B illustrate yet another embodiment of a connection structure 33 comprising a flexible latch 102 and a locking channel 104. The flexible latch 102 is attached to the front, side, or back of the food chamber housing 20. A locking channel 104 is also formed in the front, side, or back of the food chamber housing 20. The locking channel 104 is arranged so that the flexible latch 102 fits within the locking channel 104 when the second individual food holding chamber 12*b* is attached to the first individual food holding chamber 12*a*. An angled front surface 106 of the flexible latch 102 facilitates deflection of the flexible latch 102 as the flexible latch 102 is pushed into the locking channel 104. A similar connection structure 33 may be used to secure a first individual food holding chamber 12 to a chamber base 18.

Figure 14B:
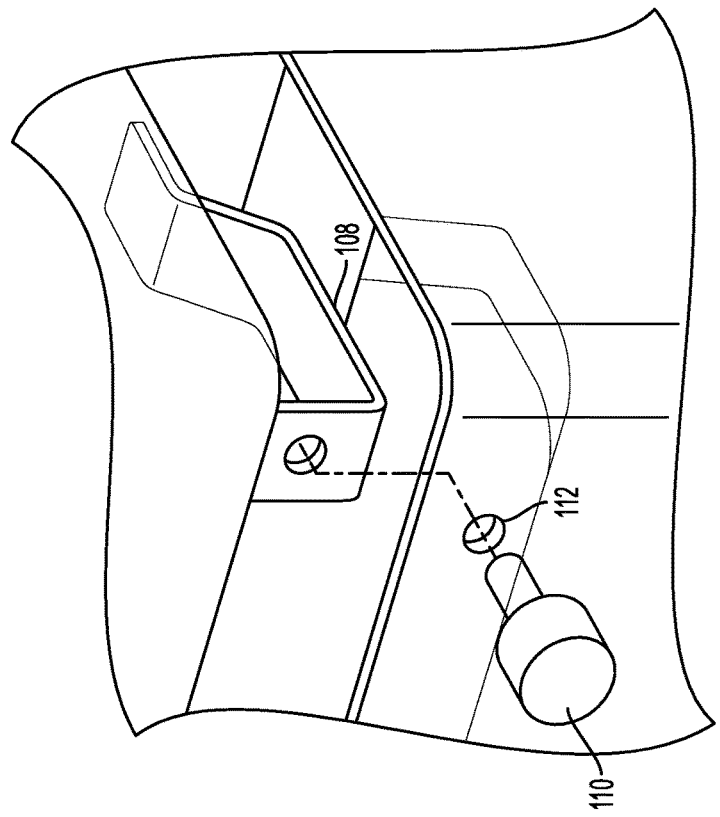
FIG. 14B is a close-up view of securing portions of the two chambers of FIG. 14A.
Figure 14A:
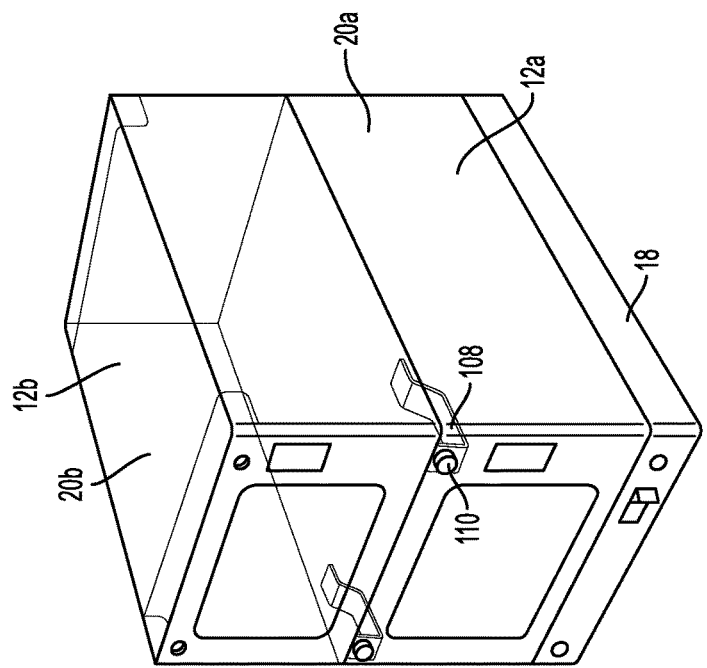
FIG. 14A is a perspective view of yet another alternative embodiment of two chambers of the modular food holding system of FIG. 1.

FIGS. 14A and 14B illustrate yet another embodiment of a connection structure 33 comprising a securing leg 108 and a securing fastener 110. The securing leg 108 may be disposed on a bottom of the food chamber housing 20. The securing leg 108 may fit within a recess on the top of the food chamber housing 20. A fastener opening 112 may be formed in the food chamber housing 20 to allow the securing fastener 110 to pass through the food chamber housing 20 and into the securing leg 108. A similar connection structure 33 may be used to secure a first individual food holding chamber 12 to a chamber base 18.

FIGS. 15A and 15B illustrate yet another embodiment of a connection structure 33 comprising a locking strap 114 and one or more locking brackets 116. The locking brackets 116 are attached to a bottom of the food chamber housing 20. The locking brackets 116 are disposed within a recess 118 in the upper surface of another food chamber housing 20 when the second individual food holding chamber 20b is stacked on the first individual food holding chamber 12a. An opening 118 in the front of the food chamber housing 120 allows the locking strap 114 to pass through the front of the food chamber housing 20 and through the locking brackets 116 to secure the second individual food holding chamber 12b to the first individual food holding chamber 12a. A similar connection structure 33 may be used to secure a first individual food holding chamber 12 to a chamber base 18.

Figure 16B:
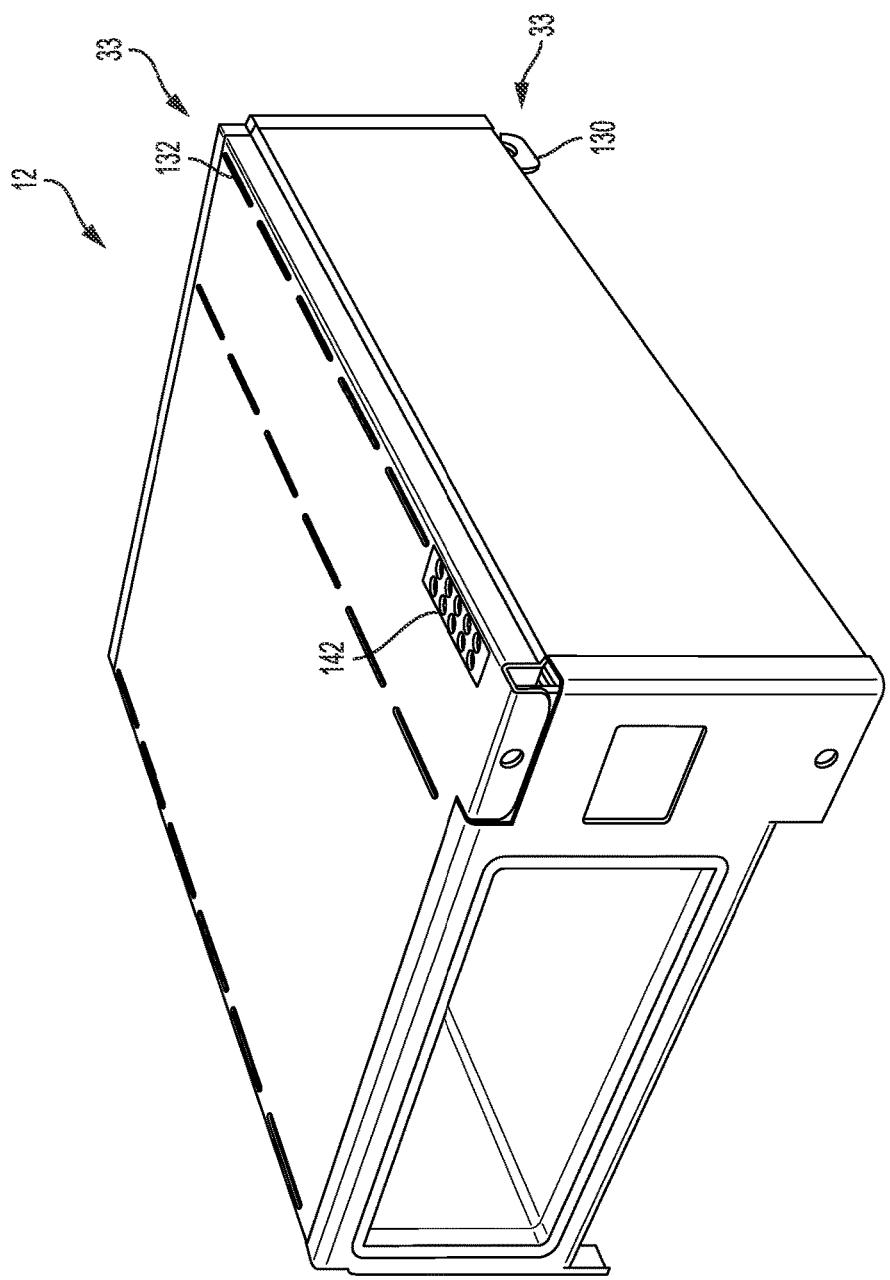
FIG. 16B is a perspective view of an outer casing of the embodiment of FIG. 16A.
Figure 16D:
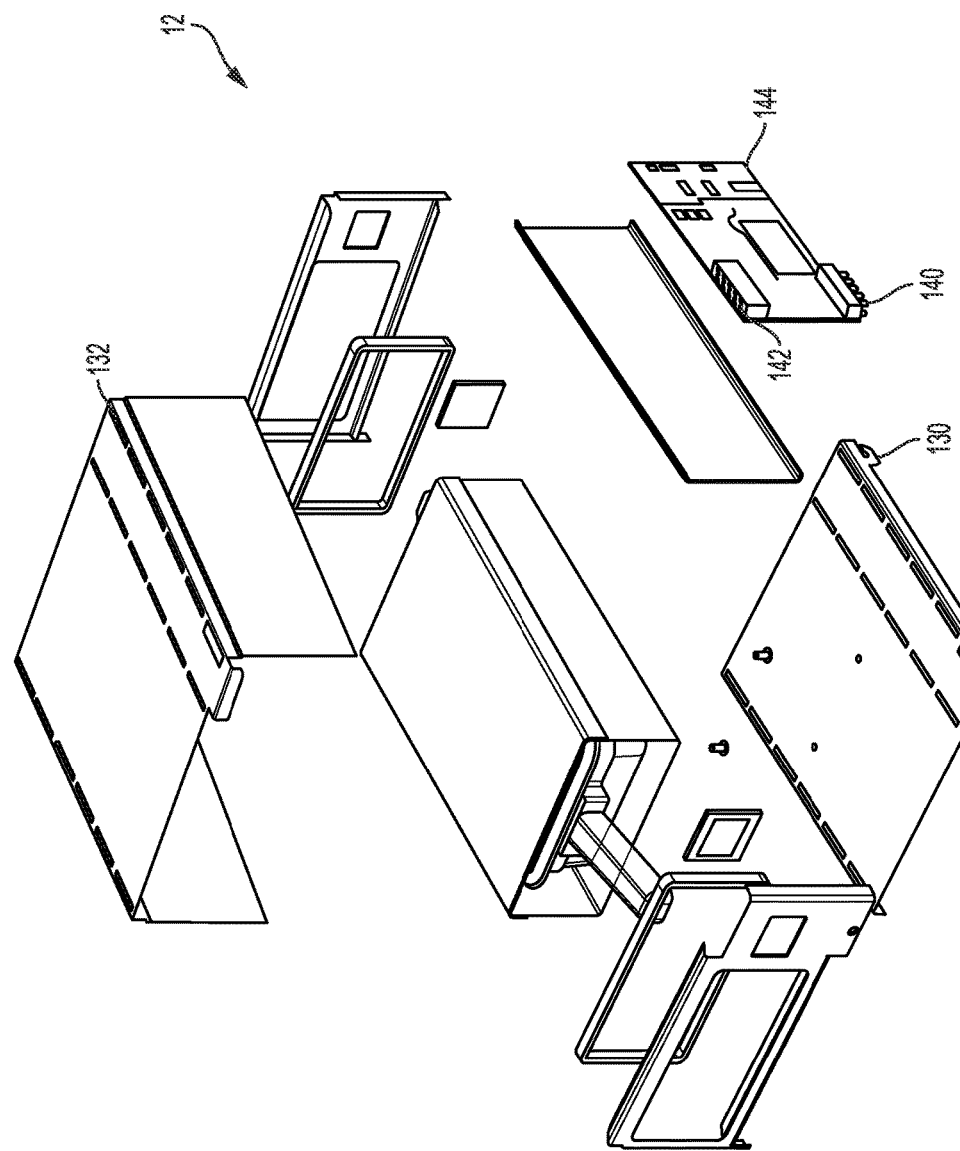
FIG. 16D is an exploded perspective view of the embodiment of FIGS. 16A-16C.
Figure 16E:
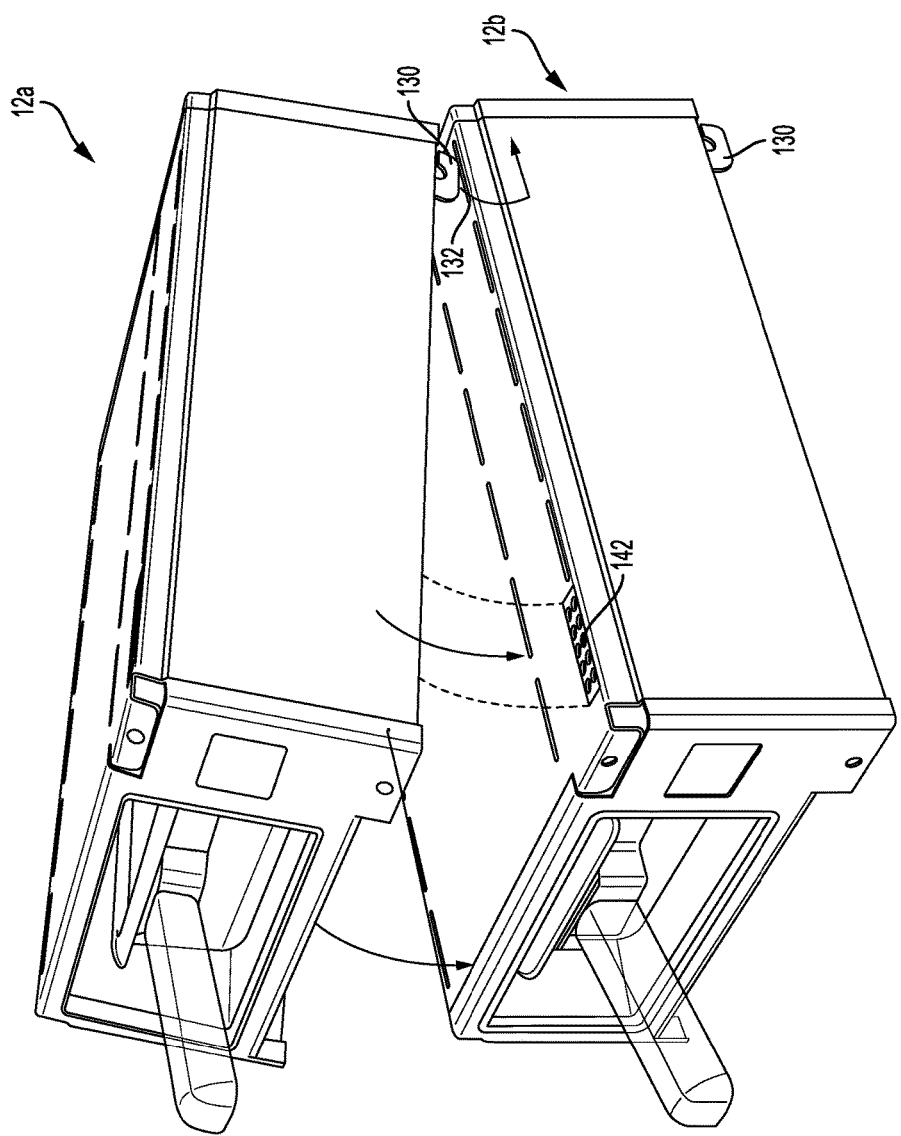
FIG. 16E is a perspective view of two chambers of the embodiment of FIGS. 16A-16C in the process of connecting to one another.
Figure 16F:
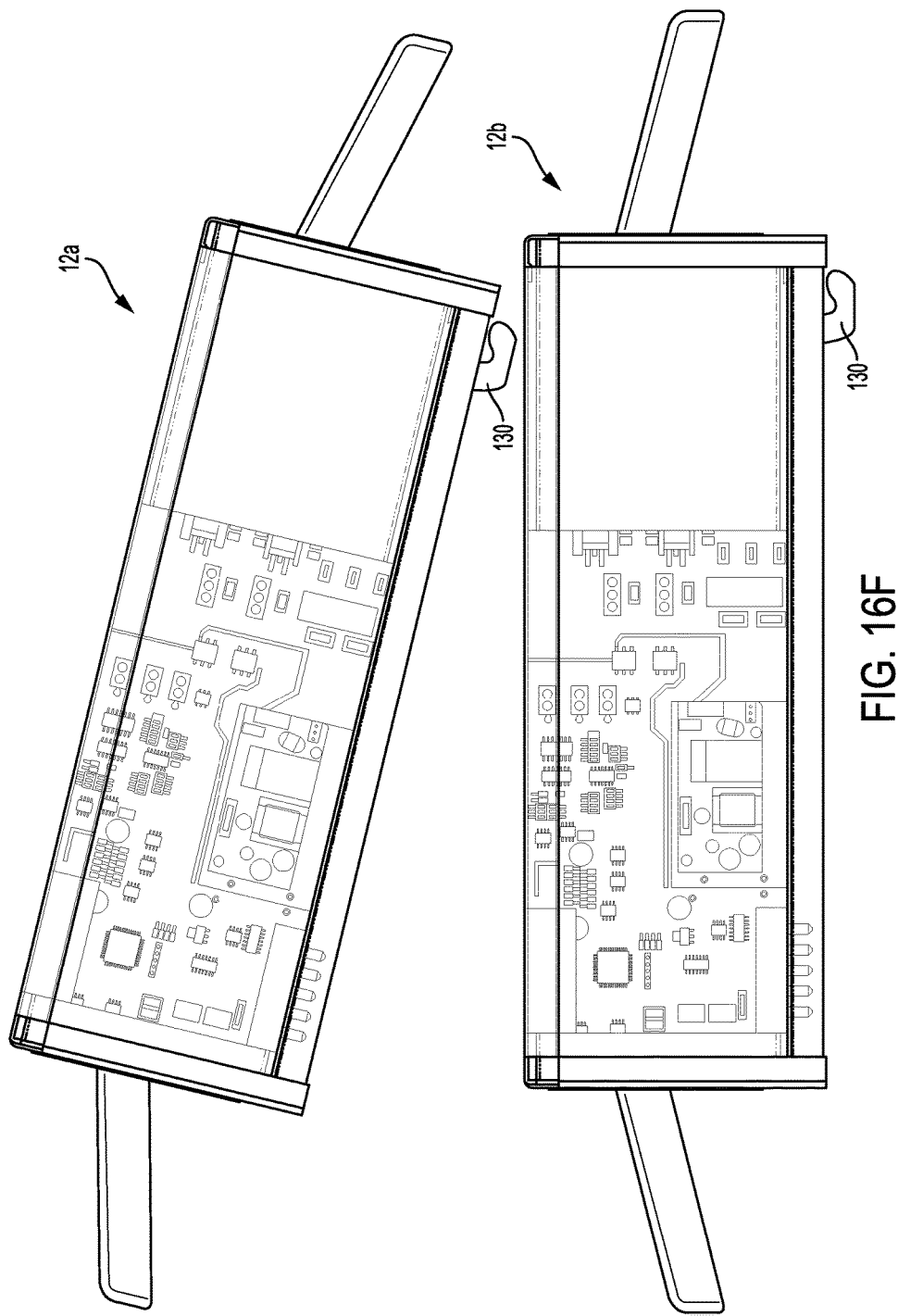
FIG. 16F is a side view of the two chambers of FIG. 16E in a partially connected state.

FIGS. 16A-16G illustrate yet another embodiment of a food holding chamber 12 and a connection structure 33. In the embodiment of FIGS. 16A-16G, the connection structure 33 includes a hook 130 (FIGS. 16B-16G) located on a bottom of the chamber 12. The connection structure 33 also includes a plurality of slots 132 formed in a top surface of the chamber 12. As illustrated in FIGS. 16E-16G, the assembly process includes lowering a top chamber 12a towards a bottom chamber 12b in a single dimension at a time (e.g., vertically) until the hook 130 enters one slot 132. Once the hook 130 is disposed in the slot 132, a front portion of the top chamber 12a is rotated in a single plane (e.g., vertically downward) until the top chamber 12a is longitudinally aligned with the bottom chamber 12b.

Towards the end of the connection process, as the bottom of the top chamber 12a approaches the top of the bottom chamber 12b, an electrical connection is formed when a male electrical connector 140 on the top chamber 12a mates with a female electrical connector 142 on the bottom chamber 12b. The electrical connection (e.g., the connection between the male electrical connector 140 and the female electrical connector 142) is capable of transmitting both power and electrical communications between the top chamber 12a and the bottom chamber 12b. In other embodiments, the male and female connectors may be reversed so that the male electrical connector is on the top of the chamber and the female electrical connector is on the bottom of the chamber. This embodiment is particularly useful in positioning the electrical connectors 140, 142 on adjacent stacked food holding chambers relative to one another before completing the electrical connections.

Returning to FIG. 16A, the male electrical connector 140 and the female electrical connector 142 may be integrated with a control circuit board 144 in this embodiment to reduce the amount of wiring required. The control circuit board 144 controls operation of the food holding chamber 12. However, the control circuit board 144 receives instructions in the form of an assembly file from a chamber base, as will be discussed further hereinafter. For example, the control circuit board 144 may control operation of heating or cooling elements within the chamber 12 to maintain a desired temperature, while the desired temperature is communicated from the chamber base as an assembly file.

Figure 17B:
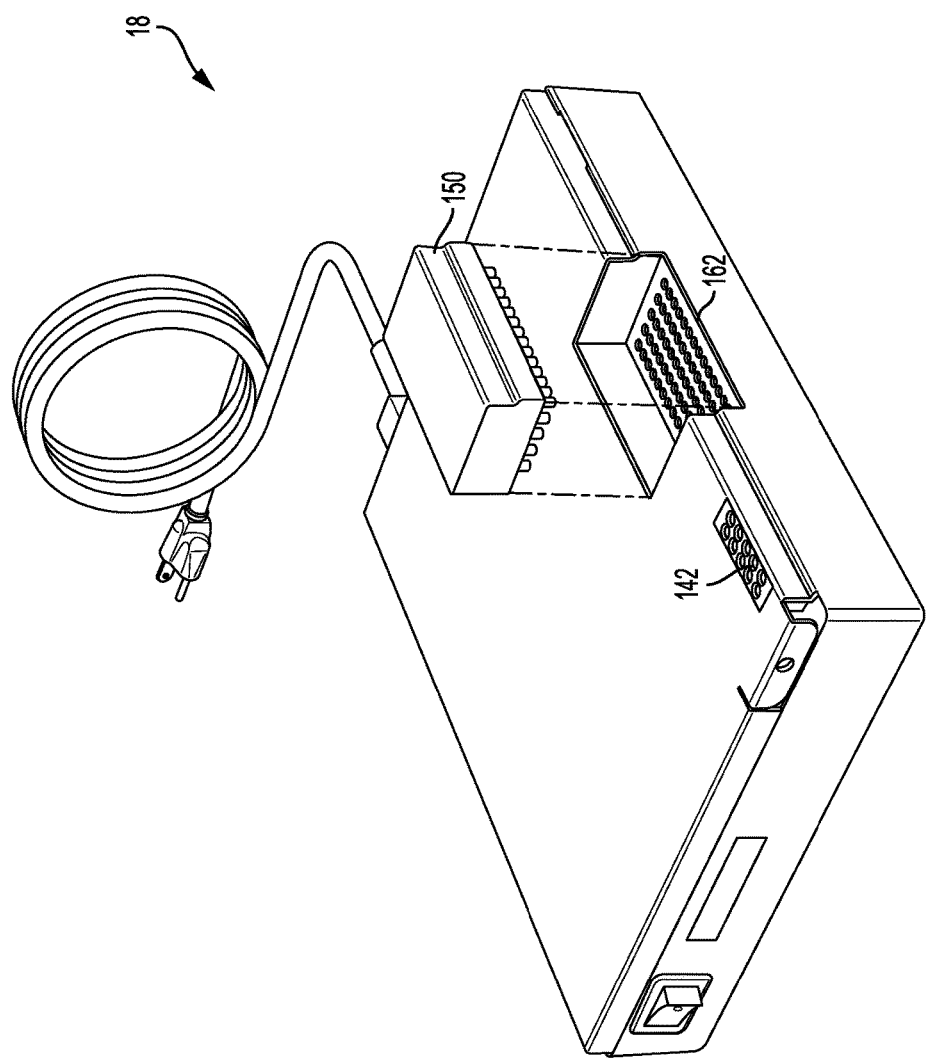
FIG. 17B is a perspective view of the base of FIG. 17A, including a block-off plug.
Figure 17C:
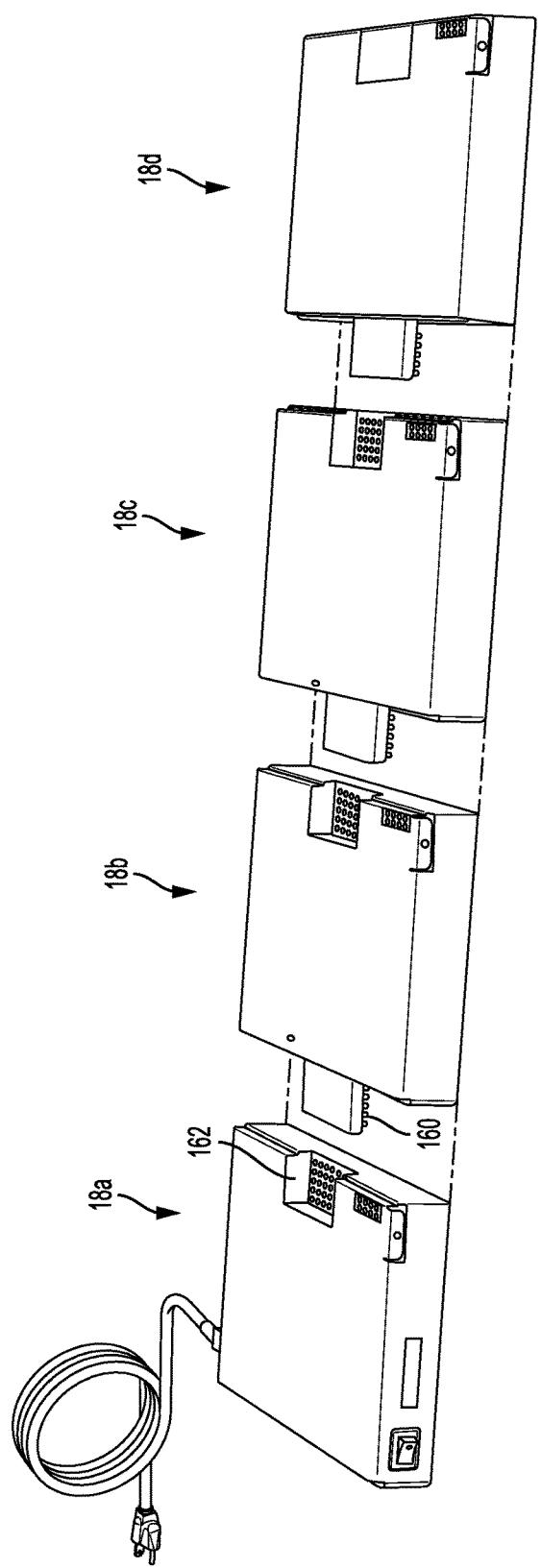
FIG. 17C is a perspective view of the base of FIG. 17A, including a plurality of slave bases aligned and in position for connection.

FIGS. 17A-17C illustrate yet another embodiment of a chamber base 18. The embodiment of FIGS. 17A-17C may include a first female electrical connector 142 on a top surface and second female connector 162 located in a recess separated from the first female electrical connector 142. In other embodiments, the electrical connectors may take the form of male electrical connectors. Both the first and second female electrical connectors 142, 162 are capable of transmitting both power and electrical communication signals from the chamber base 12 (in this case a master base) to food holding chambers 12 or to other chamber bases (e.g., slave bases). In some embodiments, a block-off plug 150 may be used to cover the second female electrical connector 162 when no other chamber bases are needed. The chamber base 18 (e.g., a master chamber base 18a) may be connected to other chamber bases 18 (e.g., slave chamber bases 18b-18d) as illustrated in FIG. 17C where a male electrical connector 160 on a slave base 18b connects with the female electrical connector 162 on the master base 18a.

FIGS. 18-33 illustrate several embodiments of a control screen 590 that may be used to enter instructions into the chamber base 18 and/or to display information pertaining to the food holding chambers from the chamber base 18 and the food holding chambers 12. In a first embodiment, which is illustrated in FIGS. 18-25, the control screen 590 may be removably attached to the chamber base 18. The control screen 590 displays control functions for the food holding chambers, such as temperatures and humidity levels, and configuration information for the food holding unit 14. For example, the control screen 590 may display a schematic representation 591 of the food holding unit 14 (in the example illustrated in FIG. 19, the food holding unit 14 is a 2×2 matrix of food holding chambers 12). The schematic representation 591 includes symbolic illustrations of the types of food disposed in each of the food holding chambers. For example, a first food holding chamber 12a may include a schematic representation illustrating a chicken item, a second food holding chamber 12b may include a schematic representation illustrating a burger patty, a third food holding chamber 12c may include a schematic representation illustrating a desert item, such as cake, and a fourth food holding chamber 12d may include a schematic representation illustrating onion rings. The food items illustrated in FIG. 19 are for illustration purposes only and virtually any food item may be located in any of the food holding chambers 12a-d. A user may select any one of the food holding chambers 12a-d by simply touching the symbolic representation of the food item.

Figure 20B:
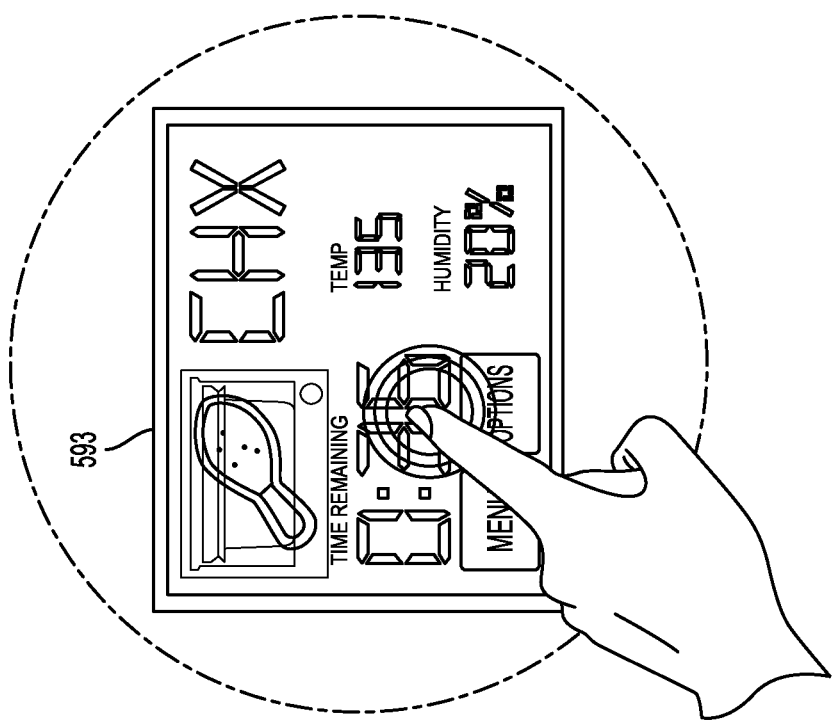
FIG. 20B is an exploded view showing the control screen illustrated in FIG. 20A.
Figure 20A:
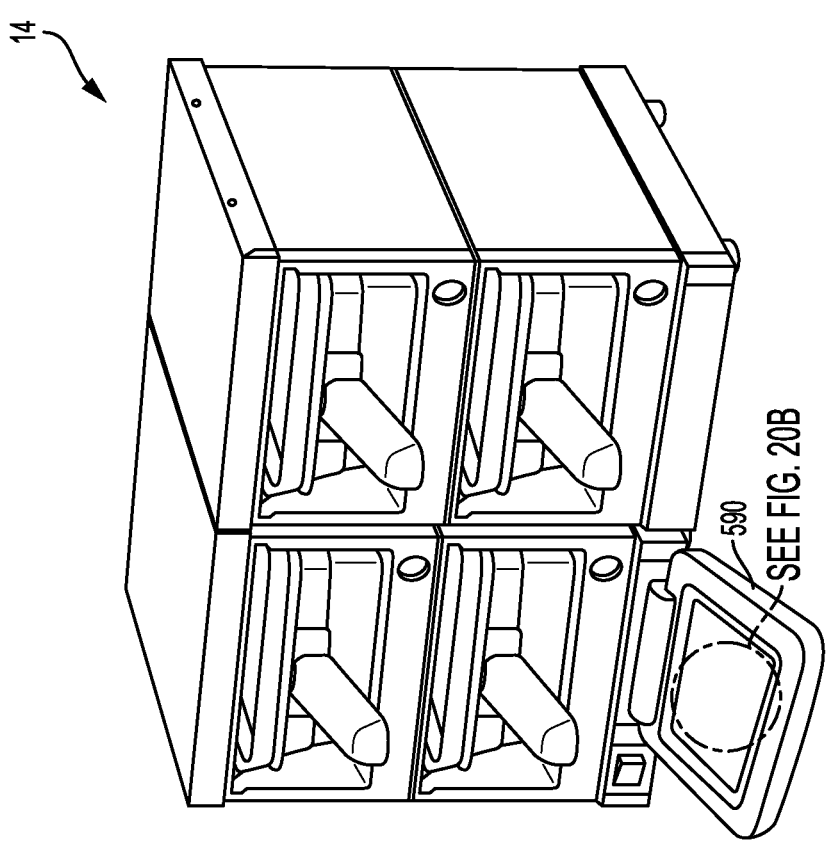
FIG. 20A is a perspective view of the modular food holding system of FIG. 16 including one example of a display for controlling one of the four chambers of the modular food holding system of FIG. 18.

After selecting one of the food holding chambers 12a-d, control screen 593 for the selected food holding chamber 12a-d appears, as illustrated in FIG. 20. The control screen 593 may include a schematic representation of the selected food holding chamber 12 and the location of the selected food holding chamber 12 (in the illustration of FIG. 20, the upper left side of the screen) in the food holding unit 14. A textual abbreviation of the type of food may be displayed along with a current temperature of the food holding chamber 12 and the relative humidity of the food holding chamber 12. A countdown timer may also be displayed, which represents the length of time left for the food item contained in the food holding chamber 12 before the food item will need to be discarded.

Figure 21B:
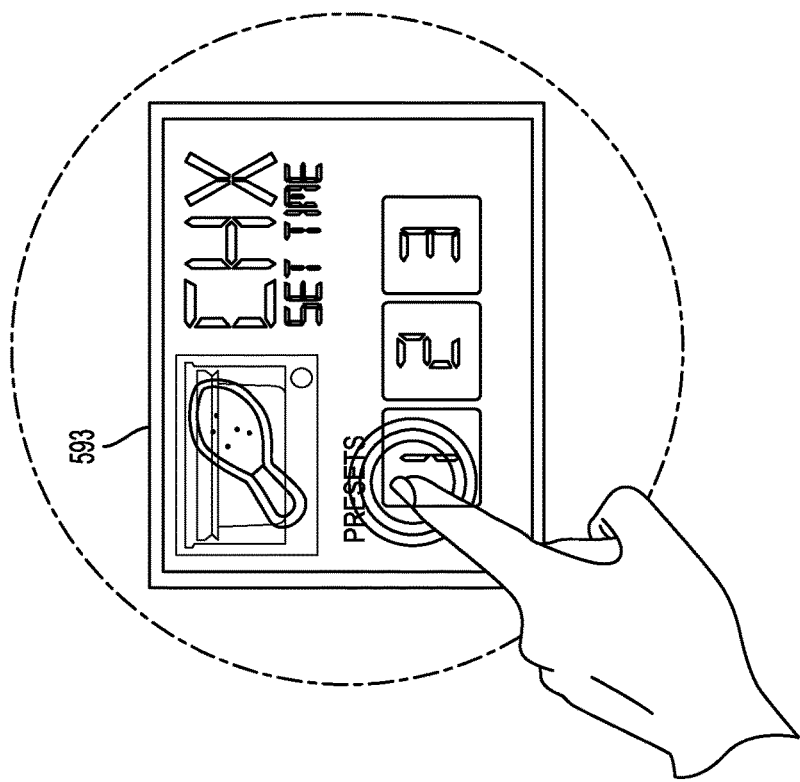
FIG. 21B is an exploded view showing the control screen illustrated in FIG. 21A.
Figure 21A:
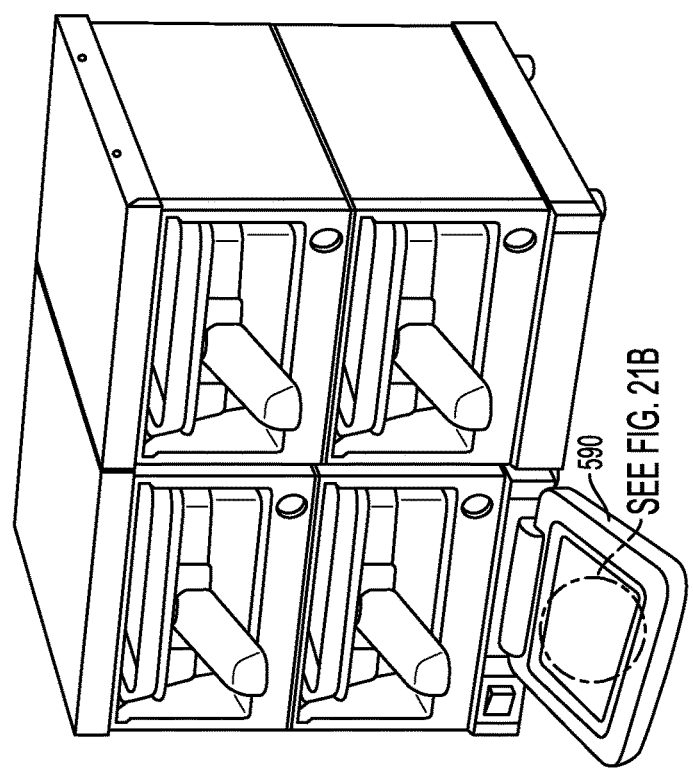
FIG. 21A is a perspective view of the modular food holding system of FIG. 16 including one example of a display for entering food item preset conditions into one of the four chambers of the modular food holding system of FIG. 18.

FIG. 21 illustrates an additional control screen 593 for the selected food holding chamber 12 in which a use may select an existing menu item from a preset list of menu items. In the example illustrated in FIG. 21, the user has selected preset menu item number one, which corresponds to a chicken item.

Figure 22B:
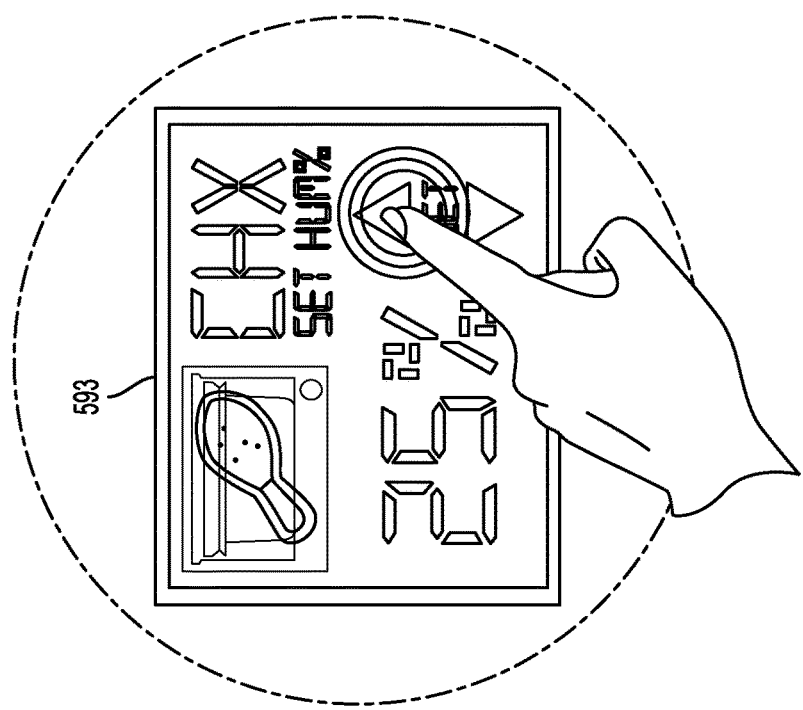
FIG. 22B is an exploded view showing the control screen illustrated in FIG. 22A.
Figure 22A:
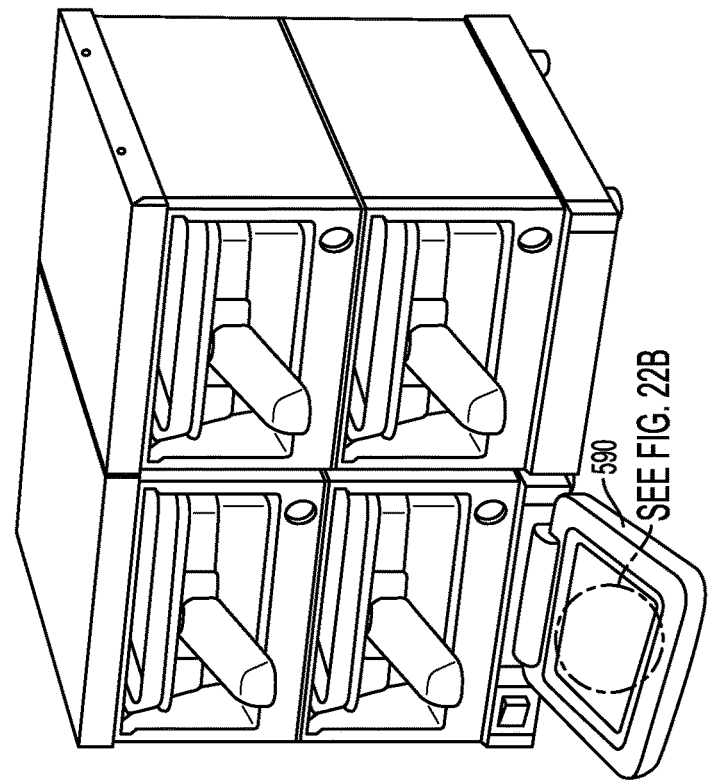
FIG. 22A is a perspective view of the modular food holding system of FIG. 18 including one example of a display for programming new menu items into one of the four chambers of the modular food holding system of FIG. 18.

FIG. 22 illustrates yet another control screen 593 for the selected food holding chamber 12 in which a relative humidity level is selected. The user my select a relative humidity level based on the type and/or number of food items in the food holding chamber 12.

Figure 23B:
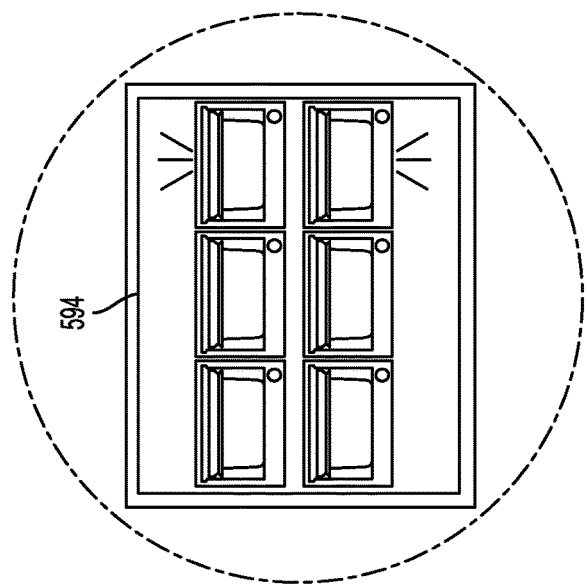
FIG. 23B is an exploded view of the control screen illustrated in FIG. 23A.
Figure 23A:
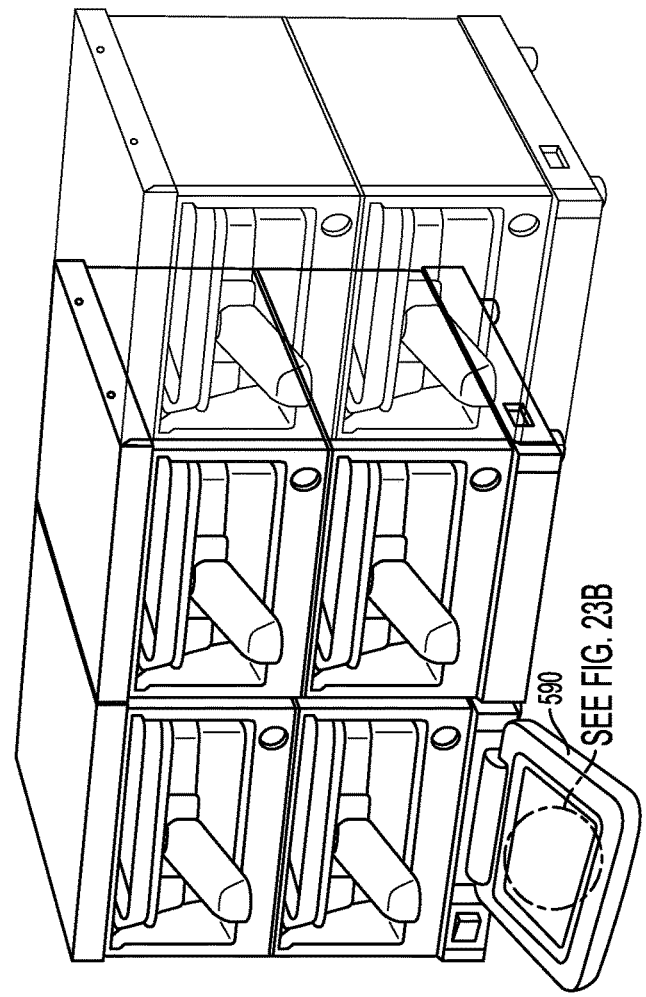
FIG. 23A is a perspective view of the modular food holding system of FIG. 16 including one example of a display for adding two additional chambers into the modular food holding system of FIG. 18 in a 3×2 configuration.
Figure 25B:
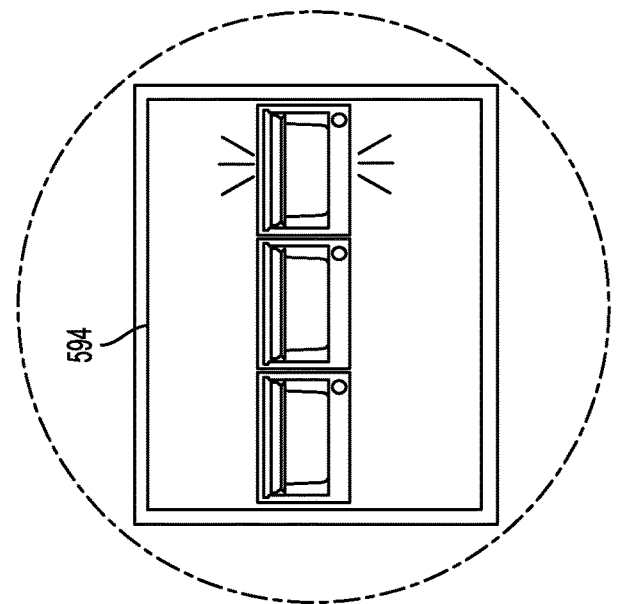
FIG. 25B is an exploded view of the control screen illustrated in FIG. 25A.
Figure 25A:
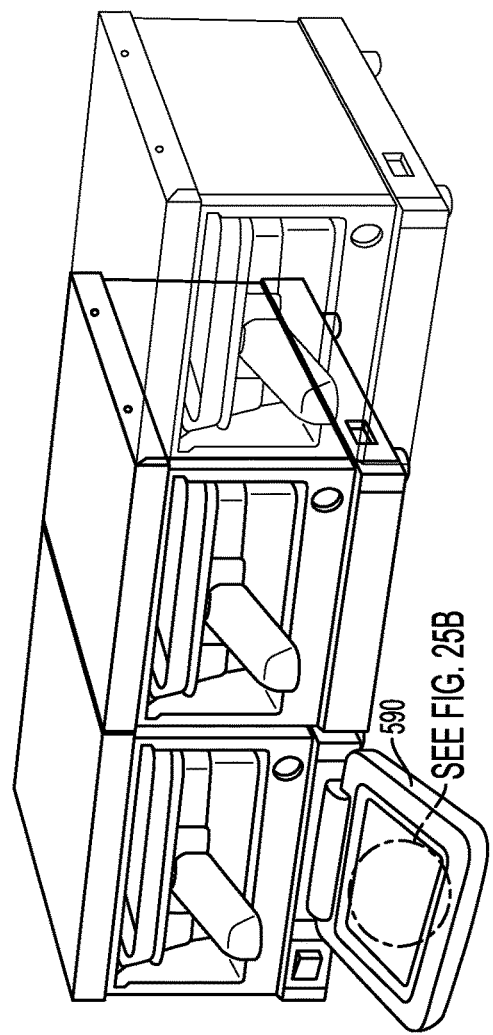
FIG. 25A is a perspective view of the modular food holding system of FIG. 18 including one example of a display for adding one additional chamber into a 2×2 modular food holding system of FIG. 1 in a 3×1 configuration.

FIGS. 23-25 illustrate a configuration screen 594 that may be displayed on the control screen 590. The configuration screen 594 automatically displays new food holding chambers 12 that are connected to the food holding unit 14. For example, in the food holding unit 14 of FIG. 23, two new food holding chambers 12 have been added to the right side of the food holding unit 14. The configuration screen 594 may display the newly added food holding chambers 12 in a different color or font to alert a user to the addition of the new food holding chambers 12 and/or the need to program the newly added food holding chambers 12.

FIGS. 24 and 25 illustrate the addition of newly added food holding chambers 12 either on top of the food holding unit 14 (FIG. 24) or a single unit on the right side of the food holding unit 14 (FIG. 25). A user may program the newly added food holding chambers 12 by selecting them on the control screen 590, which opens the control functions discussed above.

FIGS. 26-30 illustrate various alternate embodiments of a control screen 590.

Figure 26:
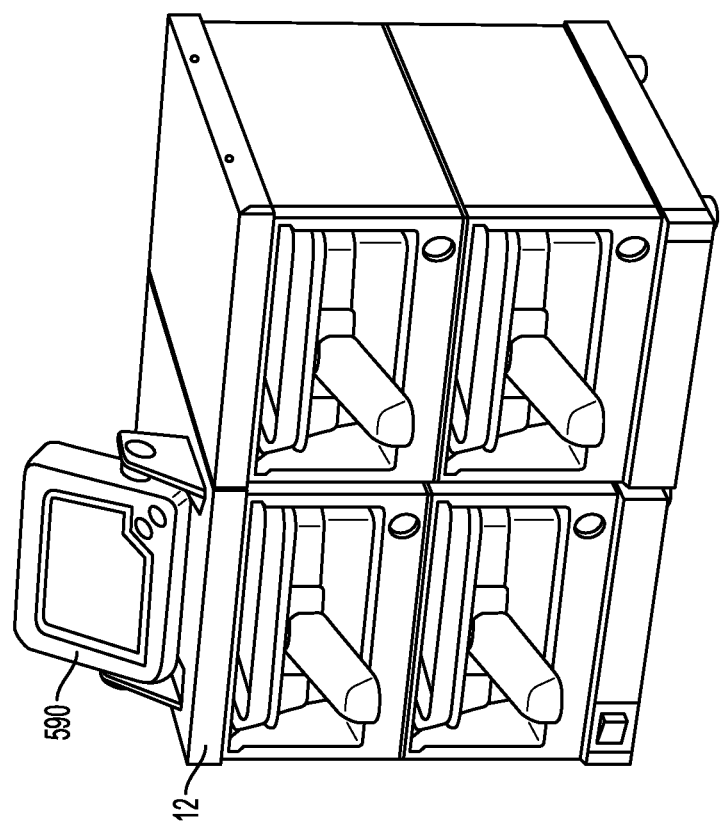
FIG. 26 is a perspective view of the modular food holding system of FIG. 3 including an alternate location for a control and display screen.

In one alternate embodiment, as illustrated in FIG. 26, the control screen 590 may be attached to a top surface of one of the food holding chambers 12.

Figure 27:
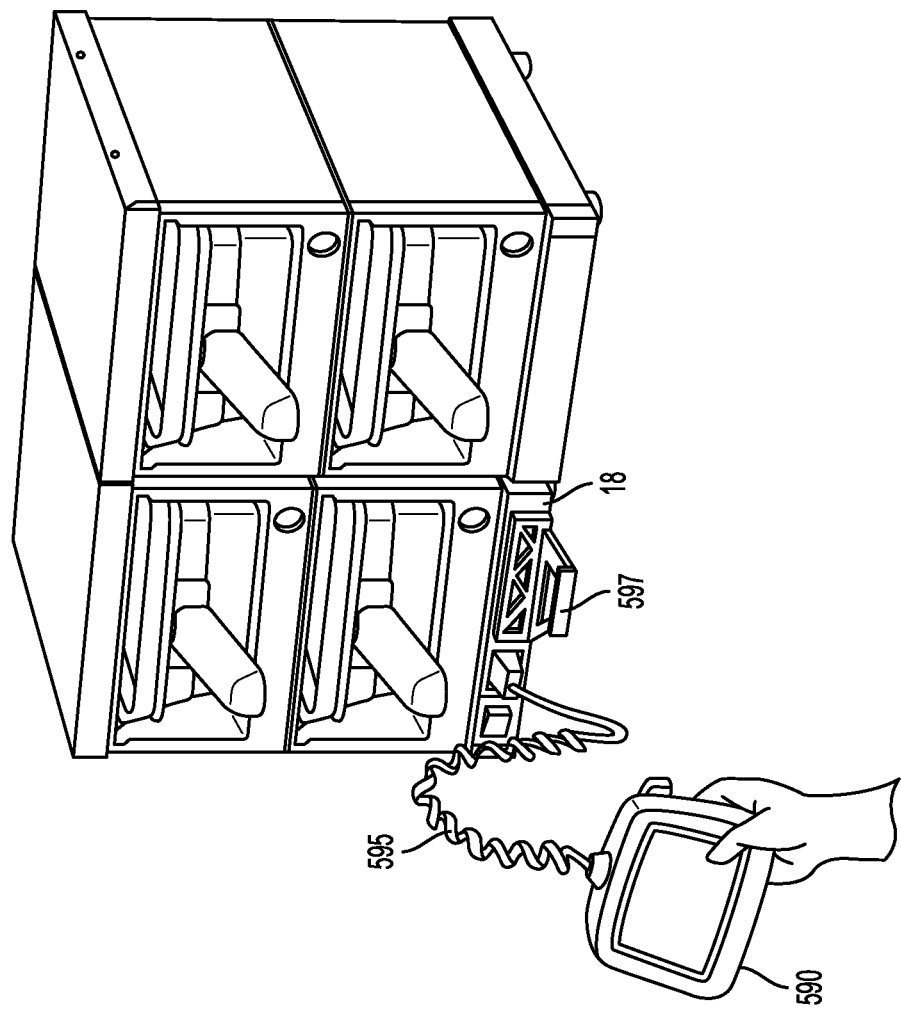
FIG. 27 is a perspective view of the modular food holding system of FIG. 3 including an alternate tethered control and display screen.

In another alternate embodiment, as illustrated in FIG. 27, the control screen 590 may be attached to the chamber base 18 with a tether 595. The tether 595 allows the control screen 590 to be moved away from the food holding unit 14 a certain distance without totally separating the control screen 590 from the food holding unit 14, thus preventing loss of the control screen 590 while allowing some freedom of movement. Some embodiments may further include a storage bracket 597 to hold the control screen 590 when not in use. The storage bracket 597 may be attached to the chamber base 18.

Figure 28:
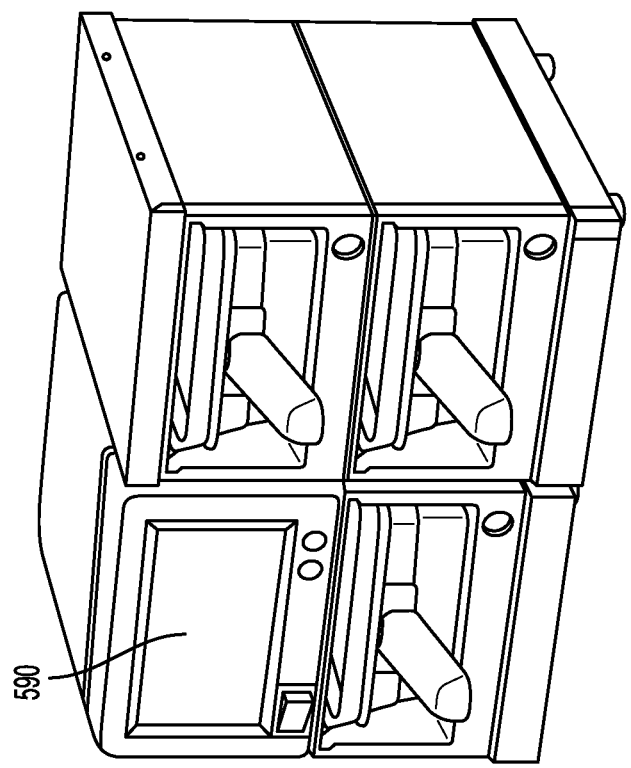
FIG. 28 is a perspective view of the modular food holding system of FIG. 3 including an alternate integrated control and display screen mounted on a modularized electronics and display module.

In another alternate embodiment, as illustrated in FIG. 28, the control screen 590 may be integrated into one food holding chamber 12. For example, the control screen 590 may be disposed within a housing 20 having the same size and shape as the housing of a chamber 12, but wherein the housing 20 containing the control screen 590 is not configured to hold food.

Figure 29:
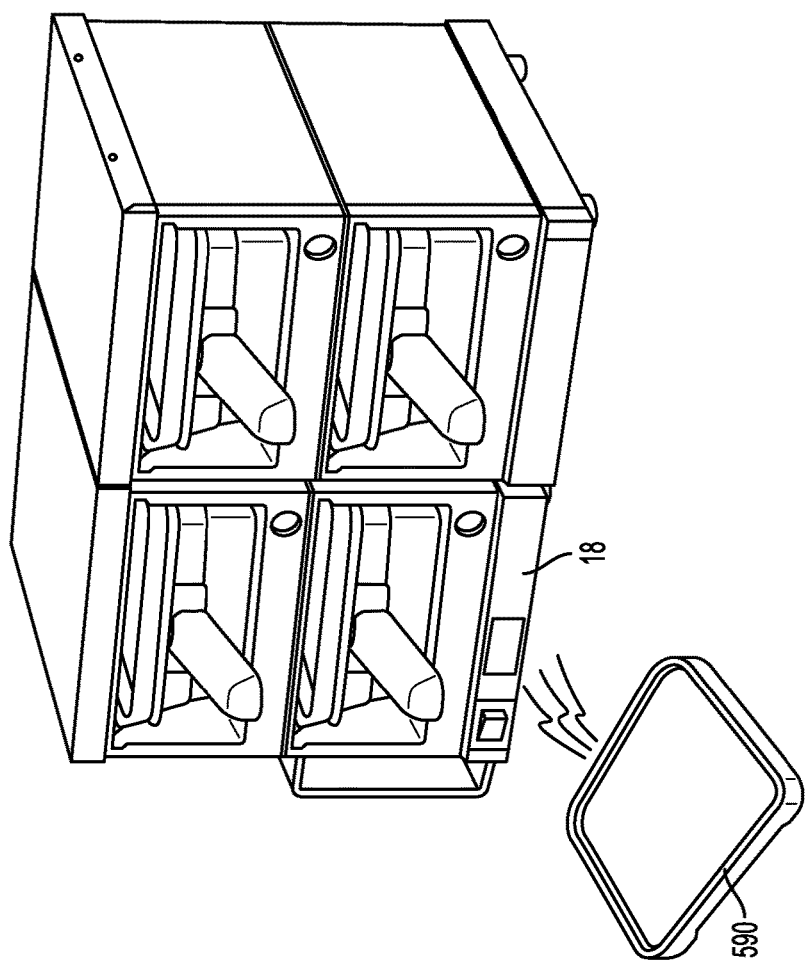
FIG. 29 is a perspective view of the modular food holding system of FIG. 3 including an alternate wireless control and display screen.

In another alternate embodiment, as illustrated in FIG. 29, the control screen 590 may be connected wirelessly to the chamber base 18 via a wireless transceiver 596 of the chamber base 18. Some embodiments may further include a storage slot 598 to hold the control screen 590 when not in use. The storage slot 598 may be attached to the chamber base 18.

Figure 30B:
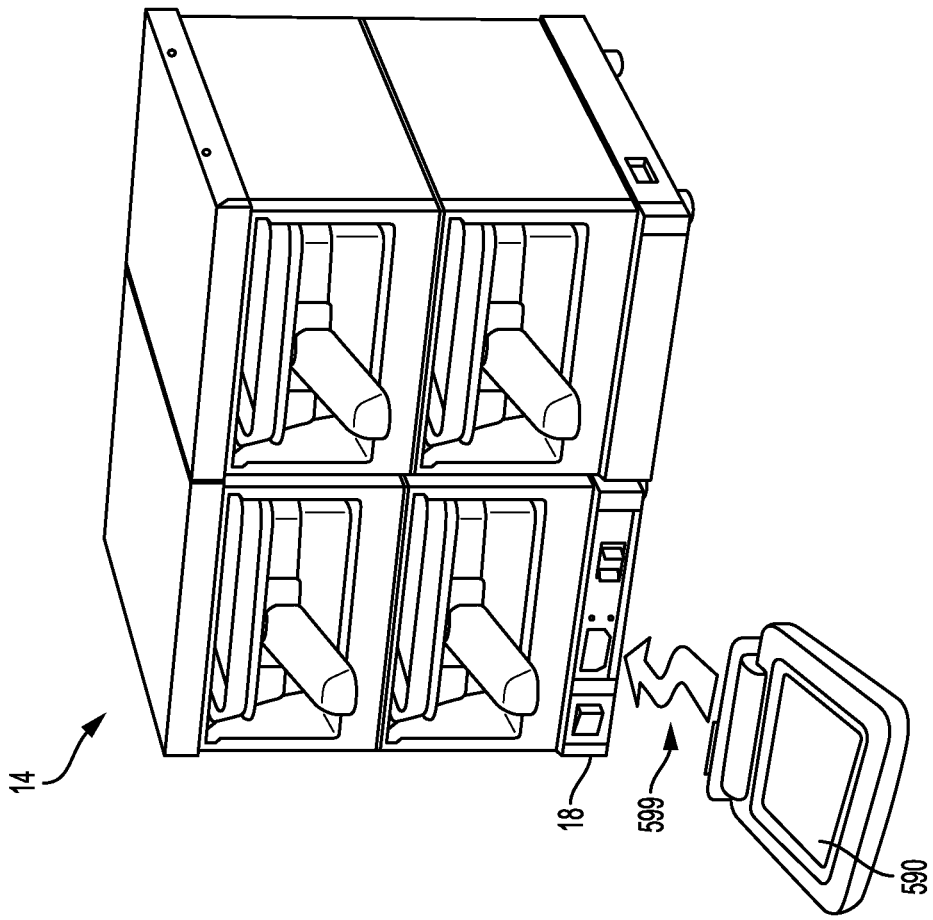
FIGS. 30A-B are perspective views of the modular food holding system of FIG. 3 including an alternate plug-in control and display screen.
Figure 30A:
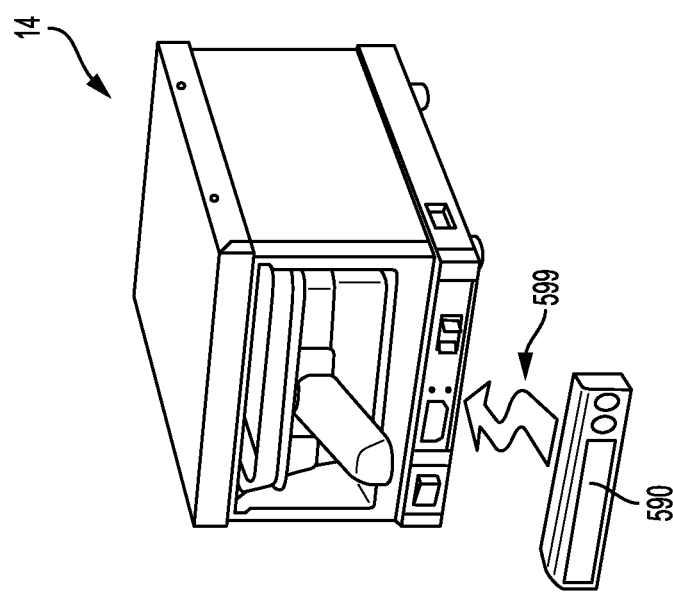

In yet another alternate embodiment, as illustrated in FIGS. 30A-B, the control screen 590 may be removably attached to the chamber base 18 with a plug-in connection 599. In this embodiment, the display screen 590 may take on a reduced size (as illustrated in FIG. 30A) when the food holding unit 14 comprises a small number of food holding chambers 12 (e.g., one or two food holding chambers 12).

Figure 32:
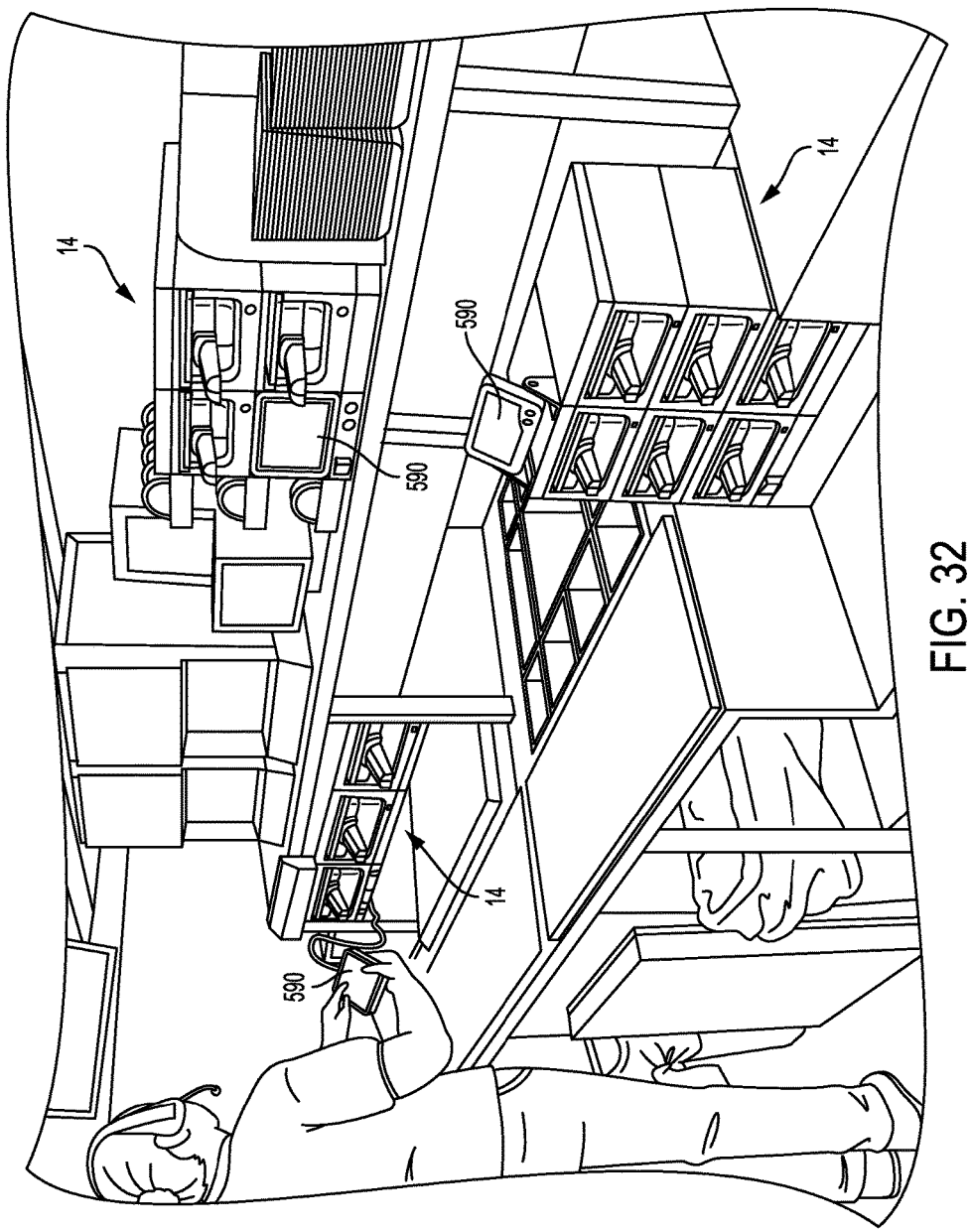
FIG. 32 is a perspective view of the modular food holding system of FIG. 1 with a plurality of food holding chambers connected in various fashions, forming a plurality of food holding stations, each food holding station including a control and display screen of one of FIGS. 16-28.
Figure 33:
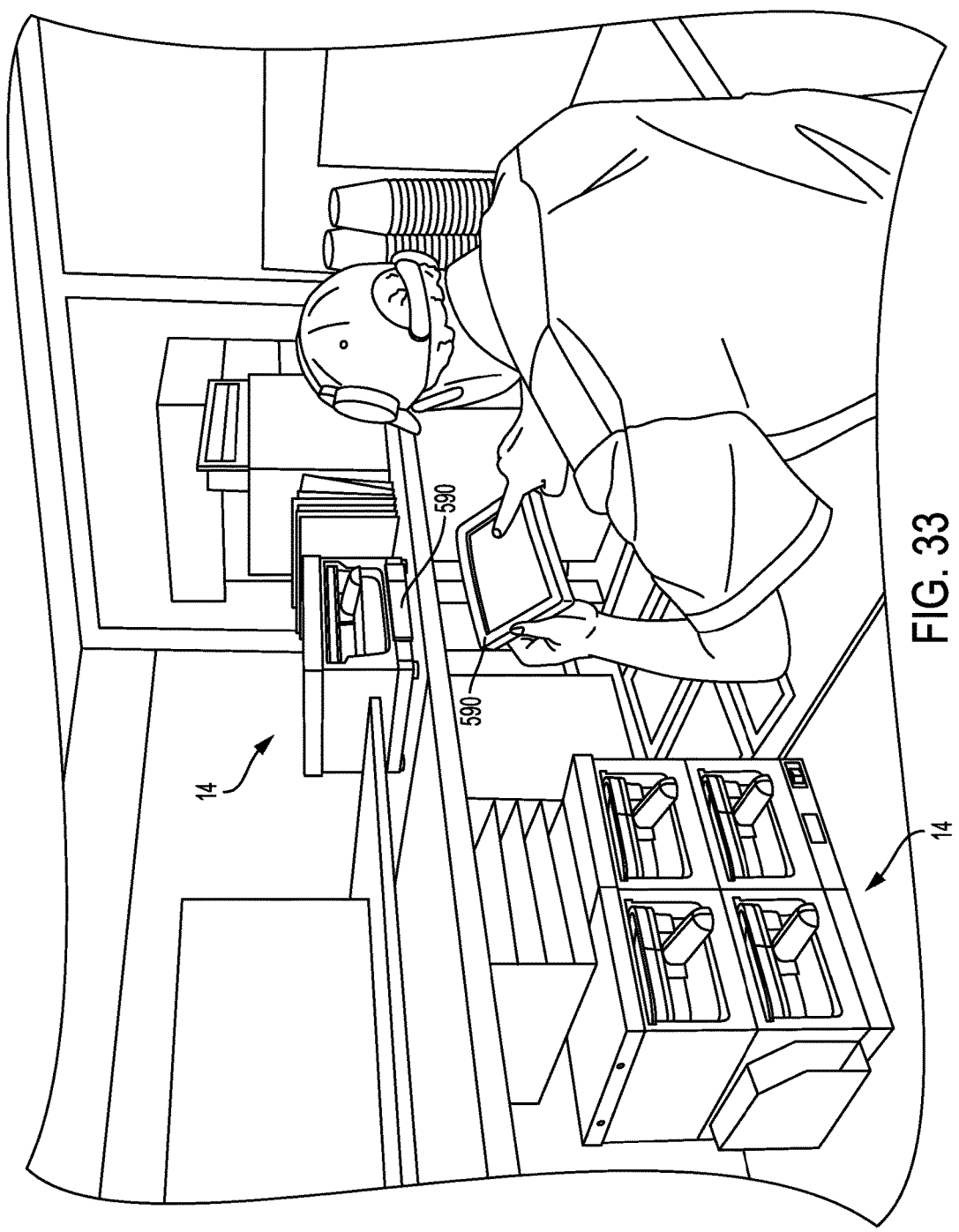
FIG. 33 is a perspective view of the modular food holding system of FIG. 1 with a plurality of food holding chambers connected in various fashions, forming a plurality of food holding stations, each food holding station being controlled by a wireless control and display screen of FIG. 29.

FIGS. 31-33 illustrate the embodiments of FIGS. 26-30 in various locations of a food preparation area.

The modular food holding systems described above and below advantageously do not require any covering with sheet metal or other covering because each unit is complete in and by itself. This self-contained feature of each module results in no exposed electronics, which reduces the possibility of shorting or other damage to the internal electronic components. Additionally, the modular nature of the system allows a single faulty unit to be replaced without having to replace the entire system.

Figure 34:
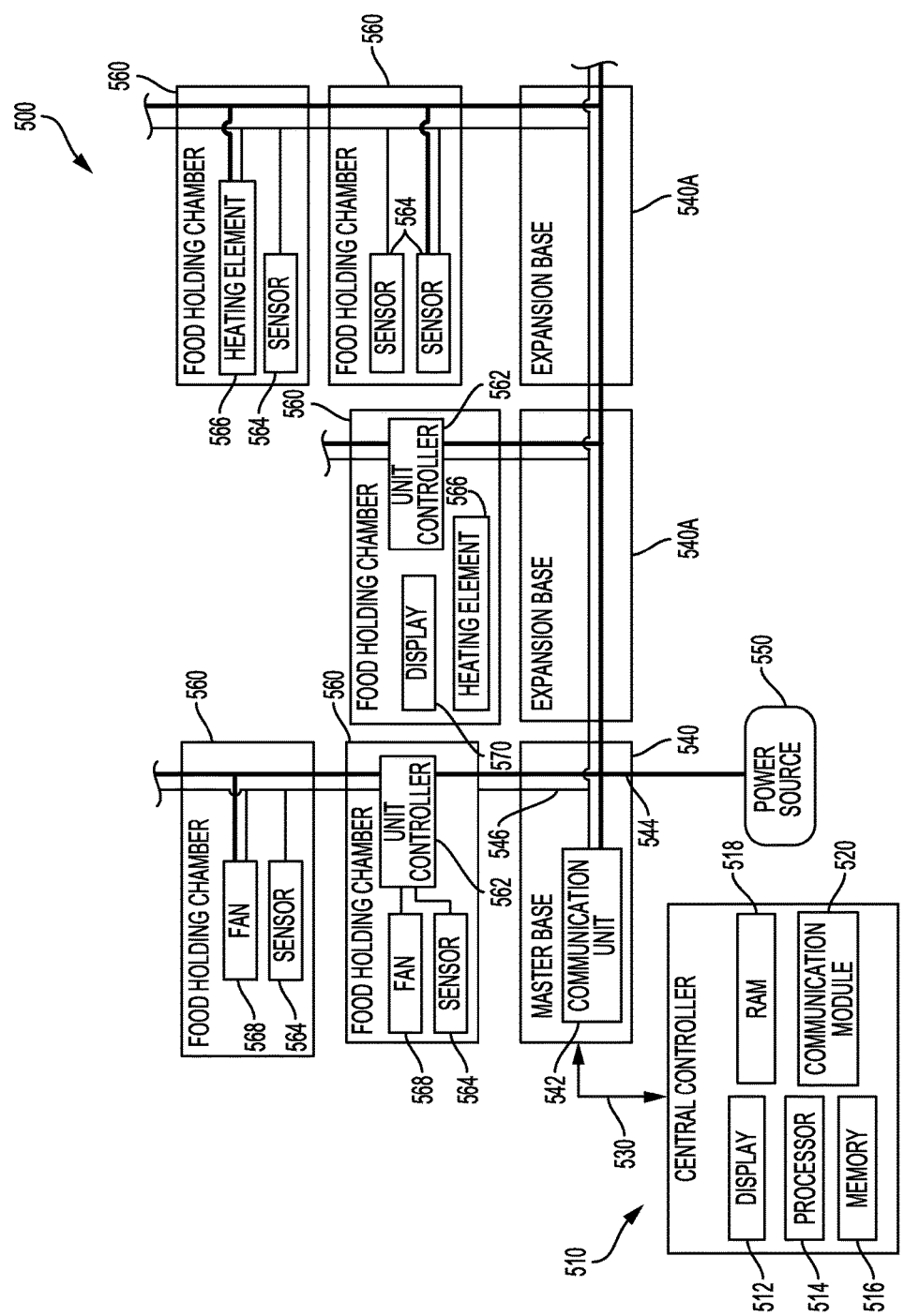
FIG. 34 is a schematic block diagram of the modular food holding system of FIG. 1.

FIG. 34 illustrates a schematic block diagram of an exemplary modular food holding system 500 and an exemplary central controller 510. In some embodiments, the modular food holding system 500 may include the central controller 510. In alternative embodiments, the modular food holding system 500 and the central controller 510 may be separate systems or devices, communicating by a communication connection 530. The modular food holding system 500 may be a system of individual modularized food holding chambers 560, which may be configured to store perishable food items. Such food holding chambers 560 may comprise individual food holding chambers 12 (FIG. 1), as discussed elsewhere herein. The food holding chambers 560 may be connected to other food holding chambers 560, a master base 540 (which may be a chamber base 18), or one or more expansion bases 540A (which may be an expansion base 18) (collectively referred to as the "components" of the modular food holding system 500, together with their subcomponents disposed within any of the components). The connections between the components of the modular food holding system 500 may include a power connection 544 and a communication connection 546, which connect every food holding chamber 560 and every expansion base 540A to the master base 540. As illustrated in FIG. 34, additional food holding chambers 560 may be connected to any of the food holding chambers 560, and additional expansion bases 540A may be connected to the expansion bases 540A. In a preferred embodiment, however, only one master base 540 provides power and control commands from the central controller 510 to each food holding chambers 560, either directly or indirectly. Additionally, or alternatively, the master base 540 may be incorporated within one of the food holding chambers 560 in some embodiments.

The master base 540 forms the center of the power and communication network of the modular food system 500 and also serves as a communicative link to the central controller 510. A power source 550 is connected to the master base 540, which may either transform the power received or pass through the power without conversion. For example, the power source may be a 110V or 240V A/C source, which the master base 540 may convert to 12V D/C to power the food holding chambers 560. The master base 540 includes connections to provide power and communications to at least one expansion base 540A and at least one food holding chamber 560 directly via the power connection 544 and the communication connection 546. As noted, additional expansion bases 540A or food holding chambers 560 may be indirectly connected to the master base 540. The power connections 544 may include grounded, ungrounded, regulated, unregulated, single-phase, multiphase, direct, alternating current, or any other type power connection known or here-after developed. The communication connections 546 may include wired or wireless, analog or digital, addressable, mesh, single-wire, twisted pair, multi-conductor, cable, electrical, optical, or any other type of communication connection known or here-after developed.

In some embodiments, multiple power connections 544 providing different power levels (e.g., 110V A/C and 12V DC) or multiple communication connections 546 providing different communication channels may be included between each pair of components of the modular food system 500.

In some embodiments, the master base 540 may further include a communication unit 542 configured to facilitate communication with the central controller 510 via the communication link 530. When present, the communication unit 542 receives data from the food holding chambers 560 via the communication connections 546, transmits the data to the central controller 510 via the communication link 530, receives control data from the central controller 510 via the communication link 530, and transmits the control data to the food holding chambers 560 via the communication connections 546. The data received from the food holding chambers 560 may include data received from elements disposed therein, including sensors 564, heating elements 566, fans 568, or displays 570. The communication link 530 may include a cord, a wireless connection, or a direct connection between a plug of the central controller and a socket of the master base. The communication link 530 may further include any known or hereafter developed wired or wireless electronic data communication medium or protocol, including wireless telephony (e.g., GSM, CDMA, LTE, etc.), Wi-Fi (802.11 standards), WiMAX, Bluetooth, Fieldbus (e.g., HART®, WirelessHART®, FOUNDATION® Fieldbus, etc.), or NFC protocols. In some embodiments, the communication link 530 may include an indirect link through a network, such as through one or more routers of a LAN or WAN. In some embodiments, the communication unit 542 may process the received communications to convert the received data or control data from one communication protocol into another communication protocol. In embodiments without a communication unit 542, the central controller 510 may be directly connected to the communication connections 546 through the communication link 530. In such embodiments, the communication link 530 may further be a wired communication link of the same type as the communication connections 546.

In further embodiments, the central controller 510 may be incorporated within the master base 540. In such embodiments, a communication unit 542 may be unnecessary, as the communication module 520 may communicate directly with the food holding chambers 560 via the communication connections 546. The central controller 510 in the master base 540 may receive data from food holding chambers 560, such as data indicating the configuration, operating state, connected devices (such as sensors, timers, fans, heaters, etc.), or user input (such as from a screen, switch, or button disposed within the food holding chamber 560). The central controller 510 within the master base 540 may provide control data to the food holding units 560. In particularly preferred embodiments, the central controller 510 may communicate control actions or control commands to the unit controllers 562 of the food holding chambers 560. Such control actions or commands may include control parameters, such as set points or ranges for operation. For example, the central controller 510 may communicate set points for temperature and humidity to the unit controller 562 of a food holding chamber 560, which may cause the unit controller 562 to operate elements or components of the food holding chamber 560 (e.g., heating elements, cooling elements, fans, sprayers, etc.) to maintain temperature and humidity at or near the set points received from the central controller 510. In some embodiments, such machine-level actuation of components or elements within the food holding chamber 560 by the unit controller 562 may occur without communication between the food holding unit 560 and the master base 540 or the central controller 510. For example, the unit controller 562 may receive sensor data regarding temperature, determine an adjustment to a heating element based upon set points or operating parameters previously received from the central controller 510, and control the operation of the heating element without further communication with the central controller 510. By providing operating parameters or set points to the unit controller 562 for operation of the components of the food holding chamber 560, the volume of data required to be communicated between the food holding chambers 560 and the central controller 510 may be significantly reduced. This may further permit control of a greater number of food holding chambers 560 by the central controller 510 or may permit communication through a lower-bandwidth communication protocol or connection.

One or more expansion bases 540A may be connected to the master base 540 through the power connections 544 and communication connections 546. Expansion bases 540A may similarly connect to additional expansion bases 540A through the power connections 544 and communication connections 546, thereby indirectly connecting the additional expansion bases 540A to the master base 540 (and, thereby, to the central controller 510 and the power source 550). Together with the master base 540, the expansion bases 540A may be referred to herein as the "bases." Each expansion base 540A simply serves to connect the master base 540 to additional expansion bases 540A or food holding chambers 560 allowing extension of the system in a modular fashion. In some embodiments, one or more expansion bases 540A may further be connected to a power source, either optionally or as a requirement of proper functioning. Such additional power source connections to the expansion bases 540A could be used to eliminate the power connections 544 between the expansion base 540A and other bases. In such embodiments, the communication connection 546 may be wireless connections, thereby eliminating the need for any physical connection between bases and allowing further extension of the modular food holding system 500. For wireless communication, the expansion bases 540A may further include communication units similar to 542 to transmit and receive data.

Each food holding chamber 560 is communicatively connected to the master base 540, either directly or indirectly through expansion bases 540A or other food holding chambers 560. The food holding chambers 560 may be identical modules, configured and connected as discussed elsewhere herein. Each food holding chamber 560 may include multiple power connections 544 and communication connections 546. The multiple connections may include an upstream connection and a downstream connection for each of the power connection 544 and communication connections 546. The upstream connections connect the food holding chamber 560 to the master base 540, either directly or through another food holding chamber 560 or a expansion base 540A. The downstream connections allow additional food holding chambers 560 to connect to the master base 540 through the food holding chamber 560.

FIG. 5 illustrates a perspective view of an exemplary food holding chamber 560, labeled as a food holding chamber 12 (in FIG. 5), showing the upstream and downstream connections. The upstream and downstream connections are configured in such a way that a downstream food holding chamber 12 automatically connects to the upstream food holding chamber 12 when physically connected forming a food holding unit 14, as discussed elsewhere herein. In the illustrated embodiment, the downstream connections are disposed near the top of the food holding chamber 12, and the upstream connections are disposed in a corresponding location near the bottom of the food holding chamber 12. The exemplary downstream connections include a downstream power connection by the power port 60 (shown as a female 3-prong power connection socket) and a downstream communication connection by the communication ports 62 (shown as a female RJ45 or 8P8C connection socket). Correspondingly, the upstream connections include an upstream power connection by the power plug 66 (shown as a male 3-prong power connection plug) and a downstream communication connection by the communications plug 68 (shown as a male RJ45 or 8P8C connection plug). When a downstream food holding chamber 12 is stacked atop an upstream food holding chamber 12 and slid into place, the upstream connection plugs are inserted into the downstream connection sockets, thereby connecting the downstream food holding chamber 12 to the master base 18 through the upstream food holding chamber 12. As further illustrated in FIG. 4, each base in the exemplary modular food holding system 500 may include upstream power connections as the power port 28 and upstream communication connections as the communications port 30 disposed at a corresponding location near the top of the base 18 to connect to upstream connections of a food holding chamber 12. Although food holding chambers 560, 12 may include multiple configurations or designs, the food holding chambers 560, 12 may also be identical (or functionally identical, with only non-functional design differences) in a preferred embodiment.

Returning to FIG. 34, the food holding chambers 560 may contain various combinations of elements or components, including sensors 564, heating elements 566, fans 568, or displays 570. These elements of the food holding chambers 560 may be permanently or removably disposed within or connected to the food holding chambers 560. Additionally, the elements may be directly connected to the power connections 544 or communication connections 546, or they may be indirectly connected thereto by a unit controller 562. The elements may be controlled by or based upon control commands from the unit controller 562 and/or the central controller 510 to adjust the physical environment within the food holding chamber 560 (e.g., using a heating element 566, a fan 568, a cooling element (not shown), or a toasting element (not shown)), generate data associated with the food holding chamber 560 (e.g., using a sensor 564), present information regarding the food holding chamber 560 (e.g., using a display 570), or take other actions.

The one or more sensors 564 may include devices for generating or collecting data associated with some aspect of a food holding chamber 560, including thermometers, humidistats, scales, position sensors, photosensors, user-operated or automatic switches, buttons, dials, or other similar devices. The sensors 564 may be configured to measure or generate data regarding the environment within the food holding chamber 560, such as temperature, humidity, volatility, or load status (e.g., contents type, weight, whether empty or loaded, etc.). In some embodiments, such sensor data may be collected and analyzed by a unit controller 562 in the food holding chamber 560.

In some embodiments, the sensors 564 may include smart sensors that sense characteristics of the environment within the food holding chamber 560. For example, the sensors 564 may comprise humidity sensors, electronic nose sensors that are capable of detecting food decomposition products (e.g., sulphur, amines, aldehydes, ethanol, ethylene, metal oxides, etc. by using gas chromatography, mass spectrometry and/or olfactometry) to determine the freshness of the food items stored within the food holding chamber 560, temperature sensors that directly measure the temperature of the environment within the food holding chamber 560, and load sensors that detect the presence of food items within the food holding chamber 560. The sensors 564 may be located anywhere in or around the food holding chamber 560, as long as the sensor is capable of directly measuring a characteristic of the environment within the food holding chamber 560 (e.g., within a headspace of a food holding tray). For example, the sensors 564 may be located underneath a cover of a food pan that is located within the food holding chamber 560, or built into a food pan itself that is located within the food holding chamber 560 (e.g., the sensor 564 may be mounted in a handle of the food pan and in fluid/gaseous communication with pan contents via a hole in the pan). The sensors 564 may transmit sensed data to the chamber base by a wired connection or by a wireless connection. The load sensors may comprise one or more of load cells, sonar detectors, and cameras.

The sensors 564 allow food stored within the food holding chamber 560 to be stored in a stasis mode, which prevents further cooking of the food while inhibiting bacterial growth. Generally, food has to be stored at less than 40° F. or greater than 140° F. (which is commonly referred to as a food safe zone, and which may be defined in the NSF as a minimum food safety temperature) to prevent rapid bacterial growth and or to minimize microbial growth. Additionally, the sensors 564 may communicate with a display (such as the display 590 of FIGS. 18-33) and the display may display a symbolic representation of the quality of food that is stored within the food holding chamber based on information received from the sensor. For example, the display may include color coded quality indications (e.g., green, yellow, red) that are based on the decomposition products detected in the food holding chamber.

The one or more heating elements 566 may include metal, ceramic, composite, or other heating elements for heating or cooling the interior of the food holding module 560. The one or more fans 568 may include axial fans, centrifugal fans, cross-flow fans, bellows, or other means of venting or circulating air within the food holding module 560. The one or more displays 570 may include LCD display screens, touch screen displays, LED displays, indicator lights, or other information display devices. Additionally, or alternatively, other types of elements may be included in one or more of the food holding chambers 560, such as speakers, sirens, buzzers, etc.

Figure 37:
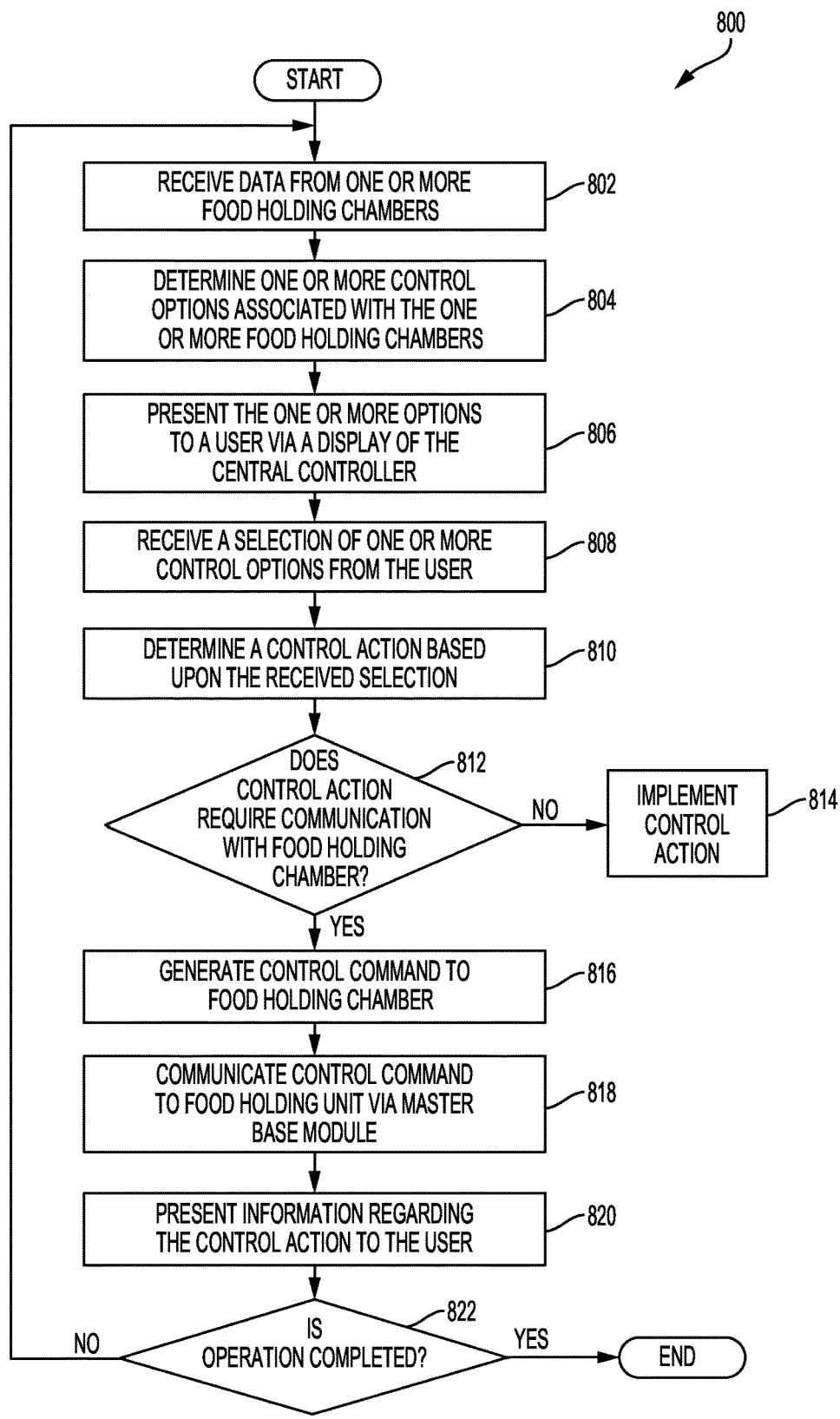
FIG. 37 is a logic flow diagram of an exemplary control method for a central controller connected to the modular food holding system of FIG. 1.
Figure 38A:
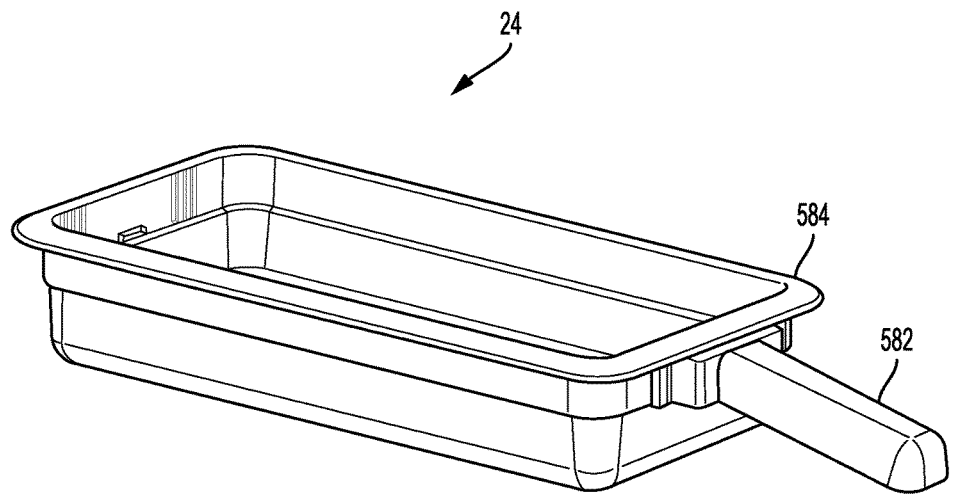
FIGS. 38A and 38B illustrate perspective views of an exemplary food holding tray for use with the food holding chambers described herein.
Figure 38B:
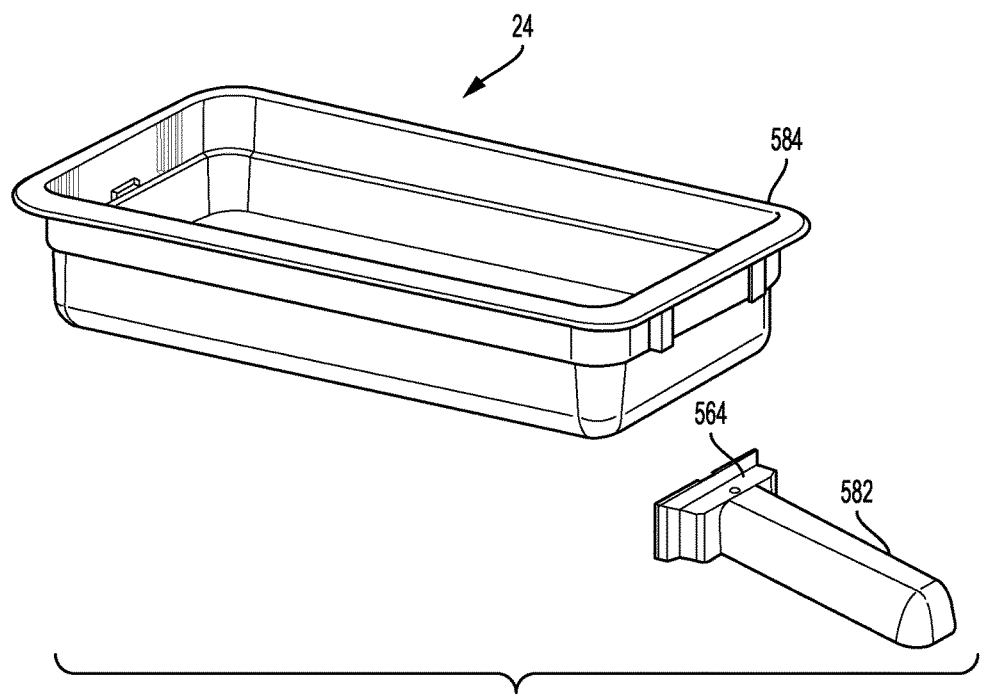

In some embodiments, some or all of the food holding chambers 560 may include one or more food holding trays 24, as illustrated in FIGS. 38A-B and 37A-C. Each food holding tray 24 may be configured to fit within a cavity 22 of a food holding chamber 12, as illustrated in FIG. 3. FIG. 38A illustrates a perspective view of an exemplary food holding tray 24 that may be used to store contents within a food holding chamber 560, such as a food holding chamber 12 (FIG. 1). In some embodiments, the food holding tray 24 may include a handle 582, which may be formed as an integral part of or attached to the food holding tray 24. In some embodiments, the handle 582 may be removably attached to the food holding tray 24 by any known means, such that the handle 582 may be detached from the food holding tray 24. This may allow the food holding tray 24 or the handle 582 to be separately cleaned, replaced, or used. FIG. 38B illustrates the exemplary food holding tray 24 and handle 582 when detached. The detachability of the handle 582 may be particular advantageous in embodiments in which one or more sensors 564 are disposed within the handle 582. In addition to the handle 582, the food holding tray 24 may include a lip 584 extending beyond the perimeter of the side walls of the food holding tray 24. The lip 584 may be configured to hold the food holding tray 24 in place within the food holding chamber 560, may allow the attachment of a lid (not shown) to seal the food holding tray 24, or for other uses.

Figure 39A:
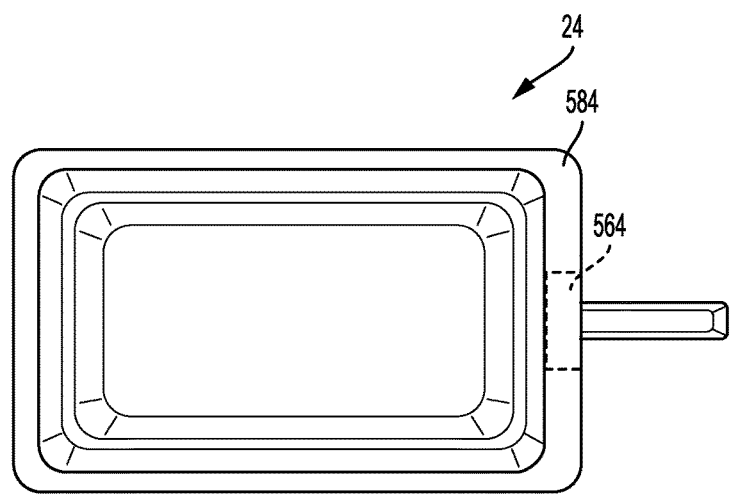
FIGS. 39A through 39C illustrate top and bottom plan views of the food holding tray of FIGS. 38A and 38B.

FIG. 39A illustrates a top plan view of the exemplary food holding tray 24, wherein the handle 582 includes a sensor 564. The sensor 564 may include any type of sensor described or referenced herein, and the sensor 564 may be configured to measure or generate data regarding the environment within the food holding tray 24 (and, thereby, the environment within the food holding chamber 560). For example, a heat sensor 564 may be included within a portion of the handle 582 that adjoins or connects to the food holding tray 24 in order to monitor the temperature within the food holding tray 24. Although shown as disposed within a portion of the handle 582 adjacent or near the food holding tray 24, the sensor 564 could be alternatively disposed at any location within the handle 24. In other embodiments (not shown), one or more sensors 564 may be disposed within the food holding tray 24. In such embodiments, the one or more sensors 564 within the food holding tray 24 may be additional to, or alternative to, the sensor 564 within the handle 582. However disposed, the one or more sensors 564 may be communicatively connected to the master base 540, either directly or indirectly. Such connections may include power connections 544 or communication connections 546. Such connections may also include wireless connections, whereby the one or more sensors 564 disposed within the handle 582 may be wirelessly connected to the master base 540, the unit controller 562 of the corresponding food holding chamber 560, or directly to the central controller 510. In some embodiments, the one or more sensors 564 may be communicatively connected to the unit controller 562 of the food holding unit 560, which may further be communicatively connected to the master base 540.

Figure 39B:
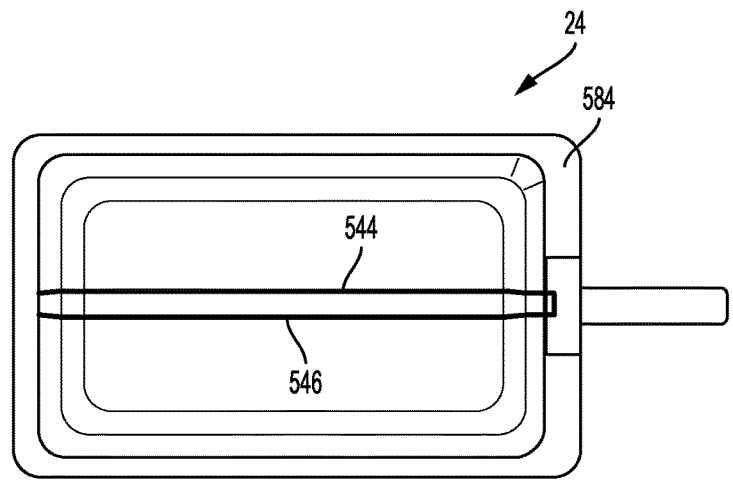
Figure 39C:
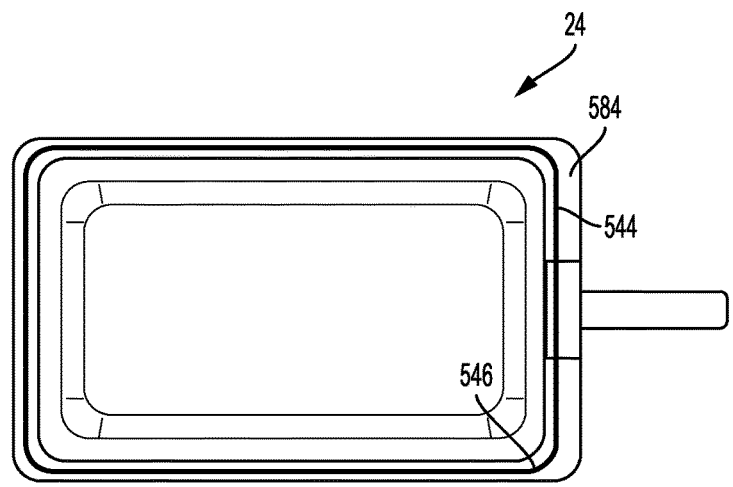

In embodiments in which the one or more sensors 564 within food holding tray 24 or the handle 582, the food holding tray 24 may further include one or more power connections 544 or communication connections 546. FIG. 39B illustrates a bottom view of the exemplary food holding tray 24, showing a power connection 544 and a communication connection 546 laid along the bottom surface of the food holding tray 24. The power connection 544 and communication connection 546 are illustrated as conductive paths plated onto or affixed to the bottom surface of the food holding tray 24 in such manner as to be exposed to connectors within the food holding chamber 560. The one or more sensors 564 may connect to the power connection 544 and communication connection 546 when the handle 582 is connected to the food holding tray 24, allowing the one or more sensors 564 disposed within the handle 582 to be communicatively connected to the unit controller 562 of the food holding chamber 560 or the master base 540 through the food holding chamber 560 via power connections 544 and communication connections 546. Although only one conductive path for each connection 544 and 546 is shown, additional paths may be added for both or either. For example, an addition conductive path (not shown) for a common ground may be added between the illustrated conductive paths. FIG. 39C illustrates another bottom view of an exemplary embodiment of the food holding tray 24, wherein the power connection 544 and the communication connection 546 are disposed as conductive paths on the bottom of the lip 584 of the food holding tray 24. Such embodiment may be particularly useful where the food holding tray 24 rests in the food holding chamber 560 such that the lip 584 sits upon a ledge or notch within the food holding chamber 560, ensuring a physical connection between the lip 584 and the food holding chamber 560.

Although two exemplary configurations of the power connections 544 and communication connections 546 are illustrated, numerous other similar configurations may be used consistently with the disclosure herein. For example, the connections 544 and 546 may include one or more conducting pads (not shown) along the bottom surface of the food holding tray 24 to increase the stability of the connections. As another example, a ground (not shown) for the one or more connections 544 or 546 may be disposed along the lip 584 of the food holding tray 24. As yet another example, the entire bottom surface of the food holding tray 24 may form one connection 544 or 546 (such as by an unbroken conductive surface), with the lip 584 of the food holding tray 24 forming a ground or another connection 544 or 546. Regardless of their configuration, the connections 544 and 546 may be made of any appropriate conductive material, such as metals, composites, conducting polymers, semiconductors, or any other appropriate materials. The connections 544 and 546 may further be embedded into the food holding tray 24, attached with adhesives or other means, or otherwise affixed to or integrated into the food holding tray 24. Throughout this specification, references to sensors, communications, connections, or data generation or receipt in a food holding chamber 560 should be understood to include the same occurring in or at a food holding tray 24 (or a handle 582 of the food holding tray 24), in accordance with the preceding description.

Returning to FIG. 34, some or all food holding chambers 560 may include unit controllers 562, in some embodiments, which may be connected to the power connections 544 and communication connections 546 of the food holding chambers 560. The unit controller 562 may receive control communications from the central controller 510 and operate one or more elements disposed within the food holding chamber 560. Operation of the one or more elements disposed within the food holding module 560 by the unit controller 562 may occur with or without communication between the unit controller 562 and the master base 540. With such communication, for example, a control command to reduce power to a heating element 566 to decrease temperature in a food holding chamber 560 may be received at the unit controller 562, which may control the power received by the heating element 566. In response to receiving the control command, the unit controller 562 may reduce the power received by the heating element 566. Without such communication, however, the unit controller 562 may receive sensor data regarding temperature, determine whether to increase or decrease temperature in the food holding chamber 560 based upon a target temperature (e.g., a temperature parameter or set point), determine a corresponding increase or decrease in power to the heating element 566, and cause the power supplied to the heating element to be adjusted accordingly. Although operation of the one or more elements of the food holding chamber 560 may not involve communication between the unit controller 562 and the master base 540, the unit controller 562 may be received from the central controller 510 of or through the master base 540.

In a similar manner, the unit controller 562 may control a sensor 564, a fan 568, a display 570, or other elements or components of the food holding chamber 560 (including elements or components of a food holding tray 24). In some embodiments, the unit controller 562 may communicate data regarding the food holding module 560 through the upstream communication connection 546 and the master base 540 to the central controller 510 via the communication link 530. Such data may indicate the location or configuration of the food holding module 560. The central controller 510 may use this data to determine a configuration or arrangement of the one or more food holding chambers 560 of the modular food holding system 500. The central controller 510 may further provide control commands, control actions, operating parameters, or set points to the unit controller 562.

Although the food holding chambers 560 may include a variety of electrical or electronic elements, including those discussed above, the elements may be limited in some embodiments for reliability or cost. In some embodiments, therefore, the electrical elements may include only one or more of the following elements (plus the necessary wiring or other connections for the power connections 544 and the communication connections 546): a timer switch, a heating element, a fan, or an indicator light. In additional embodiments, the limited electrical elements may further include one or more unit controllers 562. In further embodiments, the electrical elements of the food holding chambers 560 may include any one or more elements or components for sensing or adjusting one or more aspects of the environment within the food holding chambers 506, but the unit controller 562 of each food holding chamber 562 may be configured to require operating parameters, set points, or control commands from the central controller 510.

As discussed above, the master base 540 may be communicatively connected to the central controller 510 by the communication link 530, or the central controller 510 may be incorporated within the master base 540. The central controller 510 may be a general- or special-purpose computing device, such as a desktop computer, notebook computer, tablet computer, smart phone, other mobile device, or wearable computing device. In some embodiments, the central controller 510 may be configured to physically connect to a socket or plug of the master base 540, such that the central controller 510 forms a fixed or adjustable part of the modular food holding system 500. In other embodiments, the central controller 510 may be wired to or wirelessly connected to the master base 540. Through the master base 540, the central controller 510 receives data from and transmits data to the one or more food holding chambers 560 of the modular food holding system 500, such as configuration information or operating parameters. In some embodiments, the central controller 510 may be mounted at a fixed location with respect to the modular food holding system 500, such as on top of one or more food holding chambers 560, hanging below one or more bases, etc. In alternative embodiments where the central controller 510 is wirelessly connected to the master base 540, a storage slot (not shown) may further be provided to hold the central controller 510 when not in use.

The central controller 510 may include a display 512 for presenting information to an operator. In some embodiments, the display may be a touch screen display, configured to receive input from the operator. In further embodiments, the central controller 510 may include an input device, such as a keyboard, mouse, microphone, or touch pad. The central controller 510 may further include one or more processors 514 to receive, process, generate, determine, transmit, and store data. The one or more processors of the central controller 510 may access a random access memory (RAM) and a memory 516 for storing an operating system, software programs, applications, routines, scripts, or other data. The memory 516 may be a non-transitory computer readable memory, storing instructions executed by the one or more processors 514. In some embodiments, the central controller 510 may also include, or otherwise be communicatively connected to, other data storage mechanisms (e.g., one or more hard disk drives, optical storage drives, solid state storage devices, etc.) that reside within the central controller 510 or are connected thereto via a computer network. Moreover, in thin-client implementations, additional processing and data storage may be provided by one or more servers (not shown) connected via a network.

In some embodiments, the central controller 510 may further include a communication module 520 for communicating with the communication unit 542 of the master base 540 or directly with the food holding chambers 560 via the communication link 530 and the communication connections 546. The communication module 520 may further transmit and receive wired or wireless communications with the master base 510 or external devices (not shown), using any suitable wireless communication protocol network, such as a wireless telephony network (e.g., GSM, CDMA, LTE, etc.), a Wi-Fi network (802.11 standards), a WiMAX network, a Bluetooth network, etc. Additionally, or alternatively, the communication module 520 may also be capable of communicating using a near field communication standard (e.g., ISO/IEC 18092, standards provided by the NFC Forum, etc.) The components of the central controller 510 (including the display 512, processor 514, memory 516, RAM 518, and communication component 520) may be interconnected via an address/data bus or other means.

In some embodiments, the communication module 520 may be configured to facilitate communication between multiple central controllers 510. In further embodiments, the communication module 520 may be configured to receive data from a static or dynamic data source configured by another central controller 510. For example, a desktop or laptop computer may be used as a first central controller 510 to configure operating parameters for the food holding chambers 560 of the modular food holding system 500, and information related to such configuration of the operating parameters of the food holding chambers 560 may be transferred to a second central controller 510 for communication and implementation within the modular food holding system 500. Such second central controller 510 may include a central controller 510 incorporated within the master base 540, which may receive the configuration information via the communication module 520. In some embodiments, such transfer of configuration information may include uploading the information from the first central controller 510 to a storage device (e.g., a flash memory drive, a USB memory device, or a network drive), then downloading the configuration information to the second central controller 510 from the storage device. In some such embodiments, the second central controller 510 incorporated within the master base 540 may omit the display 512 or have only limited display functionality.

In further embodiments, multiple central controllers 510 may be connected to the master base 540 through one or more communication links 530. This may allow multiple devices or operators to simultaneously control the modular food holding system 500. In further embodiments, multiple modular food holding systems 500 may be communicatively connected to one or more central controllers 510 through one or more communication links 530 to the master bases 540 of each modular food holding system 500. For example, a commercial kitchen may have several modular food holding systems 500 positioned at different locations in the kitchen, each of which includes a master base 540 and one or more food holding chambers 560. Each master base 540 may be physically or wireless connected to a central controller 510 dedicated to control of the modular food holding system 500 corresponding to the particular master base 540. Additionally, some or all of the master bases 540 may further be communicatively connected to an additional central controller 510. Such additional central controllers 510 may also be configured to control only one modular food holding system 500 or may instead be configured to control a plurality of modular food holding systems 500. The former configuration may allow multiple central controllers 510, such as those positioned at opposite ends of a long row of food holding chambers 560 for easy access by one or more operators. The latter configuration may allow a central operator to monitor or control multiple modular food holding systems 500 located around the kitchen from a central location, such as a manager's office.

Figure 35:
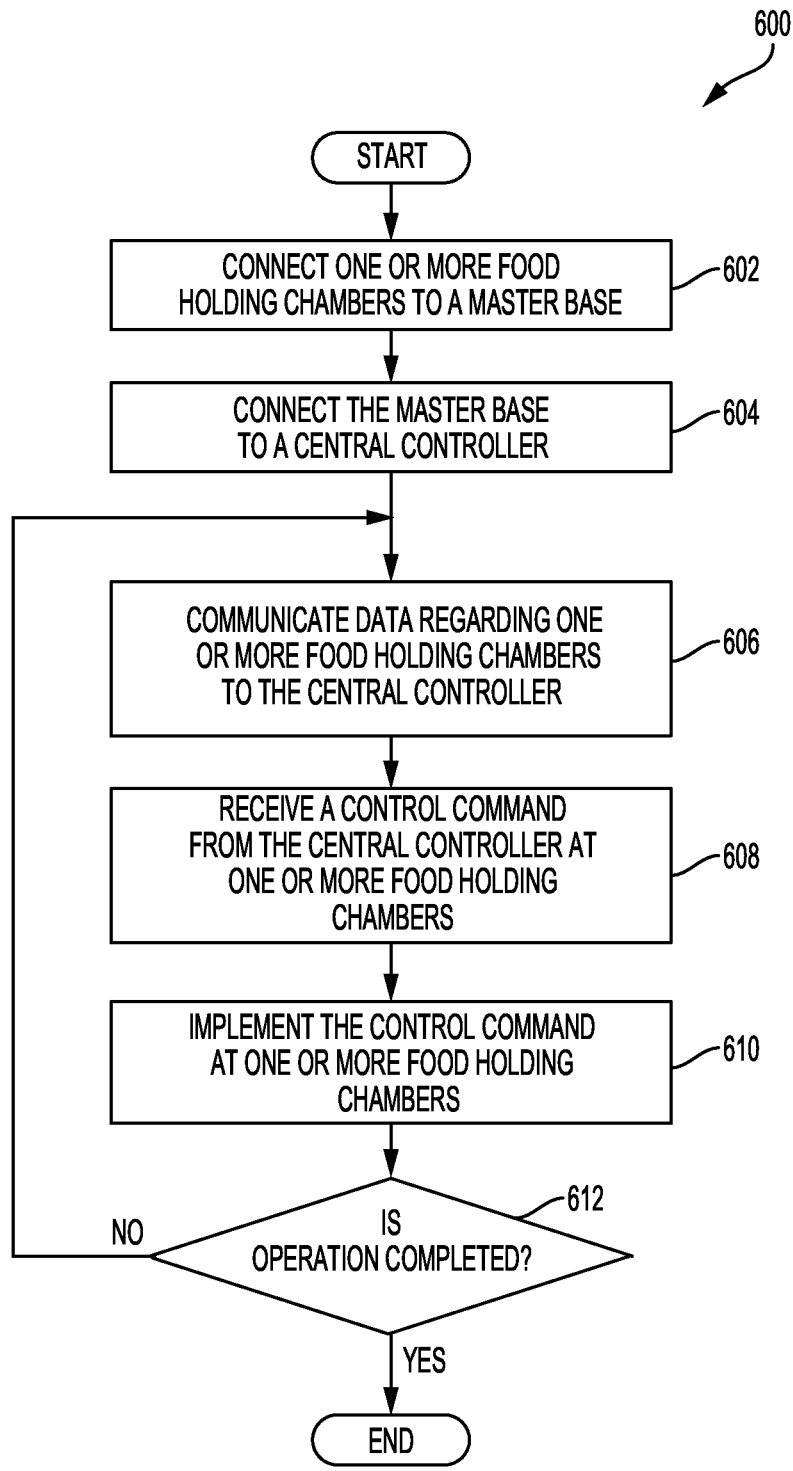
FIG. 35 is a logic flow diagram of an exemplary monitoring method that may be implemented by the modular food holding system of FIG. 1.

FIG. 35 illustrates a flow diagram of an exemplary monitoring method 600 for monitoring a modular food holding system 500 (FIG. 34). The modular food holding system 500 may implement this method to monitor and control the one or more food holding chambers 560 in conjunction with one or more central controllers 510. The method 600 may begin by connecting one or more food holding chambers 560 to the master base 540, either directly or indirectly, at block 602. The master base 540 may then be communicatively connected to the central controller 510 at block 604. Until operation of the modular food holding system 500 is determined to be complete at block 612, the method 600 may then continue to communicate data and control the operation of one or more elements within the one or more food holding chambers 560. The one or more food holding chambers 560 may communicate data to the central controller 510 via the master base 540 at block 606. The one or more food holding chambers 560 may then receive control commands from the central controller 510 via the master base 540 at block 608 and may implement the control commands at block 610. Once operation of the modular food holding system 500 is determined to be complete at block 612, the method 600 may terminate.

At block 602, the method 600 may begin with the connection of one or more food holding chambers 560 to the master base 540. As discussed above, the food holding chambers 560 may be connected to the master base 540 via power connections 544 and communication connections 546 through one or more other food holding chambers 560 or expansion bases 540A.

At block 604, the master base 540 may be connected to the central controller 510. This connection may be made by a wired or wireless connection via the communication link 530. The connection may be established by either the central controller 510 or the master base 540 in various embodiments. In some embodiments, the central controller 510 may establish a communicative connection with the one or more food holding chambers 560 through the master base 540, such as by polling the unit controllers 562 of the food holding chambers 560 to determine the configuration or arrangement of the modular food holding system 500. As discussed above, the master base 540 may include a central controller 510, in which case the communication connection may be to a further central controller 510 having the same or additional functionality.

At block 606, the master base 540 may communicate data regarding the one or more food holding chambers 560 to the central controller 510 through the communication link 530. In some embodiments, the one or more food holding modules 560 may generate and communicate the data directly through the master base 540. In other embodiments, the master base 540 may receive and convert data from the one or more food holding chambers 560 prior to transmitting the data to the central controller 510. The data may include information regarding the temperature, humidity, heat source location, or sensor data from one or more sensors 564 disposed within the one or more food holding chambers 560, as well as other information regarding the one or more food holding chambers 560. In further embodiments, the data may indicate the position, configuration, location, or arrangement of the one or more food holding chambers 560 within the modular food holding system 500. In yet further embodiments, the data may include information regarding general operating configurations of the one or more food holding chambers 560, such as operating parameters, operating status (e.g., whether the food holding chamber 560 has been turned on, is operating correctly, etc.), or a code identifying one of a plurality of pre-set operating modes (including a plurality of operating parameters or set points). In embodiments wherein the master base 540 includes a central controller 510, the data may be received from the food holding chambers 560 by the central controller 510 within the master base 540. The central controller 510 within the master base 540 may then determine whether to further communicate the data to an external central controller 510 or to perform control functions within the master base 540.

At block 608, the one or more food holding chambers 560 may receive one or more control commands from the central controller 510. The control commands may be generated by the central controller 510 and transmitted via the communication link 530 through or from the master base 540 to the one or more food holding chambers 560. Where applicable, the control commands may be received at the unit controllers 562 of one or more food holding chambers 560. Additionally, or alternatively, the control commands may be received by the elements disposed within the one or more food holding chambers 560 (e.g., sensors 564, heating elements 566, fans 568, displays 570, or other elements). Where the control commands are received by the unit controllers 562, the control commands may include element operation commands (directly controlling components or elements disposed within the food holding chambers 560) or operating parameters (establishing set points, targets, ranges, or conditions for the unit controllers 562 to use in operating the components or elements disposed within the food holding chambers 560).

At block 610, the one or more food holding chambers 560 may implement the received control commands. Implementation of the control commands may include taking one or more of the following actions using one or more elements disposed within the one or more food holding chambers 560: presenting an alert, illuminating an indicator light, displaying a countdown, controlling the temperature, or controlling the humidity. In some embodiments, the actions may be controlled by the unit controller 562 in response to receiving one or more control commands. In particularly preferred embodiments, the unit controller 562 will operate the food holding chamber 560 to adjust the environment within the food holding chamber 560 (e.g., temperature, humidity, etc.) using one or more electrical components or elements of the food holding chamber 560 based upon operating parameters or set points received from the central controller 510 as control commands.

At block 612, the method 600 may determine whether operation of the modular food holding system 500 is complete. Determining whether operation is complete may include receiving a signal indicating further operation or discontinuance of operation from the central controller 510. This may include a determination to terminate operation based upon expiration of a timer or due to an emergency shut-down condition being reached. Alternatively, determining whether operation is complete may include continuing operation until power is switched off or the power source 550 is removed. When operation is not complete, the method 600 may continue with communicating further data regarding the one or more food holding chambers 560 at block 606. When operation is determined to be complete, the method 600 may terminate.

Figure 36:
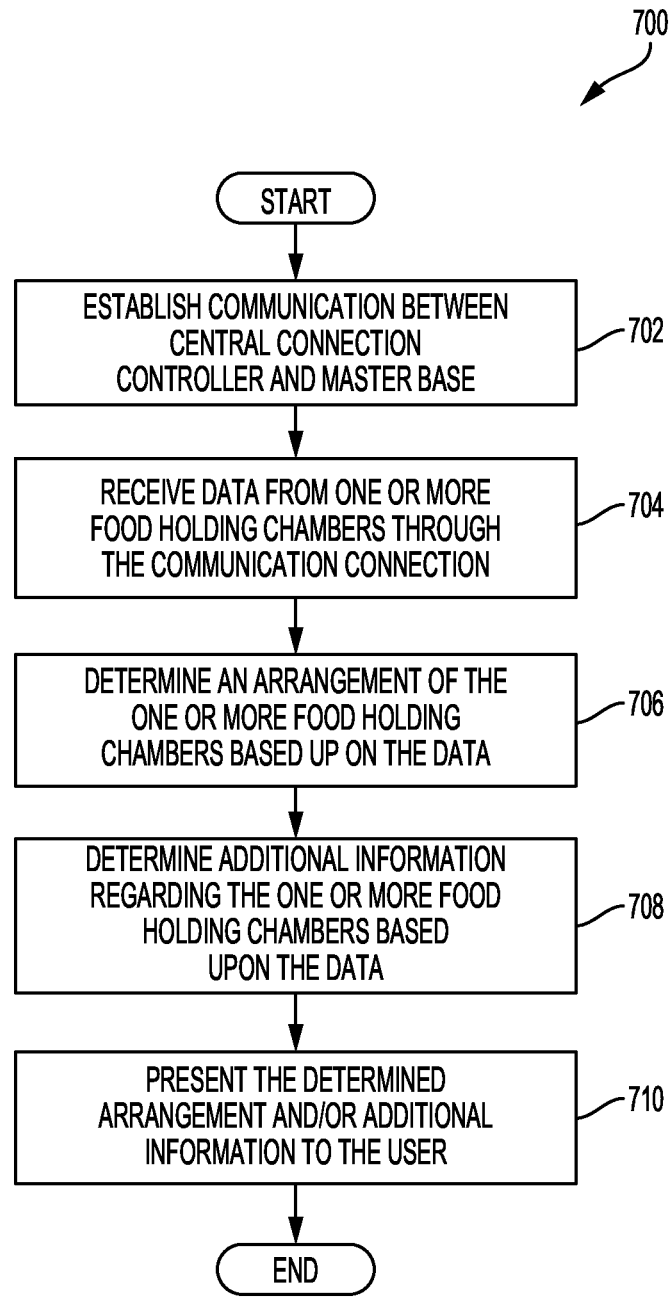
FIG. 36 is a logic flow diagram of an exemplary communication method for a central controller connected to the modular food holding system of FIG. 1.

FIG. 36 illustrates a flow diagram of an exemplary communication method 700 for a central controller 510 connected to a modular food holding system 500. The method 700 may be implemented by one or more central controllers 510 to monitor one or more modular food holding systems 500. The method 700 may begin by establishing a communicative connection between the central controller 510 and the master base 540 of the modular food holding system 500 at block 702. Once the connection is established, the central controller 510 may receive data from one or more food holding chambers 560 through the communicative connection at block 704. Based upon the received data, the central controller 510 may then determine an arrangement of the one or more food holding chambers 560 of the modular food holding system 500 at block 706. The central controller 510 may further determine additional information regarding the one or more food holding chambers 560 at block 708. Then the determined arrangement or other information may be presented to a user at block 710. The method 700 may then end, or the central controller 510 may continue to receive data, determine arrangement or other information regarding the one or more food holding chambers 560, and present the information to the user while the modular food holding system 500 is in operation.

At block 702, the method 700 may begin with establishing the communicative connection between the central controller 510 and the modular food holding system 500 through the master base 540. The connection may be established by either the controller 510 or the master base 540. In some embodiments, the controller 510 or the master base 540 may automatically attempt to establish a connection when powered up or when no connections are found. In other embodiments, the user may direct the central controller 510 or the master base 540 to establish the communicative connection. The communicative connection may be established through the communication link 530, which may be wired or wireless, as well as direct or indirect, as further discussed above.

At block 704, the central controller 510 may receive data from the one or more food holding chambers 560 of the modular food holding system 500. The data may be received via the communicative connection over the communication link 530. As discussed elsewhere herein, the central controller 510 receives the data through the master base 540, which is further directly or indirectly connected to the one or more food holding chambers 560. The data may include data from one or more sensors 564 disposed within the one or more food holding chambers 560, which sensor data may indicate environmental conditions within the one or more food holding chambers 560. Additionally, or alternatively, the data may include data from unit controllers 562, indicating the arrangement, operating status, operating parameters, or capabilities of the food holding chambers 560. The data may include information regarding the temperature, humidity, heat source location, or other information regarding the one or more food holding chambers 560. Additionally, or alternatively, the data may indicate the position, configuration, location, or arrangement of the one or more food holding chambers 560 within the modular food holding system 500.

At block 706, the central controller 510 may determine a physical arrangement of the one or more food holding chambers 560 based upon the data received at block 704. This may include determining whether any expansion bases 540A are connected to the master base 540, as well as determining how many food holding chambers 560 are connected to each base. In some embodiments, this may further include determining configuration information for one or more of the food holding chambers 560, such as a model or serial number of the food holding chambers 560. This configuration information may also include information regarding whether the food holding chamber 560 includes a unit controller 562 or includes one or more elements disposed within the food holding chamber 560 (e.g., sensors 564, heating elements 566, fans 568, or displays 570). Several exemplary physical arrangements of the food holding chambers 560 in a modular food holding system are illustrated in FIG. 2, as well as in FIGS. 16-33.

At block 708, the central controller 510 may determine additional information regarding the one or more food holding chambers 560 based upon the data received at block 704. The additional information may include the configuration information described above or other information regarding the food holding chambers 560 or their current state. Such additional information may include environmental condition information (e.g., temperature, humidity, etc.), unit content information (e.g., type or quantity of food contents, duration of operation, time elapsed since last open, time elapsed since contents placed in unit, time remaining until contents expire, etc.), operational status (e.g., powered, unpowered, operational, malfunctioning, etc.), or other information regarding the food holding chambers 560 or their contents. In some embodiments, this additional information may include operating parameters, operating status, or similar information regarding the operation of the food holding chamber 560 by the associated unit controller 562. The additional information may further be determined in part based upon additional data entered by the user, stored in the memory 516 of the central controller 510, or accessed by the central controller 510 (e.g., from a local or remote database connected via a network). In some embodiments, the additional information may include one or more control options to be presented to the user, which control options may be associated with control commands to control the actions of elements of the food holding chambers 560, as described further elsewhere herein.

At block 710, the central controller 510 may present, or cause to be presented, information regarding the modular food holding system 500 to the user. This may include presenting some or all of the arrangement information determined at block 706 and the additional information determined at block 708 regarding the one or more food holding chambers 560. For example, the information regarding the physical arrangement of the food holding chambers 560 may be presented by displaying a representation (e.g., a box or icon) of each food holding chamber 560 on the display 512, arranged to represent the physical location of each unit within the modular food holding system 500. Information regarding the operation or contents of each food holding chamber 560 may similarly be presented using icons, text, colors, shapes, or other means on the display 512. In some embodiments, the additional information may be presented in multiple screens or windows, in a drill-down fashion, using pop-up boxes, or in other configurations that allow the user to view information regarding all or only part of the modular food holding system 500. For example, the central controller 510 may present the arrangement of all the food holding chambers 560 to the user, but may present more detailed information about a particular food holding chamber 560 in a different screen upon user selection of the particular food holding chamber 560.

FIGS. 19-25 illustrate exemplary control screens 590 representing physical arrangements of food holding chambers 560 via the display 512 of the central controller 510. FIGS. 19-25 further illustrate exemplary control screens 590 presenting additional information regarding the one or more food holding chambers 560 to the user. Referring now to FIGS. 19-25, the exemplary control screen 590 represents information regarding both the configuration of four food holding chambers 560, as well as pictorial indicators of the contents of each food holding chamber 560. In various embodiments, other means of presenting the additional information in control screens 590 may be used, as noted above. Such information may be used by the user to operate the modular food holding system 500, as further discussed below. In any of the embodiments herein, the information may be alternatively, or additionally, presented using the display 512 of the central controller 510, or through other means. For example, the central controller 510 may cause some information to be presented to the user via one or more displays 570 of the food holding modules 560.

FIG. 37 illustrates a flow diagram of an exemplary control method 800 for a central controller 510 connected to a modular food holding system 500. The method 800 may be used in connection with or alternatively to method 700 discussed above, and some aspects of each may be incorporated in the other. Like the method 700, the method 800 may be implemented by a central controller 510 communicatively connected to a modular food holding system 500 via a communication link 530. The method 800 may begin at block 802 by receiving data from one or more food holding cambers 560. Based upon the received data, one or more control options may be determined at block 804 and presented to a user at block 806. Upon receiving a user selection of one or more control options at block 808, the central controller 510 may determine one or more control actions based upon the received selection at block 810. Depending upon a determination at block 812 of whether the determined control actions require communication to the food holding chambers 560, the central controller 510 may implement the control actions at block 814 or generate a control command at block 816 and transmit the control command to the food holding chambers 560 at block 818. The central controller 510 may further present, or cause to be presented, information regarding the one or more control actions to the user at block 820. The method 800 may repeat until operation of the modular food holding system 500 is determined to be complete at block 822, at which point the method 800 may terminate.

At block 802, the central controller 510 may receive data from one or more food holding chambers 560 through the master base 540 and the communicative connection over the communication link 530. In some embodiments, this may include establishing a communicative connection between the central controller 510 and the master base 540, as discussed above. In further embodiments, the central controller 510 may be incorporated within the master base 540, in which case the data may be received by the central controller 510 of the master base 540. As discussed further elsewhere herein, the data received by the central controller 510 may include data from one or more sensors 564 disposed within the food holding chambers 560, data regarding environmental conditions within the food holding chambers 560 (e.g., temperature, humidity, heat source location, ventilation, etc.), data regarding configuration of the food holding chambers 560 (e.g., elements disposed within the units, operation of the elements, arrangement of the units, etc.), operational status of the food holding chambers 560 (e.g., powered, unpowered, ready, operational, malfunctioning, etc.), operating parameters of the food holding chambers 560 (e.g., temperature, humidity, load, or duration set points), or data regarding food contents of the food holding chambers 560 (e.g., type or quantity of food contents, duration of operation, time elapsed since last open, time elapsed since contents placed in unit, time remaining until contents expire, etc.).

At block 804, the central controller 510 may determine one or more control options associated with the one or more food holding chambers 560 based upon the data received at block 802. The one or more control options may be associated with control actions that may directly or indirectly affect the operation or control of the one or more food holding chambers 560. Direct operational control may include causing an element disposed within a food holding chamber 560 to start, stop, increase, or decrease operation in order to achieve a change to environmental conditions within the food holding chamber 560. Indirect operational control may include providing or adjusting an operating parameter used by the unit controller 562 of a food holding chamber 560 to adjust environmental conditions within the food holding chamber 560. The control options may also allow the user to view or access additional information regarding some or all of the food holding chambers 560. In some embodiments, the control options may further include options to connect to or disconnect from one or more additional modular food holding systems 500, retrieve historical operating data, access troubleshooting information, send information to another user, request information from another user, or perform or schedule maintenance on the modular food holding system 500. In further embodiments, the central controller 510 may determine to present only a subset of the set of all available control options to the user, which subset may be based upon a user role or access level. Additionally, or alternatively, control options not presented may be accessible by the user through one or more menus in some embodiments.

At block 806, the central controller 510 may cause the one or more control options to be presented to the user. The one or more control options may be presented using the display 512 of the central controller 510. Additionally, or alternatively, other means of presenting the options to the user may be used in some embodiments, such as the display 570 of one or more food holding chambers 560 or other displays. In some instances, one or more of the control options may be suggested or recommended to the user, such as a control option setting a timer for a food holding chamber 560 based upon data indicating that new food content was recently placed in the food holding chamber 560. Where one or more of the determined control options is critical or time sensitive, the central controller 510 may further alert the user to the control options by also presenting an alert or alarm.

At block 808, the central controller 510 may receive a selection from the user of one or more control options. For example, the user may select an option to change a group of operating parameters associated with one or more of the food holding chambers 560 in order to adjust the environment and operations of the food holding chambers 560 to receive different food (e.g., when changing between an arrangement configured for breakfast foods and an arrangement configured for lunch foods). The selection may be received by an input device of the central controller 510. In a preferred embodiment, the input device may be combined with the display 512 as a touch screen display. Such embodiment offers the advantages of simplicity, flexibility in the input configuration, and efficient space usage. Other input devices may be used in addition to, or as alternatives to, a touch screen, including buttons, keyboards, keypads, of other known or later-developed input devices. In some embodiments, the central controller 510 may receive an indirect user selection in the form of data received from one or more food holding chambers 560. For example, the user may remove a holding bin from a food holding chamber 560, thereby indicating to the central controller 510 that food contents have been removed or discarded or that the heating elements of the food holding chamber 560 should be turned off. The user may similarly interact with a display 570, button, switch, or other element of a food holding chamber 560 to select a control option in some embodiments.

At block 810, the central controller 510 may determine one or more control actions to be taken based upon the user selection of one or more control options received at block 808. The control actions may relate to the direct or indirect control of one or more of the food holding chambers 560, as discussed herein. Some control actions may involve direct or indirect adjustments to the operation of one or more elements of a food holding chamber 560, such as controlling the speed of a fan 568 or adjusting a set point for humidity within the food holding chamber 560. Other control actions may be implemented to provide information to the user for use in operating the modular food holding system 500, such as setting a timer to alert the user when the contents of a food holding container have expired or setting an alarm to sound when a food holding chamber 560 has reached a desired temperature. The control actions may include one or more of the following: setting a timer, presenting an alert, illuminating an indicator light, displaying a countdown, presenting an option to select a type of food stored within the one or more food holding chambers 560, controlling the temperature within the one or more food holding chambers 560, controlling the humidity within the one or more food holding chambers 560, configuring operating parameters or set points of the one or more food holding chambers 560, or otherwise configuring the one or more food holding chambers 560. Thus, the determined control actions may include actions to be implemented at a food holding chamber 560 or at the central controller 510. Similarly, the determined control actions to be implemented at the food holding chamber 560 may include control actions that directly operate the components or elements disposed therein (e.g., heating elements, fans, etc.) or control actions that control the operation of the unit controller 562 disposed therein to control the components or elements (e.g., adjusting a temperature set point, setting a target humidity level, etc.).

At block 812, the central controller 510 may determine whether each control action determined at block 810 requires communication to the food holding chambers 560. For example, control actions involving configuration of the unit controller 562 or operation of a heating element 566, a fan 568, a display 570, or another element disposed within a food holding chamber 560 will require communication to the food holding chamber 560 of a control command. Control actions involving providing information, setting a timer, presenting an alert, or similar actions occurring on the central controller 510 may not require communication from the central controller 510 to any food holding chambers 560.

When the central controller 510 determines at block 812 that no communication to the food holding chambers 560 through the master base 540 is required to implement the one or more control actions, the central controller 510 may implement the one or more control actions at block 814. This may include determining additional information, presenting additional information to the user, requesting additional information from the user, or communicating with another central controller 510 or another user to assist the user in operating the modular food holding system 500. In some instances, this may include monitoring future data received at the central controller 510 from the one or more food holding modules 560 to determine when a condition is met or ceases to be met, in which case further actions may be taken by the central controller 510. Such further actions may be implemented at the central controller 510 or may require communication of control commands to one or more food holding chambers 560 at that later time.

When the central controller 510 determines at block 812 that communication to the food holding chambers 560 through the master base 540 is required to implement the one or more control actions, the central controller 510 may generate one or more control commands to one or more food holding chambers 560 at block 816. The one or more control commands may include instructions that cause a unit controller 562, sensor 564, heating element 566, fan 568, display 570, or other element disposed within a food holding chamber 560 to adjust its operation, as discussed elsewhere herein. This may include controlling one or more elements to adjust an environmental condition of the food holding chamber 560, such as temperature, humidity, ventilation, or heat source location. Control commands may also cause an alarm or information to be presented by a display, indicator light, buzzer, speaker, siren, or other notification element disposed within the food holding chamber 560.

Once the one or more control commands are determined at block 816, the central controller 510 may communicate the control commands to the one or more food holding chambers 560. As discussed above, communication may occur via the communication link 530 with the master base 540 and, through the master base 540, to the one or more food holding chambers 560. In embodiments in which a central controller 510 is incorporated within the master base 540, the communication may occur through or from such incorporated central controller 510 to the one or more food holding chambers 560. The relevant elements of the one or more food holding chambers 560 may then implement the control commands to adjust the operation of the food holding chambers 560 to which the one or more control commands are addressed or directed.

In addition to implementing the control actions at the central controller 510 or the one or more food holding chambers 560, the method 800 may include presentation of information regarding the one or more control actions to the user at block 820. As above, presentation of the information may include presentation via the display 512 of a central controller 510 or one or more displays 570 of the food holding chambers 560. The information presented to the user may include additional information regarding one or more food holding chambers 560, such as condition, status, environment, contents, or operation. The information may also assist the user in operating the modular food holding system 500, such as by presenting a countdown, a timer, instructions, recommendations, or other information regarding use or quality of the contents of the one or more food holding chambers 560. The presentation of information to the user may further server to verify receipt, communication, or implementation of the user selection of a control option.

At block 822, the method 800 may determine whether operation of the modular food holding system 500 is complete. Determining whether operation is complete may include receiving a signal indicating further operation or discontinuance of operation at the central controller 510. Such signal may be generated automatically (e.g., upon disconnection of the communicative connection with the master base 540) or may be received from the user. Determining whether operation is complete may include continuing operation until power is switched off or the power source 550 is removed. When operation is not complete, the method 800 may continue with receiving further data regarding the one or more food holding chambers 560 at block 802. When operation is determined to be complete, the method 800 may terminate. In some embodiments, a record of the operating session may be saved in the memory 816 or transmitted to a remote memory, such as a server.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in exemplary configurations may be implemented as a combined structure or component. Similarly, structures and functionality presented as a single component may be implemented as separate components. These and other variations, modifications, additions, and improvements fall within the scope of the subject matter herein.

Additionally, certain embodiments are described herein as including logic or a number of routines, subroutines, applications, or instructions. These may constitute either software (code embodied on a non-transitory, tangible machine-readable medium) or hardware. In hardware, the routines, etc., are tangible units capable of performing certain operations and may be configured or arranged in a certain manner. In example embodiments, one or more computer systems (e.g., a standalone, client or server computer system) or one or more hardware modules of a computer system (e.g., a processor or a group of processors) may be configured by software (e.g., an application or application portion) as a hardware module that operates to perform certain operations as described herein.

In various embodiments, a hardware module may be implemented mechanically or electronically. For example, a hardware module may comprise dedicated circuitry or logic that is permanently configured (e.g., as a special-purpose processor, such as a field programmable gate array (FPGA) or an application-specific integrated circuit (ASIC) to perform certain operations. A hardware module may also comprise programmable logic or circuitry (e.g., as encompassed within a general-purpose processor or other programmable processor) that is temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

Accordingly, the term "hardware module" should be understood to encompass a tangible entity, be that an entity that is physically constructed, permanently configured (e.g., hardwired), or temporarily configured (e.g., programmed) to operate in a certain manner or to perform certain operations described herein. Considering embodiments in which hardware modules are temporarily configured (e.g., programmed), each of the hardware modules need not be configured or instantiated at any one instance in time. For example, where the hardware modules comprise a general-purpose processor configured using software, the general-purpose processor may be configured as respective different hardware modules at different times. Software may accordingly configure a processor, for example, to constitute a particular hardware module at one instance of time and to constitute a different hardware module at a different instance of time.

Hardware modules can provide information to, and receive information from, other hardware modules. Accordingly, the described hardware modules may be regarded as being directly or indirectly communicatively coupled through a wired or wireless communication link. Where multiple of such hardware modules exist contemporaneously, communications may be achieved through signal transmission (e.g., over appropriate circuits and buses) that connect the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods or routines described herein may be at least partially processor-implemented. For example, at least some of the operations of a method may be performed by one or more processors or processor-implemented hardware modules. The performance of certain of the operations may be distributed among the one or more processors, not only residing within a single machine, but deployed across a number of machines. In some example embodiments, the processor or processors may be located in a single location (e.g., within a home environment, an office environment or as a server farm), while in other embodiments the processors may be distributed across a number of locations.

The performance of certain of the operations may be distributed among the one or more processors, not only residing within a single machine, but deployed across a number of machines. In some example embodiments, the one or more processors or processor-implemented modules may be located in a single geographic location (e.g., within a home environment, an office environment, or a server farm). In other example embodiments, the one or more processors or processor-implemented modules may be distributed across a number of geographic locations.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, nonvolatile memory, or a combination thereof), registers, or other machine components that receive, store, transmit, or display information.

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

Some embodiments may be described using the expression "coupled" and "connected" along with their derivatives. For example, some embodiments may be described using the term "coupled" to indicate that two or more elements are in direct physical or electrical contact. The term "coupled," however, may also mean that two or more elements are not in direct contact with each other, but yet still co-operate or interact with each other. The embodiments are not limited in this context.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the description. This description, and the claims that follow, should be read to include one or at least one and the singular also includes the plural unless it is obvious that it is meant otherwise.

This detailed description is to be construed as exemplary only and does not describe every possible embodiment, as describing every possible embodiment would be impractical, if not impossible. One could implement numerous alternate embodiments, using either current technology or technology developed after the filing date of this application.

The foregoing description is for purposes of illustration only and not for purposes of limitation. The true scope of the invention is set forth by the appurtenant claims.

What is claimed:

1. A modular food holding system comprising:
a plurality of individual modularized food holding chambers, each of the plurality of individual modularized food holding chambers being physically and communicatively removably connected to one another by at least a communication connection, each of the plurality of individual modularized food holding chambers comprising a food holding cavity and at least one of a heating element or a cooling element for heating or cooling the food holding cavity;
a chamber base that is a distinct component of the modular food holding system and is separate from each of the plurality of individual modularized food holding chambers and is physically and communicatively removably connected to one of the plurality of individual modularized food holding chambers of the plurality of individual modularized food holding chambers via a connector structure having a power connection and a communication connection; and
a control screen operatively coupled to the chamber base, the control screen providing at least one of a user interface for entering control instructions or an information display that displays information pertaining to one or more of the plurality of individual modularized food holding chambers, wherein the control screen is communicatively connected to the one or more of the plurality of individual modularized food holding chambers through the connector structure of the chamber base.

2. The modular food holding system of claim 1, wherein the control screen is removably attached to a port provided in the chamber base.

3. The modular food holding system of claim 1, wherein the control screen is attached to the chamber base with a tether.

4. The modular food holding system of claim 1, wherein the control screen is wirelessly connected to the chamber base.

5. The modular food holding system of claim 1, wherein the control screen includes control options for one or more of a temperature of a food holding chamber of the plurality of individual modularized food holding chambers, a humidity level of the food holding chamber of the plurality of individual modularized food holding chambers, or a configuration of the plurality of individual modularized food holding chambers.

6. The modular food holding system of claim 5, wherein the control screen displays a schematic representation of the plurality of individual modularized food holding chambers of the plurality of individual modularized food holding chambers.

7. The modular food holding system of claim 6, wherein the control screen displays a symbolic illustration of a food type that is stored in one of the plurality of individual modularized food holding chambers.

8. The modular food holding system of claim 7, wherein an individual food holding chamber of the plurality of individual modularized food holding chambers is selectable on the control screen.

9. The modular food holding system of claim 8, wherein a location of a selected food holding chamber is displayed on the control screen.

10. The modular food holding system of claim 8, wherein, upon selection of the individual food holding chamber, the control screen is configured to present one or more selectable options to adjust a property of the individual food holding chamber.

11. The modular food holding system of claim 10, wherein:
upon selection of at least one of the one or more selectable options, the control screen causes a control command to be transmitted to the individual food holding chamber based upon the selection, and the control command causes the individual food holding chamber to perform one or more of the following actions: presenting an alert, illuminating an indicator light, displaying a countdown, controlling the temperature within the individual food holding chamber, or controlling the humidity within the individual food holding chamber.

12. The modular food holding system of claim 7, wherein the control screen displays a countdown timer for a selected food holding chamber of the plurality of individual modularized food holding chambers, the countdown timer representing the useful life of a food item stored in the selected food holding chamber.

13. The modular food holding system of claim 1, wherein the control screen is a touchscreen display configured to receive input from a user.

14. The modular food holding system of claim 1, wherein the chamber base is communicatively connected to an additional food holding chamber of the plurality of individual modularized food holding chambers through the one of the plurality of individual modularized food holding chambers.

* * * * *